United States Patent
Dick et al.

(10) Patent No.: US 10,230,324 B2
(45) Date of Patent: Mar. 12, 2019

(54) SUPPORT ASSEMBLY FOR PHOTOVOLTAIC MODULES AND MOUNTING SYSTEM USING THE SAME

(71) Applicant: Ecolibrium Solar, Inc., Athens, OH (US)

(72) Inventors: Andrew Brian Dick, New Marshfield, OH (US); Devin Glen MacRostie, Boulder, CO (US)

(73) Assignee: Ecolibrium Solar, Inc, Athens, OH (US)

( * ) Notice: Subject to any disclaimer, the term of this patent is extended or adjusted under 35 U.S.C. 154(b) by 0 days.

(21) Appl. No.: 15/451,292

(22) Filed: Mar. 6, 2017

(65) Prior Publication Data

US 2017/0257056 A1    Sep. 7, 2017

Related U.S. Application Data

(60) Provisional application No. 62/304,911, filed on Mar. 7, 2016, provisional application No. 62/380,323, filed on Aug. 26, 2016.

(51) Int. Cl.
*H02J 3/38* (2006.01)
*F24S 25/11* (2018.01)
(Continued)

(52) U.S. Cl.
CPC ............... *H02S 20/23* (2014.12); *F24S 25/11* (2018.05); *F24S 25/16* (2018.05); *F24S 40/85* (2018.05);
(Continued)

(58) Field of Classification Search
CPC ........... H02S 20/23; H02S 20/24; H02J 3/383
See application file for complete search history.

(56) References Cited

U.S. PATENT DOCUMENTS

| 4,677,248 A | 6/1987 | Lacey |
| 5,092,939 A | 3/1992 | Nath et al. |

(Continued)

FOREIGN PATENT DOCUMENTS

| DE | 202011001411 U1 | 4/2011 |
| EP | 2362161 A1 | 8/2011 |

(Continued)

OTHER PUBLICATIONS

PCT Form 210, International Search Report for PCT/US2017/021130, dated May 22, 2017.

(Continued)

*Primary Examiner* — Brian D Mattei
(74) *Attorney, Agent, or Firm* — The Law Office of Patrick F. O'Reilly III, LLC

(57) ABSTRACT

A support assembly for supporting one or more photovoltaic modules on a support surface, such a generally flat roof, is disclosed herein. The support assembly includes a ballast tray configured to accommodate one or more ballasts; at least one tubular member coupled to the ballast tray, the at least one tubular member configured to support one or more photovoltaic modules above a support surface; and at least one clamp member coupled to the at least one tubular member. In one or more embodiments, the support assembly further includes at least one channel member coupling said at least one tubular member to said ballast tray. A mounting system including a plurality of support assemblies is also disclosed herein.

17 Claims, 56 Drawing Sheets

(51) Int. Cl.
| | |
|---|---|
| *F24S 25/16* | (2018.01) |
| *F24S 40/80* | (2018.01) |
| *F24S 25/60* | (2018.01) |
| *H02S 20/23* | (2014.01) |
| *H02S 20/24* | (2014.01) |
| *F24S 80/00* | (2018.01) |
| *F24S 25/00* | (2018.01) |

(52) U.S. Cl.
CPC ............. *H02J 3/383* (2013.01); *H02S 20/24* (2014.12); *F24S 2025/013* (2018.05); *F24S 2025/02* (2018.05); *F24S 2025/6003* (2018.05); *F24S 2025/802* (2018.05); *F24S 2080/09* (2018.05); *Y02B 10/12* (2013.01); *Y02B 10/14* (2013.01); *Y02E 10/47* (2013.01)

(56) References Cited

U.S. PATENT DOCUMENTS

| | | | |
|---|---|---|---|
| 5,746,839 A | 5/1998 | Dinwoodie | |
| 6,105,316 A | 8/2000 | Bottger et al. | |
| 6,148,570 A | 11/2000 | Dinwoodie et al. | |
| 6,331,671 B1 | 12/2001 | Makita et al. | |
| 6,360,491 B1 | 3/2002 | Ullman | |
| 6,672,018 B2 | 1/2004 | Shingleton | |
| D510,315 S | 10/2005 | Shugar et al. | |
| 6,959,517 B2 | 11/2005 | Poddany et al. | |
| D519,444 S | 4/2006 | Mascolo | |
| D547,262 S | 7/2007 | Ullman | |
| D560,605 S | 1/2008 | McClintock et al. | |
| D564,958 S | 3/2008 | Almy et al. | |
| D565,505 S | 4/2008 | Shugar et al. | |
| 7,435,134 B2 | 10/2008 | Lenox | |
| 7,476,832 B2 | 1/2009 | Vendig et al. | |
| D586,737 S | 2/2009 | Shugar et al. | |
| 7,492,120 B2 | 2/2009 | Benn et al. | |
| D598,372 S | 8/2009 | Sasada | |
| 7,780,472 B2 | 8/2010 | Lenox | |
| 7,921,843 B1 | 4/2011 | Rawlings | |
| 8,136,311 B2 | 3/2012 | Liu | |
| 8,191,320 B2 | 6/2012 | Mittan et al. | |
| 8,266,848 B2 | 9/2012 | Miros et al. | |
| 8,276,330 B2 | 10/2012 | Harberts et al. | |
| 8,397,448 B2 | 3/2013 | Brown et al. | |
| 8,424,255 B2 | 4/2013 | Lenox et al. | |
| 8,505,864 B1* | 8/2013 | Taylor .................... F24J 2/5258 248/226.12 |
| D692,372 S | 10/2013 | Rothschild et al. | |
| 8,635,818 B2 | 1/2014 | Wildes | |
| D713,784 S | 9/2014 | Wildes | |
| 8,844,215 B2 | 9/2014 | Wildes et al. | |
| 8,869,471 B2 | 10/2014 | Wildes et al. | |
| 9,196,755 B2 | 11/2015 | Wildes | |
| 9,413,285 B2 | 8/2016 | Wildes et al. | |
| 9,444,395 B2* | 9/2016 | Tung .................... F24J 2/5233 |
| 9,825,581 B2 | 11/2017 | Wildes | |
| 2005/0072456 A1 | 4/2005 | Stevenson et al. | |
| 2005/0166955 A1 | 8/2005 | Nath et al. | |
| 2007/0095388 A1 | 5/2007 | Mergola et al. | |
| 2007/0144575 A1 | 6/2007 | Mascolo et al. | |
| 2007/0151594 A1 | 7/2007 | Mascolo et al. | |
| 2008/0172955 A1 | 7/2008 | McClintock et al. | |
| 2009/0019796 A1 | 1/2009 | Liebendorfer | |
| 2009/0134291 A1 | 5/2009 | Meier et al. | |
| 2009/0242014 A1 | 10/2009 | Leary | |
| 2009/0320904 A1 | 12/2009 | Botkin et al. | |
| 2009/0320905 A1 | 12/2009 | Botkin et al. | |
| 2009/0320906 A1 | 12/2009 | Botkin et al. | |
| 2009/0320907 A1 | 12/2009 | Botkin et al. | |
| 2010/0089390 A1 | 4/2010 | Miros et al. | |
| 2010/0147359 A1* | 6/2010 | Harberts ............... F24J 2/5239 136/246 |
| 2010/0154780 A1 | 6/2010 | Linke | |
| 2010/0212714 A1 | 8/2010 | Rothschild et al. | |
| 2010/0219304 A1 | 9/2010 | Miros et al. | |
| 2010/0236542 A1 | 9/2010 | Pierson et al. | |
| 2010/0269428 A1 | 10/2010 | Stancel et al. | |
| 2011/0056536 A1 | 3/2011 | Meppelink et al. | |
| 2011/0154774 A1 | 6/2011 | Rawlings | |
| 2011/0179727 A1 | 7/2011 | Liu | |
| 2011/0233157 A1* | 9/2011 | Kmita ................... F24J 2/5233 211/41.1 |
| 2011/0253190 A1 | 10/2011 | Farnham, Jr. | |
| 2011/0278411 A1 | 11/2011 | Carbonare et al. | |
| 2012/0031473 A1 | 2/2012 | Chan et al. | |
| 2012/0032045 A1 | 2/2012 | Lallier et al. | |
| 2012/0048351 A1 | 3/2012 | Rizzo | |
| 2012/0061337 A1 | 3/2012 | Seery et al. | |
| 2012/0240489 A1 | 9/2012 | Rivera et al. | |
| 2012/0266944 A1 | 10/2012 | Wildes | |
| 2013/0032208 A1 | 2/2013 | Walz et al. | |
| 2013/0220403 A1 | 8/2013 | Rizzo | |
| 2013/0276867 A1 | 10/2013 | Wildes et al. | |
| 2014/0014158 A1* | 1/2014 | Wildes ................ H01L 31/0422 136/246 |
| 2014/0102517 A1* | 4/2014 | Meine ..................... H01L 31/18 136/251 |
| 2014/0366931 A1 | 12/2014 | Chiu et al. | |
| 2015/0040969 A1 | 2/2015 | Wildes | |
| 2015/0101996 A1* | 4/2015 | Nayar .................... H02S 20/23 211/41.1 |
| 2015/0129517 A1 | 5/2015 | Wildes | |
| 2015/0200621 A1 | 7/2015 | Reed et al. | |
| 2015/0214884 A1 | 7/2015 | Rizzo | |
| 2016/0056753 A1* | 2/2016 | Atchley .................. H02S 20/23 136/251 |
| 2016/0079912 A1 | 3/2016 | Wildes et al. | |
| 2016/0190979 A1 | 6/2016 | Wildes | |
| 2016/0268958 A1 | 9/2016 | Wildes et al. | |
| 2016/0308486 A1* | 10/2016 | Atia ........................ H02S 20/23 |
| 2016/0336895 A1* | 11/2016 | Wildes ................... F24J 2/5237 |
| 2017/0104442 A1* | 4/2017 | MacRostie ............. H02S 20/23 |
| 2017/0350622 A1* | 12/2017 | Rivera ..................... F24J 2/523 |

FOREIGN PATENT DOCUMENTS

| | | |
|---|---|---|
| FR | 2957619 A1 | 9/2011 |
| GB | 801367 A | 9/1958 |
| JP | 07018795 A | 1/1995 |
| JP | 09177272 A | 7/1997 |
| JP | 2001291889 A | 10/2001 |
| JP | 2008214875 A | 9/2008 |
| WO | 2005020290 A2 | 3/2005 |
| WO | 2008/105296 A1 | 9/2008 |
| WO | 2009120923 A2 | 10/2009 |

OTHER PUBLICATIONS

PCT Form 237, Written Opinion of the International Searching Authority for PCT/US2017/021130, dated May 22, 2017.

* cited by examiner

Detail "A"

Detail "B"

Detail "C"

Detail "D"

Detail "E"

Detail "F"

Detail "G"

Detail "H"

See Detail "H"

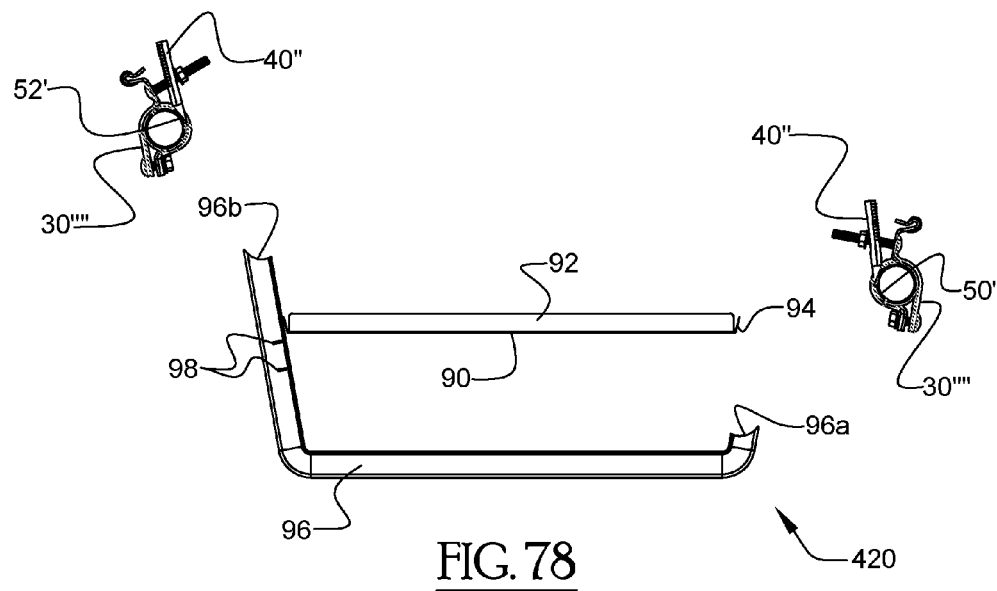
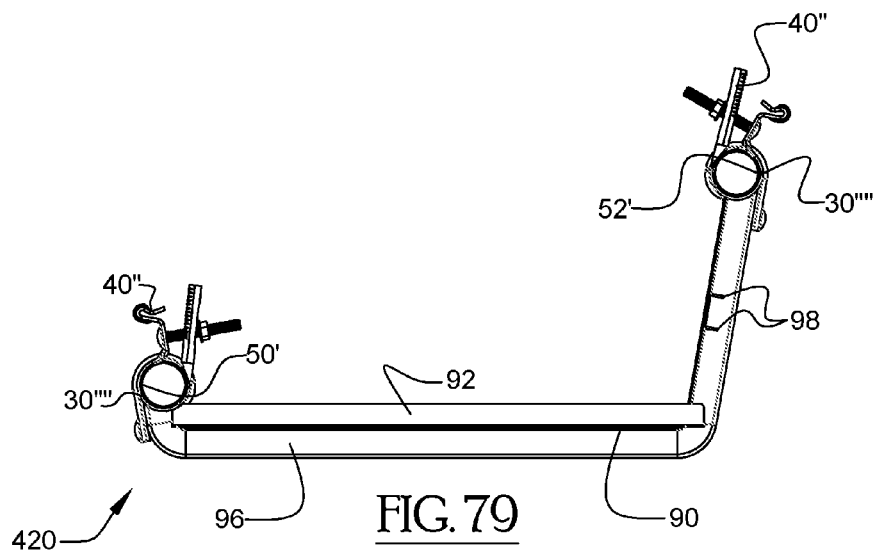

Detail "I"

Detail "J"

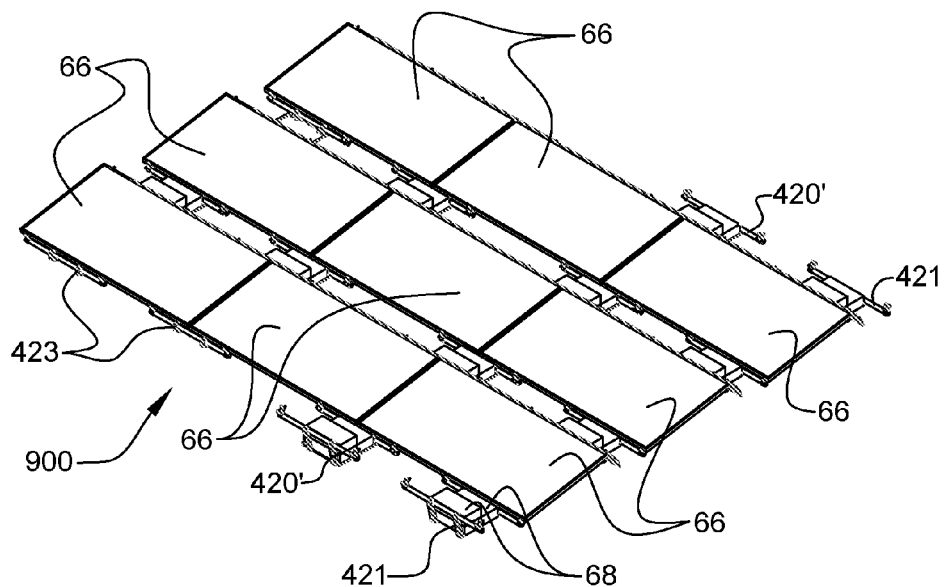
FIG. 83
FIG. 84
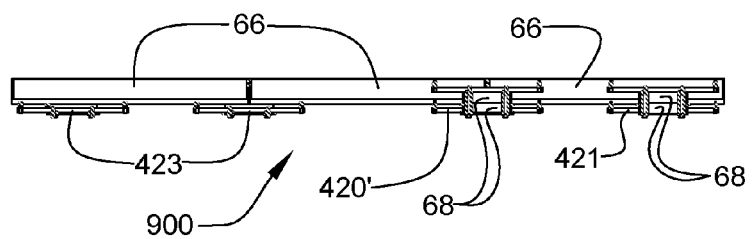

Detail "K"

Detail "L"

Detail "M"

SUPPORT ASSEMBLY FOR PHOTOVOLTAIC MODULES AND MOUNTING SYSTEM USING THE SAME

CROSS-REFERENCE TO RELATED APPLICATIONS

This patent application claims priority to U.S. Provisional Patent Application No. 62/304,911, entitled "Support Assembly For Photovoltaic Modules And Mounting System Using The Same", filed on Mar. 7, 2016; and further claims priority to U.S. Provisional Patent Application No. 62/380,323, entitled "Support Assembly For Photovoltaic Modules And Mounting System Using The Same", filed on Aug. 26, 2016, the disclosure of each of which is hereby incorporated by reference as if set forth in their entirety herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The field of the present invention generally relates to mounting systems and, more particularly, to solar mounting systems for mounting photovoltaic modules or panels on generally flat surfaces such as, for example, low-sloped building rooftops, or the like.

2. Background and Description of Related Art

A photovoltaic (PV) panel, often referred to as a solar panel or a PV module, is typically used as a component of a larger PV system to generate and supply electricity in commercial and residential applications. Because a single PV module can only produce a limited amount of power, most installations utilize numerous PV modules to form a PV array. The PV array is often mounted on a flat building rooftop or the ground with each of the PV modules in a fixed position facing generally south.

There are many mounting systems for securing PV module systems to rooftops that reasonably withstand wind loads and use ballasts to alleviate or reduce the need to penetrate the roof membrane. However these prior mounting systems are difficult and slow to install due to the existence of many separate parts that need to be assembled, they are expensive and complex to pack and transport due to their bulk and due to the many components that must ship in separate packaging, and they do not conform well to uneven roof surfaces.

Accordingly, there is need in the art for improved mounting systems for PV modules in rooftop applications. In particular, a need exists for a PV module mounting system that is fast and easy to install. Moreover, there is a need for a PV module mounting system with support assemblies that fold into a shipping position such that the assemblies nest and stack in a configuration that allows for more assemblies to fit within a truck or container. Furthermore, a need exists for PV module support assemblies that are adjustable in multiple dimensions so as to allow the array to conform to the pitch and roll of the underlying roof surface.

BRIEF SUMMARY OF EMBODIMENTS OF THE INVENTION

Accordingly, the present invention is directed to a support assembly for photovoltaic modules and a mounting system using the same that substantially obviates one or more problems resulting from the limitations and deficiencies of the related art.

In accordance with one or more embodiments of the present invention, there is provided a support assembly for supporting one or more photovoltaic modules on a support surface. The support assembly comprises a ballast tray configured to accommodate one or more ballasts; at least one tubular member coupled to the ballast tray, the at least one tubular member configured to support one or more photovoltaic modules above a support surface; and at least one clamp member coupled to the at least one tubular member, the at least one clamp member including a looped end portion for receiving an edge portion of a photovoltaic module frame, and the at least one clamp member further including an upstanding portion configured to be disposed proximate to a side surface of the photovoltaic module frame when the at least one clamp member is engaged with the photovoltaic module frame.

In a further embodiment of the present invention, the at least one clamp member comprises a single body portion with a fastener member configured to secure the single body portion of the at least one clamp member to the photovoltaic module frame.

In yet a further embodiment, the at least one clamp member further comprises a downwardly extending projection, the downwardly extending projection capable of being disposed against an upper surface of the fastener member when the at least one clamp member is engaged with the photovoltaic module frame so that the downwardly extending projection is able to reduce stresses imparted on a middle portion of the at least one clamp member by supporting a portion of the weight of the photovoltaic module on the fastener member.

In still a further embodiment, when the fastener member of the at least one clamp member is tightened, the at least one clamp member is configured to deform the at least one tubular member so as to resist a rotation of the at least one clamp member about the at least one tubular member.

In yet a further embodiment, the at least one clamp member is selectively positionable along a length of the at least one tubular member so as to enable a user to select a particular mounting location on the photovoltaic module frame for the at least one clamp member.

In still a further embodiment, the at least one tubular member comprises a plurality of visual and/or tactile indicia formed thereon representing a plurality of predetermined mounting locations for the at least one clamp member.

In yet a further embodiment, the plurality of visual and/or tactile indicia formed on the at least one tubular member comprise a plurality of slots formed in the at least one tubular member, each of the plurality of slots being indicative of a respective one of the plurality of predetermined mounting locations.

In still a further embodiment, the at least one clamp member is rotatable relative to the at least one tubular member prior to the at least one clamp member being secured to the photovoltaic module frame so as to allow the support assembly to accommodate undulations and uneven regions of the support surface.

In yet a further embodiment, the at least one clamp member further comprises a generally horizontal landing surface for a bottom surface of the photovoltaic module frame so as to facilitate the engagement of the at least one clamp member with the photovoltaic module frame.

In still a further embodiment, the upstanding portion of the at least one clamp member comprises at least one serrated edge portion, the at least one serrated edge portion configured to provide integrated grounding for the one or more photovoltaic modules, and the at least one serrated edge portion further configured to resist an uplift of the one or more photovoltaic modules resulting from wind forces acting on the one or more photovoltaic modules.

In yet a further embodiment, the at least one tubular member comprises at least one tab member and the at least one clamp member comprises at least one slot that corresponds to the at least one tab member on the at least one tubular member; and wherein an engagement between the at least one tab member and the at least one slot limits a rotation of the at least one clamp member on the at least one tubular member so as to facilitate ease of installation of the one or more photovoltaic modules.

In still a further embodiment, the at least one tubular member comprises at least one slot and the at least one clamp member comprises at least one tab member that corresponds to the at least one slot in the at least one tubular member; and wherein an engagement between the at least one slot and the at least one tab member limits a rotation of the at least one clamp member on the at least one tubular member so as to facilitate ease of installation of the one or more photovoltaic modules.

In yet a further embodiment, the at least one tubular member comprises a pair of tubular members, each of the pair of tubular members being spaced apart from the other of the pair of tubular members across the ballast tray; and the at least one clamp member comprises a plurality of clamp members, at least a first one of the plurality of clamp members being coupled to a first one of the pair of tubular members and at least a second one of the plurality of clamp members being coupled to a second one of the pair of tubular members.

In still a further embodiment, the first one of the plurality of clamp members is disposed at a first elevation relative to the support surface and the second one of the plurality of clamp members is disposed at a second elevation relative to the support surface, the second elevation being higher than the first elevation.

In yet a further embodiment, the at least one clamp member is configured to be preassembled on the at least one tubular member.

In still a further embodiment, the at least one tubular member is configured to be preassembled on the ballast tray.

In yet a further embodiment, the support assembly further comprises at least one base clamp for coupling the at least one tubular member to the ballast tray.

In still a further embodiment, the at least one tubular member comprises at least one slot and the at least one base clamp comprises at least one tab member that corresponds to the at least one slot in the at least one tubular member; and wherein an engagement between the at least one slot and the at least one tab member allows the at least one tubular member to be rotatably converted from a shipping position to a mounting position.

In yet a further embodiment, the at least one tubular member comprises at least one tab member and the at least one base clamp comprises at least one slot that corresponds to the at least one tab member on the at least one tubular member; and wherein an engagement between the at least one tab member and the at least one slot allows the at least one tubular member to be rotatably converted from a shipping position to a mounting position.

In still a further embodiment, when the at least one tubular member is in the shipping position, the support assembly is configured to nest with one or more other support assemblies.

In yet a further embodiment, when the at least one tubular member is in the mounting position, rotational movement of the at least one tubular member relative to the at least one base clamp is restricted to a predetermined angular range so as to enhance an installation speed of the support assembly.

In still a further embodiment, when the at least one tubular member is in the mounting position, rotational movement of the at least one tubular member relative to the at least one base clamp is adjustable within a predetermined angular range so as to accommodate undulations of the support surface in a generally east-west direction.

In yet a further embodiment, the ballast tray is provided with one or more radiused edges configured to prevent damage to the support surface on which the support assembly is installed.

In still a further embodiment, the ballast tray is provided with one or more drainage apertures formed therethrough configured to drain water from the ballast tray.

In yet a further embodiment, the ballast tray is provided with a stamped pattern formed therein for increasing a structural rigidity of the ballast tray.

In accordance with one or more other embodiments of the present invention, there is provided a mounting system for supporting a plurality of photovoltaic modules on a support surface. The mounting system includes a plurality of support assemblies for supporting the plurality of photovoltaic modules on the support surface. Each of the plurality of support assemblies includes a ballast tray configured to accommodate one or more ballasts; at least one tubular member coupled to the ballast tray, the at least one tubular member configured to support one or more of the plurality of photovoltaic modules above the support surface; and at least one clamp member coupled to the at least one tubular member, the at least one clamp member configured to secure the one or more of the plurality of photovoltaic modules to the support assembly. The mounting system further includes one or more wind deflector members configured to deflect wind up and over at least some of the plurality of photovoltaic modules rather than under the at least some of the plurality of photovoltaic modules to reduce wind load, the one or more wind deflector members having a bottom edge portion and a top edge portion, the bottom edge portion of the one or more wind deflector members configured to be attached to one or more of the ballast trays, and the top edge portion of the one or more wind deflector members configured to be attached to one or more of the clamp members.

In a further embodiment of the present invention, at least one wind deflector section of the one or more wind deflector members comprises one or more apertures formed therein for generally equalizing a pressure above and below the at least some of the plurality of photovoltaic modules, and for ventilating the region beneath the at least some of the plurality of photovoltaic modules so as to reduce a temperature of the region beneath the at least some of the plurality of photovoltaic modules.

In yet a further embodiment, the one or more apertures formed in the at least one wind deflector section of the one or more wind deflector members further allow for dimensional differences in the at least some of the plurality of photovoltaic modules, and the one or more apertures further accommodate a thermal expansion and contraction of the at least one wind deflector section of the one or more wind deflector members.

In still a further embodiment, the top edge portion of at least one wind deflector section of the one or more wind deflector members is provided with an increased slope so as to increase an aerodynamic efficiency of the at least one wind deflector section of the one or more wind deflector members.

In yet a further embodiment, the bottom edge portion of at least one wind deflector section of the one or more wind deflector members is configured to be attached to the one or more of the ballast trays without the use of fasteners.

In still a further embodiment, the one or more of the ballast trays comprises a projection defining a slot for receiving the bottom edge portion of the at least one wind deflector section of the one or more wind deflector members.

In yet a further embodiment, the mounting system further comprises a fastener member, the top edge portion of at least one wind deflector section of the one or more wind deflector members being configured to be attached to the one or more of the clamp members by means of the fastener member.

In still a further embodiment, the plurality of support assemblies are configured to be nested together in a stacked arrangement.

In yet a further embodiment, one or more of the plurality of support assemblies are configured to be tucked underneath one or more of the plurality of photovoltaic modules at an end of a row of the plurality of photovoltaic modules.

In still a further embodiment, one or more of the plurality of support assemblies are configured to be tucked underneath one or more of the plurality of photovoltaic modules disposed in a north or south row of the plurality of photovoltaic modules.

In yet a further embodiment, the ballast tray is configured to contain fragmented portions of the one or more ballasts therein if the one or more ballasts become cracked or chipped, thereby preventing damage to the support surface resulting from the fragmented portions of the one or more ballasts.

In still a further embodiment, the mounting system further comprises at least one connector tube for coupling a first one of the plurality of support assemblies in a row of the plurality of photovoltaic modules to a second one of the plurality of support assemblies in the row, the at least one connector tube configured to be attached between a first the tubular member on the first one of the plurality of support assemblies and a second the tubular member of the second one of the plurality of support assemblies.

In yet a further embodiment, the at least one connector tube extends in a generally east-west direction of the plurality of photovoltaic modules, the at least one connector tube configured to provide additional structural support in the generally east-west direction and to distribute a load between the first and second ones of the plurality of support assemblies so that a ballast weight is capable of being reduced.

In still a further embodiment, the mounting system further comprises at least one connector member for coupling a first one of the plurality of support assemblies in a first row of the plurality of photovoltaic modules to a second one of the plurality of support assemblies in a second row of the plurality of photovoltaic modules, the at least one connector member extending in a generally north-south direction of the plurality of photovoltaic modules.

In yet a further embodiment, the mounting system further comprises one or more wire holding devices for accommodating one or more electrical wires of the plurality of photovoltaic modules.

In still a further embodiment, the tubular members of the plurality of support assemblies comprise an internal cavity disposed therein, one or more of the tubular members comprising a ballasting material disposed in the internal cavity thereof for ballasting the plurality of photovoltaic modules on the support surface.

In yet a further embodiment, the ballasting material comprises at least one of: (i) sand and (ii) gravel.

In still a further embodiment, the one or more of the plurality of tubular members are prefilled with the ballasting material prior to being installed in place on the support surface.

In accordance with yet one or more other embodiments of the present invention, there is provided a support assembly for supporting one or more photovoltaic modules on a support surface. The support assembly comprises a ballast tray configured to accommodate one or more ballasts; a pair of spaced-apart tubular members coupled to the ballast tray, each of the pair of spaced-apart tubular members configured to support one or more photovoltaic modules above a support surface, and at least one of the pair of spaced-apart tubular members extending in a generally east-west direction of the one or more photovoltaic modules; and a plurality of clamp members, at least a first one of the plurality of clamp members coupled to a first one of the pair of spaced-apart tubular members, and at least a second one of the plurality of clamp members coupled to a second one of the pair of spaced-apart tubular members, each of the plurality of clamp members configured to secure a respective photovoltaic module frame of the one or more photovoltaic modules to the support assembly.

In a further embodiment of the present invention, each of the pair of spaced-apart tubular members extends in the generally east-west direction of the one or more photovoltaic modules.

In yet a further embodiment, the first one of the pair of spaced-apart tubular members is generally linear in shape.

In still a further embodiment, the second one of the pair of spaced-apart tubular members has bent end portions and a generally straight middle portion.

In yet a further embodiment, the bent end portions of the second one of the pair of spaced-apart tubular members are disposed at a higher elevation than the first one of the pair of spaced-apart tubular members relative to the support surface.

In still a further embodiment, the support assembly further comprises a pair of spaced-apart channel members coupling the pair of spaced-apart tubular members to the ballast tray.

In accordance with still one or more other embodiments of the present invention, there is provided a support assembly for supporting one or more photovoltaic modules on a support surface. The support assembly comprises a pair of spaced-apart channel members, at least one of the pair of spaced-apart channel members configured to extend in a generally north-south direction of the one or more photovoltaic modules; a pair of spaced-apart tubular members coupled to the pair of spaced-apart channel members, each of the pair of spaced-apart tubular members configured to support one or more photovoltaic modules above a support surface, and at least one of the pair of spaced-apart tubular members configured to extend in a generally east-west direction of the one or more photovoltaic modules; and a plurality of clamp members, at least a first one of the plurality of clamp members coupled to a first one of the pair of spaced-apart tubular members, and at least a second one of the plurality of clamp members coupled to a second one of the pair of spaced-apart tubular members, each of the plurality of clamp members configured to secure a respective photovoltaic module frame of the one or more photovoltaic modules to the support assembly.

In a further embodiment of the present invention, the support assembly further comprises a ballast tray configured to accommodate one or more ballasts, the ballast tray configured to be coupled to the pair of spaced-apart channel members.

In yet a further embodiment, the ballast tray comprises one or more slots for receiving a cross-sectional portion of one of the pair of spaced-apart channel members.

In still a further embodiment, the support assembly further comprises a base clamp for coupling one of the pair of spaced-apart channel members to a respective one of the pair of spaced-apart tubular members.

In yet a further embodiment, each of the pair of spaced-apart tubular members is generally linear in shape.

In still a further embodiment, at least one of the pair of spaced-apart channel members comprises a cavity extending along a length thereof, the cavity of the at least one of the pair of spaced-apart channel members configured to form a wireway for one or more wires of the one or more photovoltaic modules.

In yet a further embodiment, at least one of the plurality of clamp members comprises a protrusion configured to engage one of the pair of spaced-apart tubular members so as to limit or prevent a rotation of the at least one of the plurality of clamp members on the one of the pair of spaced-apart tubular members.

In accordance with yet one or more other embodiments of the present invention, there is provided a mounting system for supporting a plurality of photovoltaic modules on a support surface. The mounting system includes a plurality of support assemblies for supporting the plurality of photovoltaic modules on the support surface. Each of the plurality of support assemblies includes at least one channel member; at least one tubular member coupled to the at least one channel member, the at least one tubular member configured to support one or more of the plurality of photovoltaic modules above the support surface; and at least one clamp member coupled to the at least one tubular member, the at least one clamp member configured to secure the one or more of the plurality of photovoltaic modules to the support assembly. The mounting system further includes one or more wind deflector members configured to deflect wind up and over at least some of the plurality of photovoltaic modules rather than under the at least some of the plurality of photovoltaic modules to reduce wind load, the one or more wind deflector members having a bottom edge portion and a top edge portion, the bottom edge portion of at least one wind deflector section of the one or more wind deflector members configured to be coupled to the at least one channel member, and the top edge portion of the at least one wind deflector section of the one or more wind deflector members configured to be coupled to the at least one clamp member.

In a further embodiment of the present invention, the mounting system comprises a wind deflector bracket, the wind deflector bracket configured to couple the bottom edge portion of the at least one wind deflector section of the one or more wind deflector members to the at least one channel member.

In still a further embodiment, the wind deflector bracket comprises one or more hook members and the at least one channel member comprises one or more corresponding slots, the one or more hook members of the wind deflector bracket configured to engage the one or more corresponding slots of the at least one channel member.

In yet a further embodiment, the top edge portion of the at least one wind deflector section of the one or more wind deflector members comprises one or more apertures formed therein for generally equalizing a pressure above and below the at least some of the plurality of photovoltaic modules, and for ventilating the region beneath the at least some of the plurality of photovoltaic modules so as to reduce a temperature of the region beneath the at least some of the plurality of photovoltaic modules.

In still a further embodiment, the one or more apertures formed in the at least one wind deflector section of the one or more wind deflector members are further configured to receive one or more respective fasteners for coupling the top edge portion of the at least one wind deflector section of the one or more wind deflector members to the at least one clamp member.

In yet a further embodiment, at least one of the plurality of support assemblies further comprises a ballast tray configured to accommodate one or more ballasts, the ballast tray configured to be coupled to the at least one channel member.

In still a further embodiment, the at least one wind deflector section of the one or more wind deflector members comprises one or more knockout panels configured to be removed from the at least one wind deflector section in order to accommodate the one or more ballasts.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 78 is a side elevational view of the partially exploded support assembly of FIG. 77;

FIG. 79 is a side elevational view of the support assembly of FIG. 73;

FIG. 83 is another top-side perspective view of the photovoltaic module array of FIG. 80A, wherein the photovoltaic module array is oriented in a north-facing manner;

FIG. 84 is a front elevational view of the photovoltaic module array of FIG. 80A, wherein the photovoltaic module array is oriented in a north-facing manner;

Throughout the figures, the same parts are always denoted using the same reference characters so that, as a general rule, they will only be described once.

DETAILED DESCRIPTION OF EMBODIMENTS OF THE INVENTION

Figure 1:
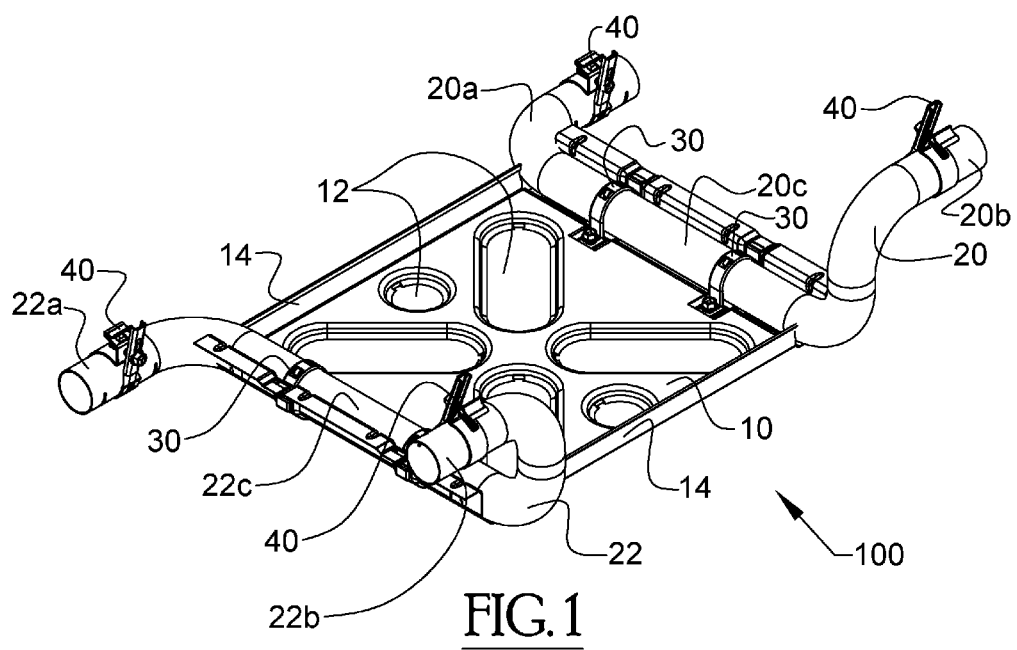
FIG. 1 is a top-side perspective view of a support assembly for photovoltaic modules, according to one illustrative embodiment of the invention.
Figure 2:
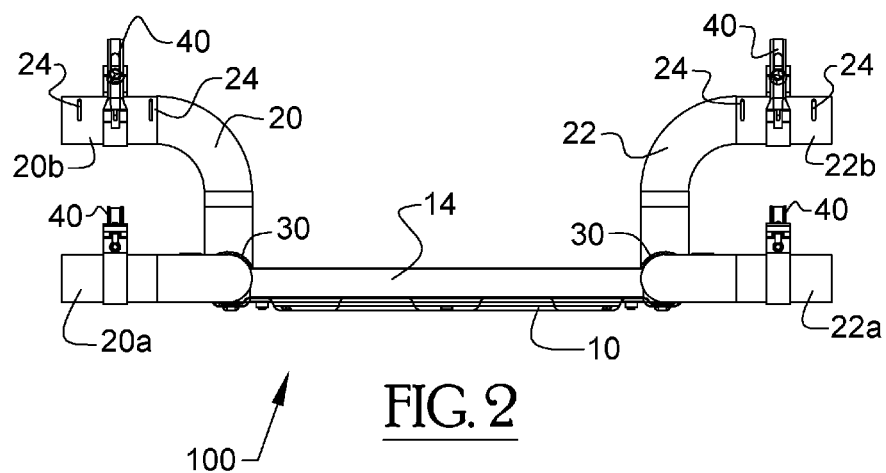
FIG. 2 is a front elevational view of the support assembly of FIG. 1.

One illustrative embodiment of a support assembly for supporting one or more photovoltaic modules on a support surface (e.g., a roof) is seen generally at 100 in FIGS. 1-6. As shown in these figures, the support assembly 100 generally includes a ballast tray 10 configured to accommodate one or more ballasts (e.g., ballasts 68—see FIG. 31); a pair of spaced-apart tubular members 20, 22 coupled to the ballast tray 10, the tubular members 20, 22 configured to support one or more photovoltaic modules 66 above a support surface (see FIG. 31); and one or more panel clamp members 40 coupled to the tubular members 20, 22. As best shown in FIGS. 39-44, the one or more panel clamp members 40 of the illustrative embodiment include a looped end portion 44 for receiving an edge portion of a photovoltaic module frame, and an upstanding portion 46 configured to be disposed proximate to a side surface of the photovoltaic module frame when the one or more panel clamp members 40 are engaged with the photovoltaic module frame.

Figure 3:
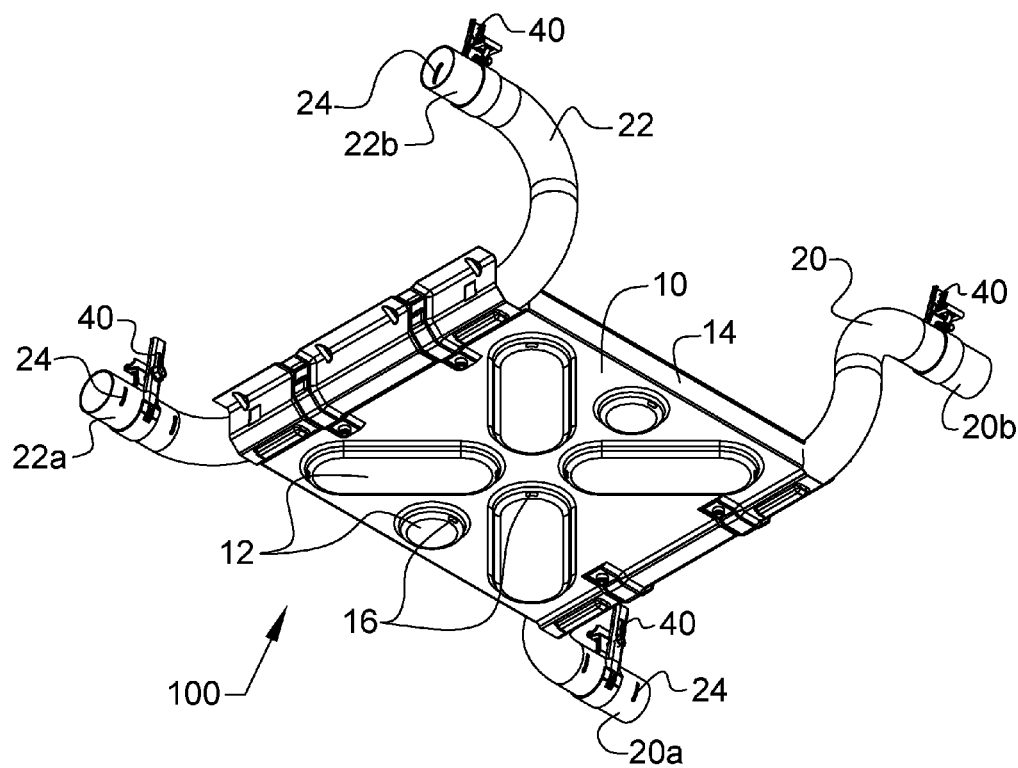
FIG. 3 is a bottom-side perspective view of the support assembly of FIG. 1.
Figure 4:
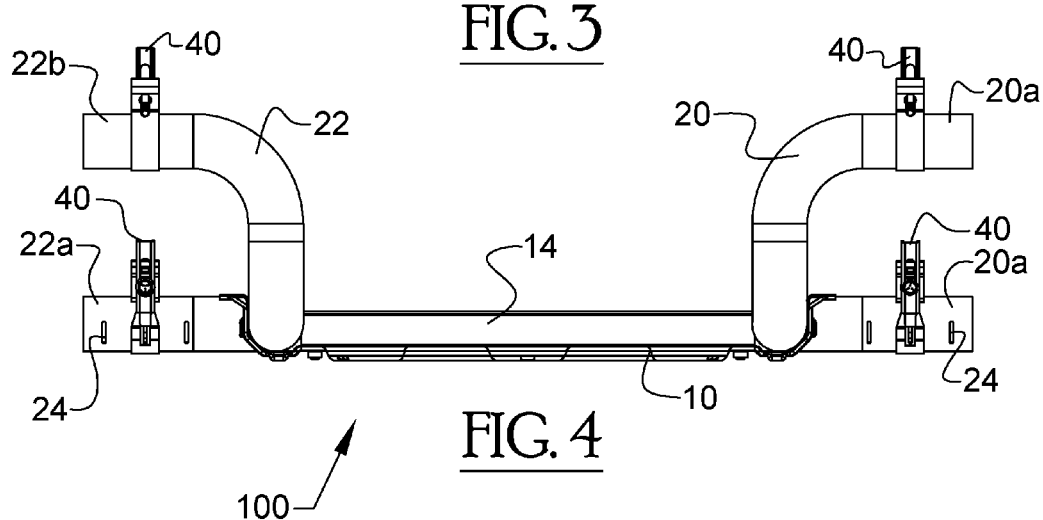
FIG. 4 is a rear elevational view of the support assembly of FIG. 1.

Initially, referring to primarily to FIGS. 1 and 3, the ballast tray 10 of the illustrative support assembly 100 will be described. As shown in these figures, the ballast tray or ballast pan 10 is provided with radiused edges configured to prevent damage to the support surface (e.g, the roof) on which the support assembly 100 is installed. For example, the radiused edges of the ballast tray 10 help to prevent the ballast tray 10 from puncturing or otherwise damaging the roof membrane. Also, as depicted in FIGS. 1 and 3, the ballast tray 10 is provided with a stamped pattern 12 formed therein for increasing a structural rigidity of the ballast tray 10. For example, in the illustrated embodiment, the stamped pattern 12 of the ballast tray 10 comprises four (4) elongated recesses arranged in an X-pattern, and two (2) circular recesses provided on north and south sides of the X-pattern of elongated recesses. Further, as illustrated in these figures, the ballast tray 10 is provided with a plurality of drainage apertures 16 formed therethrough configured to drain water from the ballast tray 10 (e.g., the drainage apertures 16 may be formed in the bottoms on the stamped recesses). Advantageously, the ballast tray 10 of the support assembly 100 is configured to contain fragmented portions of the one or more ballasts (e.g., ballasts 68—see FIG. 31) therein if the one or more ballasts 68 become cracked or chipped, thereby preventing damage to the support surface (e.g., the roof) resulting from the fragmented portions of the one or more ballasts 68. In order to contain the one or more ballasts 68 therein, the ballast tray 10 of the illustrated embodiment is provided with an upturned lip 14 on the north and south edges thereof (e.g., see FIG. 1), and is provided with upturned east and west side portions 18 (e.g., see FIGS. 1 and 6). The middle portion 20c, 22c of each tubular member 20, 22 is received within a respective channel disposed adjacent to a respective ones of the upturned side portions 18.

Figure 5:
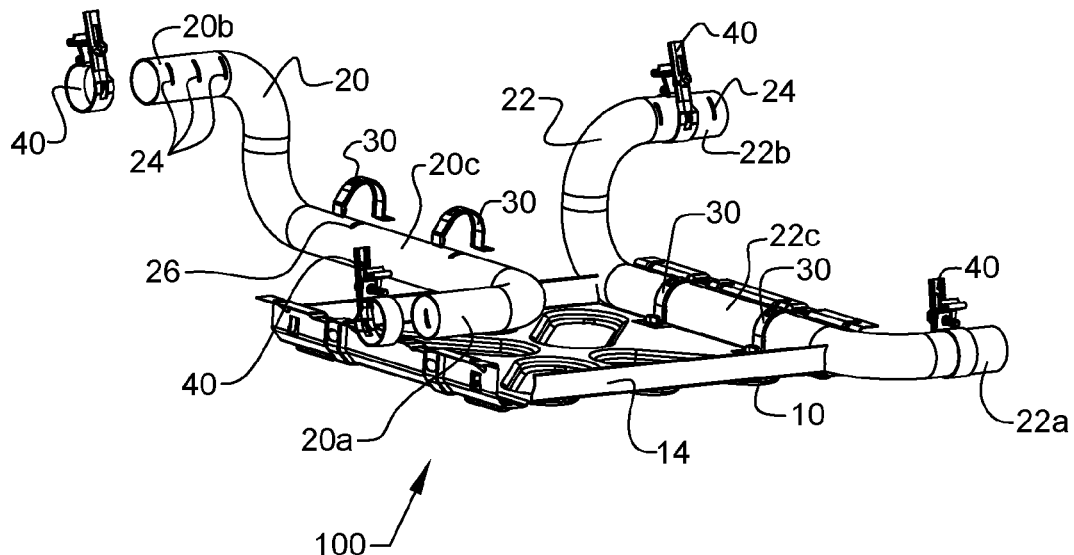
FIG. 5 is a partially exploded perspective view of the support assembly of FIG. 1, wherein one of the tubular members is exploded from the ballast tray in order to more clearly illustrate the manner in which the tubular member attaches to the ballast tray, and the manner in which the panel clamp member attaches to the tubular member.
Figure 6:
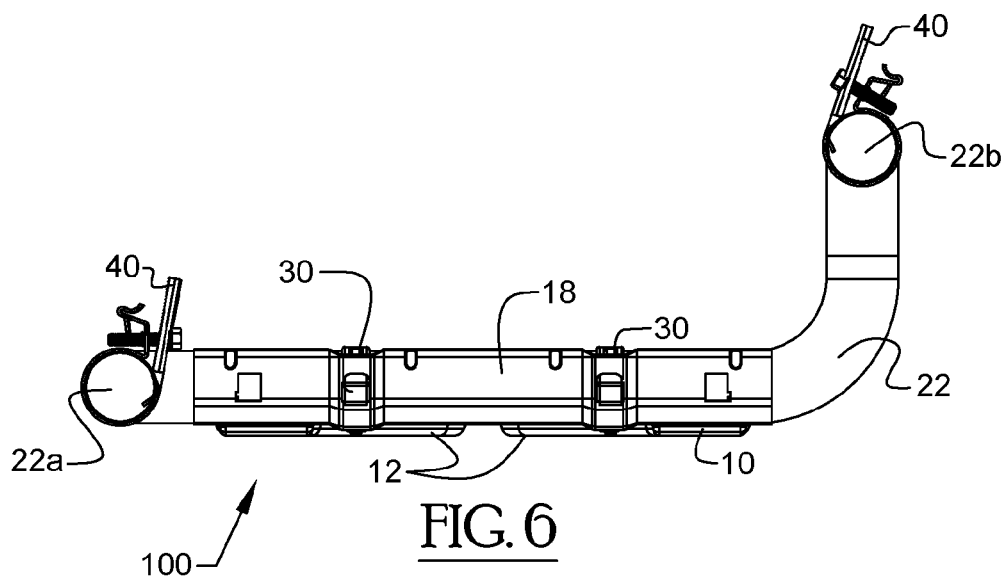
FIG. 6 is a side elevational view of the support assembly of FIG. 1.
Figure 7:
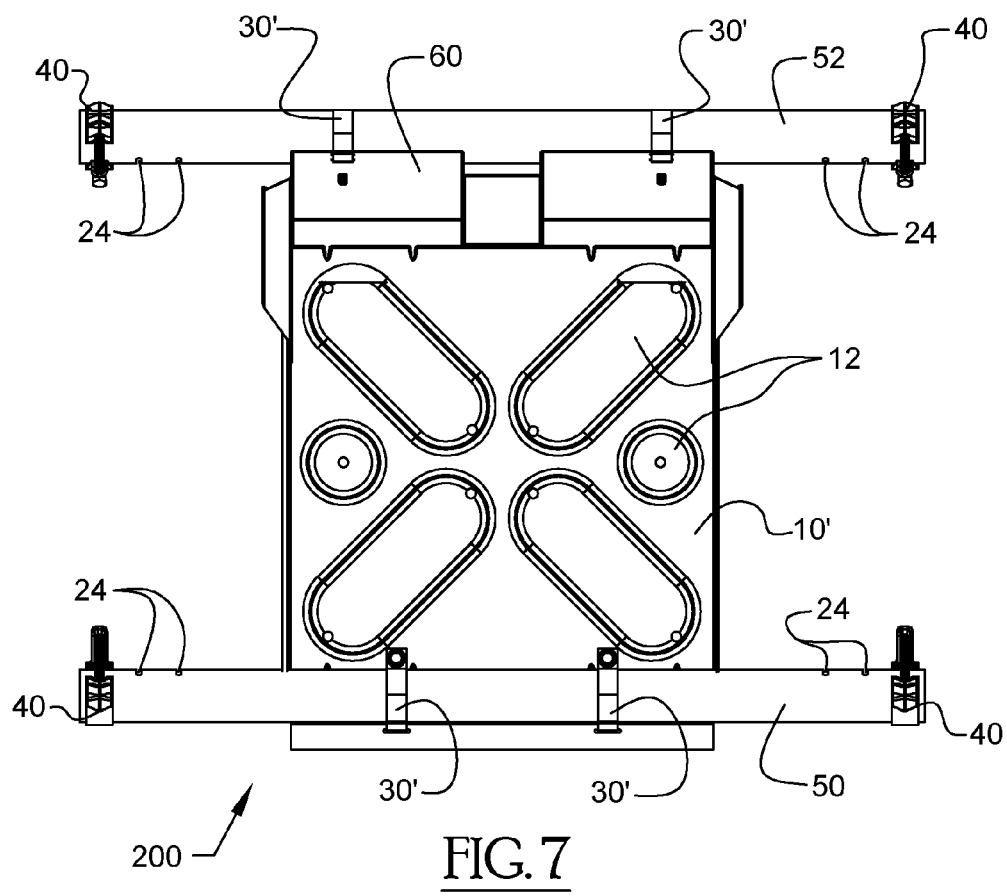
FIG. 7 is a top plan view of a support assembly for photovoltaic modules, according to another illustrative embodiment of the invention.
Figure 8:
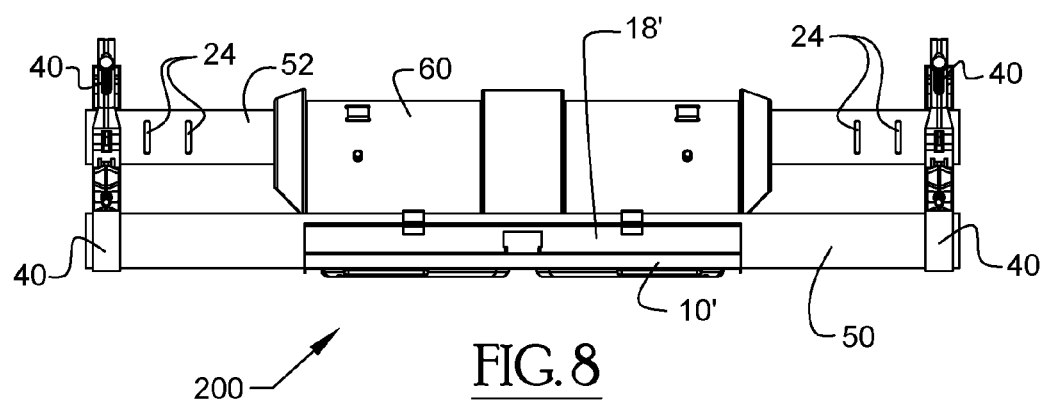
FIG. 8 is a front elevational view of the support assembly of FIG. 7.
Figure 41:
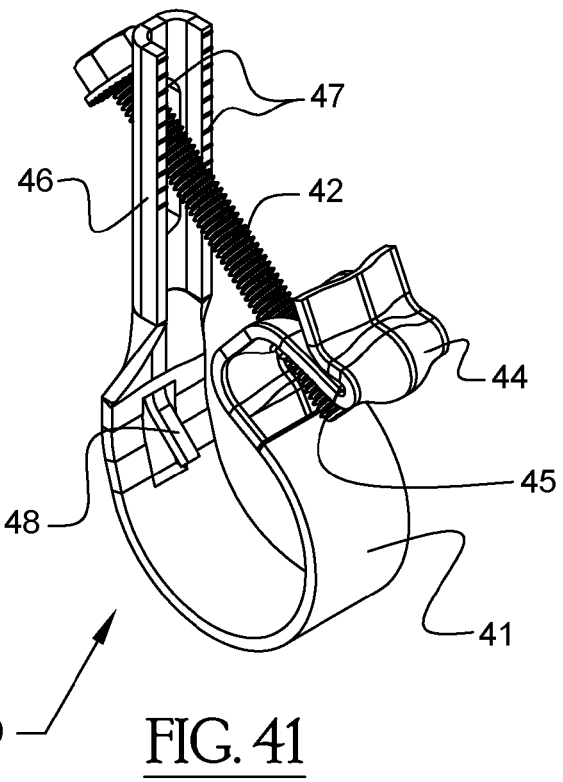
FIG. 41 is a first side perspective view of the panel clamp member of FIG. 39.
Figure 42:
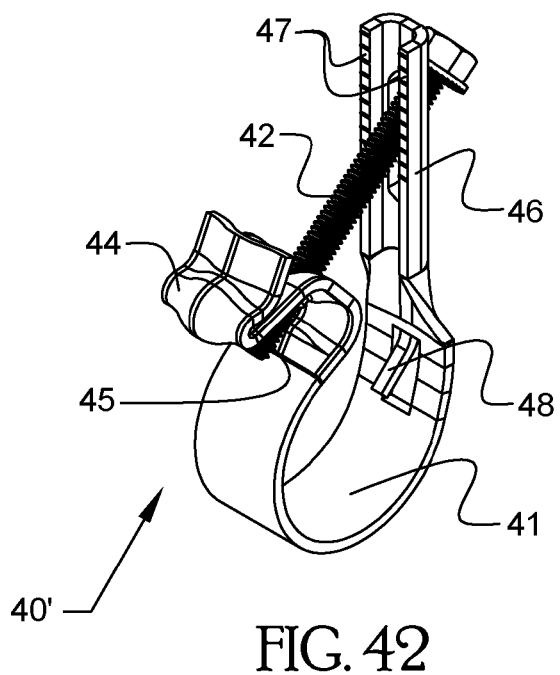
FIG. 42 is a second side perspective view of the panel clamp member of FIG. 39.
Figure 44:
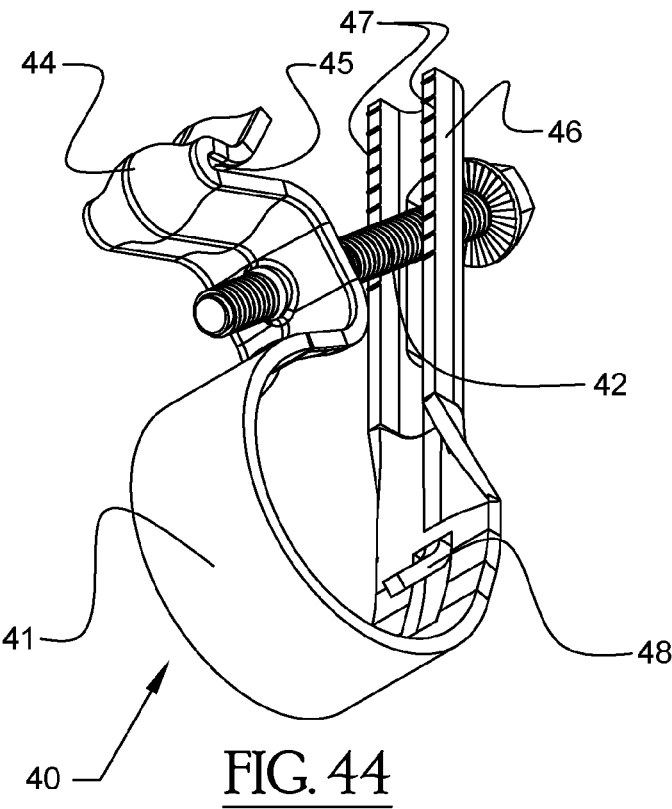
FIG. 44 is yet another side perspective view of the panel clamp member of FIG. 39.

With reference again to the illustrative embodiment of FIGS. 1-6, it can be seen that the pair of tubular members 20, 22 are spaced apart from one another across the ballast tray 10. As best shown in the perspective views of FIGS. 1 and 5, the first tubular member 20 has a first bent end portion 20a for supporting a photovoltaic module at a first elevation, a second bent end portion 20b for supporting a photovoltaic module at a second elevation that is higher than the first elevation relative to the support surface (e.g., the roof), and a middle portion 20c that connects the first and second end portions 20a, 20b to one another. Similarly, the second tubular member 22 has a first bent end portion 22a for supporting a photovoltaic module at a first elevation, a second bent end portion 22b for supporting a photovoltaic module at a second elevation that is higher than the first elevation relative to the support surface (e.g., the roof), and a middle portion 22c that connects the first and second end portions 22a, 22b to one another. In the embodiment of FIGS. 1-6, the longitudinal axes of the middle portions 20c, 22c of the tubular members 20, 22 generally extend in the north-south direction of the support assembly 100, but the longitudinal axes of the bent end portions 20a, 20b, 22a, 22b point in the east-west direction of the support assembly 100 (i.e., the bent end portions 20a, 20b, 22a, 22b are generally transversely oriented relative to the middle portions 20c, 22c of the tubular members 20, 22). Also, as depicted in FIGS. 3 and 5, the bent end portions 20a, 20b of the first tubular member 20 and the bent end portions 22a, 22b of the second tubular member 22 each comprises a plurality of spaced-apart slots 24 formed in the bent end portions 20a, 20b, 22a, 22b of the first and second tubular members 20, 22. The spaced-apart slots 24 serve as visual and tactile indicia for representing a plurality of predetermined mounting locations for the panel clamp members 40. Each of the spaced-apart slots 24 is indicative of a respective predetermined mounting location for a panel clamp member 40. Referring now to FIGS. 41, 42, and 44, it can be seen that each panel clamp member 40 comprises a slot alignment tab member 48 that engages with one of the slots 24 in the tubular members 20, 22. The engagement between the slot 24 in the tubular member 20, 22 and the tab member 48 of the panel clamp member 40 limits a rotation of the panel clamp member 40 on the tubular member 20, 22 so as to facilitate ease of installation of the photovoltaic modules 66.

In an alternative embodiment, the tubular members 20, 22 may be provided with tab members and the panel clamp members 40 may be provided with slots that engage with respective ones of the tab members of the tubular members 20, 22. In this alternative embodiment, the engagement between the tab member of the tubular member 20, 22 and the slot of the panel clamp member 40 limits a rotation of the panel clamp member 40 on the tubular member 20, 22 so as to facilitate ease of installation of the photovoltaic modules 66.

In the illustrative embodiment, the tubular members 20, 22 of the support assembly 100 comprise an internal cavity disposed therein (i.e., a central internal cavity). As such, in one or more alternative embodiments, the tubular members 20, 22 may comprise a ballasting material disposed in the internal cavity thereof for ballasting the plurality of photovoltaic modules 66 on the support surface (e.g., on the roof). In these alternative embodiments, the ballasting material in the internal cavities of the tubular members 20, 22 may be provided in addition to, or instead of the ballasts 68 described above. The ballasting material may comprise sand or gravel, or a combination of both sand and gravel. Also, in these alternative embodiments, the tubular members 20, 22 may be prefilled with the ballasting material prior to being installed in place on the support surface (e.g., prior to being installed in place on the roof).

Referring again to FIGS. 1-6, it can be seen that the tubular members 20, 22 of the support assembly 100 are coupled to the ballast tray 10 of support assembly 100 by means of base clamp members 30. In particular, as shown in FIGS. 1 and 5, each of the tubular members 20, 22 is secured to the ballast tray 10 by a pair of spaced-apart base clamp members 30 connected to the tubular member middle portions 20c, 22c. As best shown in the partially exploded perspective view of FIG. 5, the middle portion 20c, 22c of each tubular member 20, 22 comprises a pair of spaced-apart base clamp slots 26 that correspond to respective ones of the base clamp members 30. Each base clamp member 30 may comprise a tab member that corresponds to one of the slots 26 in the tubular members 20, 22 so that an engagement between the slot 26 and the tab member allows the tubular member 20, 22 to be rotatably converted from a shipping position to a mounting position.

In an alternative embodiment, the middle portions 20c, 22c of the tubular members 20, 22 may be provided with tab members and the base clamp members 30 may be provided with slots that engage with respective ones of the tab members of the tubular members 20, 22. In this alternative embodiment, the engagement between the tab member of the tubular member 20, 22 and the slot of the base clamp member 30 allows the tubular member 20, 22 to be rotatably converted from a shipping position to a mounting position.

Figure 31:
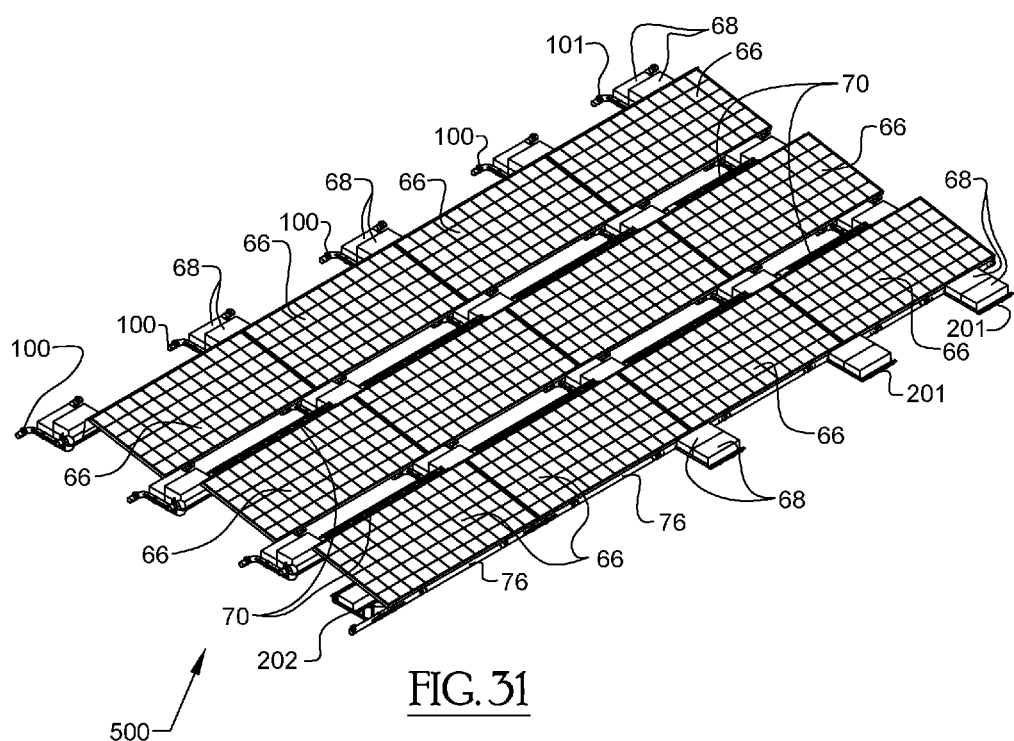
FIG. 31 is a top-side perspective view of the photovoltaic module array of FIG. 29.
Figure 32:
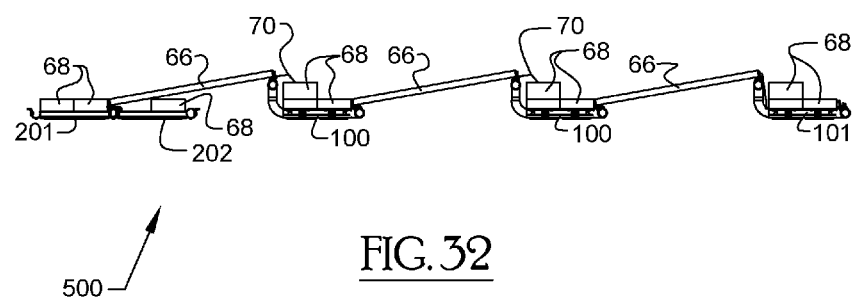
FIG. 32 is an east side elevational view of the photovoltaic module array of FIG. 29.

Next, with combined reference to FIGS. 1-6 and 41-44, the panel clamp members 40 of the illustrative support assembly 100 will be described. As depicted in the illustrative embodiment of FIGS. 1-5, it can be seen that a first pair of panel clamp members 40 are coupled to the first tubular member 20 and a second pair of panel clamp members 40 are coupled to the second tubular member 22. More particularly, each bent end portion 20a, 20b of the first tubular member 20 comprises a respective panel clamp member 40, and each bent end portion 22a, 22b of the second tubular member 22 comprises a respective panel clamp member 40. The panel clamp members 40 that are attached to the bent end portions 20b, 22b are disposed at higher elevations than the panel clamp members 40 that are attached to the bent end portions 20a, 22a so that the photovoltaic modules 66 are supported at angled orientations in the photovoltaic array (e.g., as shown in FIG. 31, the south edge of each photovoltaic module 66, which is supported by lower bent end portions 20a, 22a, is disposed at a lower elevation than the north edge of each photovoltaic module 66, which is supported by higher bent end portions 20b, 22b.

Figure 39:
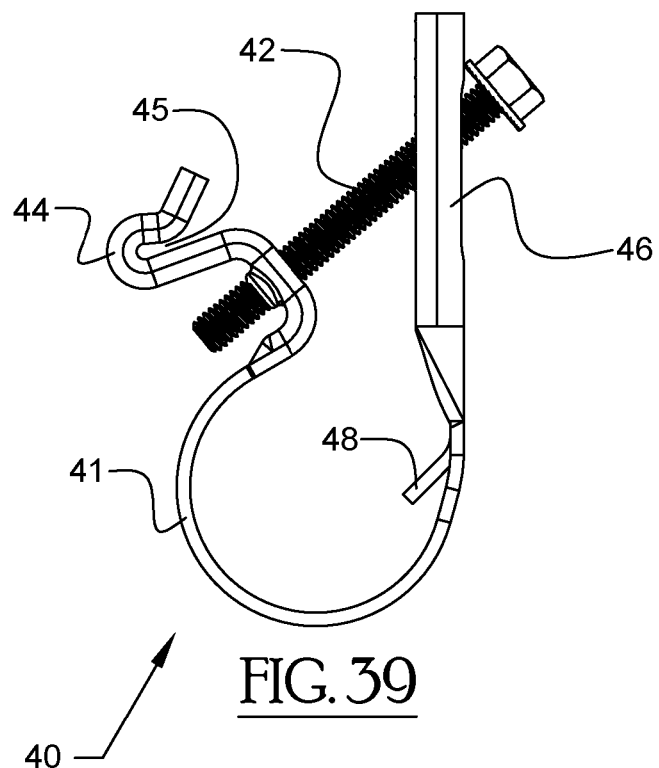
FIG. 39 is a side elevational view of a panel clamp member of the support assemblies described herein, according to one illustrative embodiment of the invention.
Figure 40:
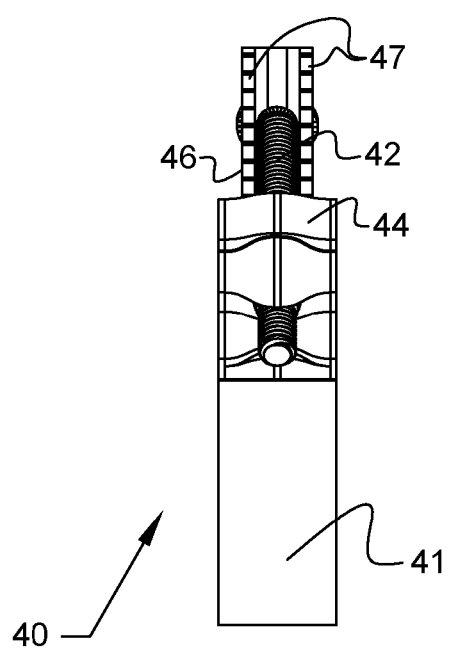
FIG. 40 is an end elevational view of the panel clamp member of FIG. 39.

Turning to the panel clamp drawings of FIGS. 41-44, the specific details of the illustrative panel clamp members 40 will be explained. As mentioned above, each of the panel clamp members 40 of the illustrative embodiment include a looped end portion 44 for receiving an edge portion of a photovoltaic module frame, and an upstanding portion 46 configured to be disposed proximate to a side surface of the photovoltaic module frame when the panel clamp member 40 is engaged with the photovoltaic module frame. As best shown in FIG. 44, the looped end portion 44 of the panel clamp member 40 forms a panel edge slot 45 for receiving an edge portion of a photovoltaic module frame, and the middle portion of the panel clamp member 40 comprises a generally horizontal landing surface for a bottom surface of the photovoltaic module frame at the opening to the panel edge slot 45 (see FIG. 44) so as to facilitate the engagement of the panel clamp member 40 with the photovoltaic module frame. In FIGS. 41, 42, and 44, it can be seen that the looped end portion 44 of the panel clamp member 40 is oppositely disposed with respect to the upstanding portion 46, and that the looped end portion 44 is connected to the upstanding portion 46 by the semi-circular tube receiving portion 41 of the panel clamp member 40. When the panel clamp member 40 is assembled on one of the tubular members 20, 22, the semi-circular tube receiving portion 41 of the panel clamp member 40 partially circumscribes the tubular member 20, 22. The tube receiving portion 41, the looped end portion 44, and the upstanding portion 46 are each part of the single body portion of the panel clamp member 40 (e.g., the panel clamp member 40 may be formed from a single piece of metal). Also, as shown in FIGS. 41, 42, and 44, the panel clamp member 40 is provided with a fastener member 42 (e.g., a threaded bolt or screw) that secures the single body portion of the panel clamp member 40 to the photovoltaic module frame. When the fastener member 42 of the panel clamp member 40 is tightened, the panel clamp member 40 is configured to deform the wall of the tubular member 20, 22 to which it is secured so as to resist a rotation of the panel clamp member 40 about the tubular member 20, 22. As shown in FIGS. 39, 41, and 44, the fastener member 42 of the panel clamp member 40 passes through an elongated slot in the upstanding portion 46 and a threaded aperture beneath the looped end portion 44.

The panel clamp member 40 is selectively positionable along a length of the tubular member 20, 22 so as to enable a user to select a particular mounting location on photovoltaic module frame for the panel clamp member 40 (e.g., as explained above, the tab member 48 of the panel clamp member 40 can be engaged with a selected one of the elongate panel clamp slots 24 in the bent end portion 20a, 20b, 22a, 22b of the tubular member 20, 22). Also, to permit installation flexibility and adjustability, the panel clamp member 40 is rotatable relative to the tubular member 20, 22 prior to the panel clamp member 40 being secured to the photovoltaic module frame so as to allow the support assembly 100 to accommodate undulations (e.g., north-south undulations) and uneven regions of the support surface (e.g., the roof on which the photovoltaic array is mounted).

Figure 43A:
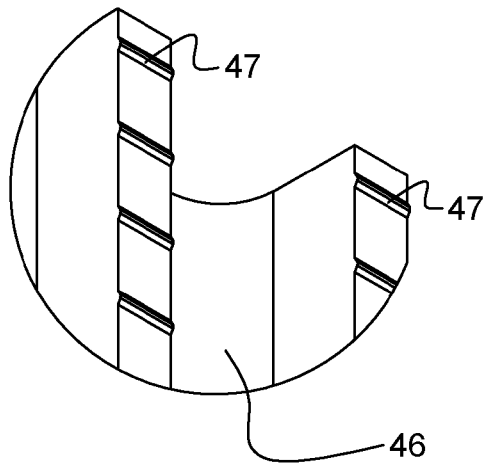
FIG. 43A is an enlarged perspective view of the serrations on the upstanding portion of the panel clamp member illustrated in the side perspective view of FIG. 43B (Detail "A")
Figure 43B:
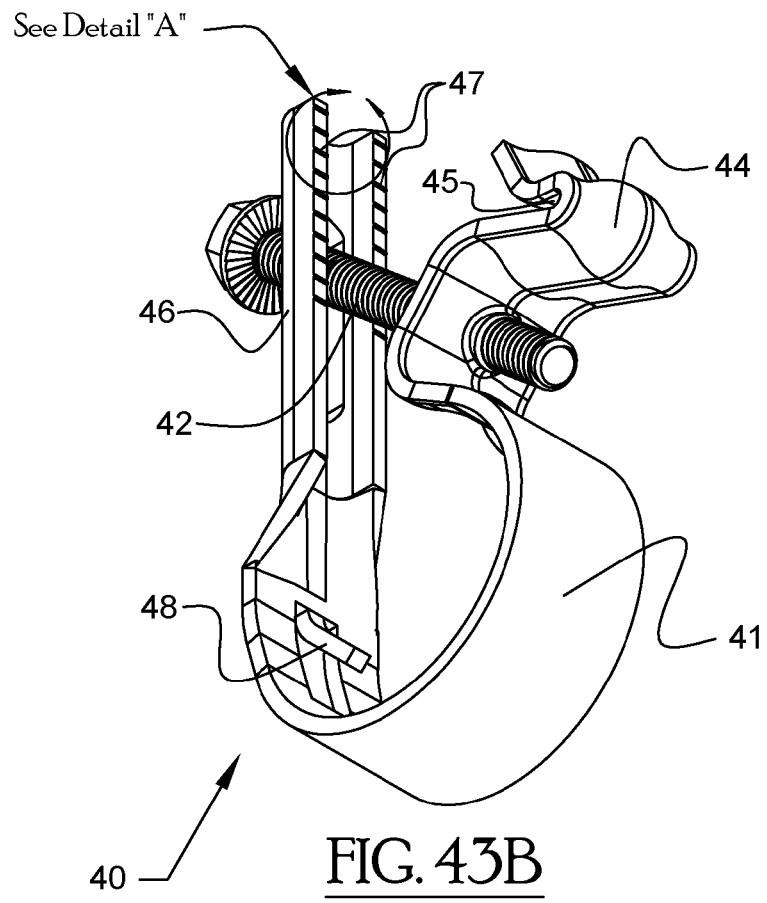
FIG. 43B is another side perspective view of the panel clamp member of FIG. 39.

As depicted in FIGS. 43A and 43B, the upstanding portion 46 of the panel clamp member 40, which is configured to be disposed proximate to a side surface of the photovoltaic module frame when the panel clamp member 40 is engaged with the photovoltaic module frame, comprises parallel edge portions with a plurality of serrations 47 spaced apart along the lengths of each panel clamp edge portion. The serrations 47 on each serrated edge portion of the panel clamp member 40 are configured to provide integrated grounding for one or more photovoltaic modules 66. Also, the serrations 47 on each serrated edge portion are further configured to resist an uplift of the one or more photovoltaic modules resulting from wind forces acting on the one or more photovoltaic modules 66.

Figure 45:
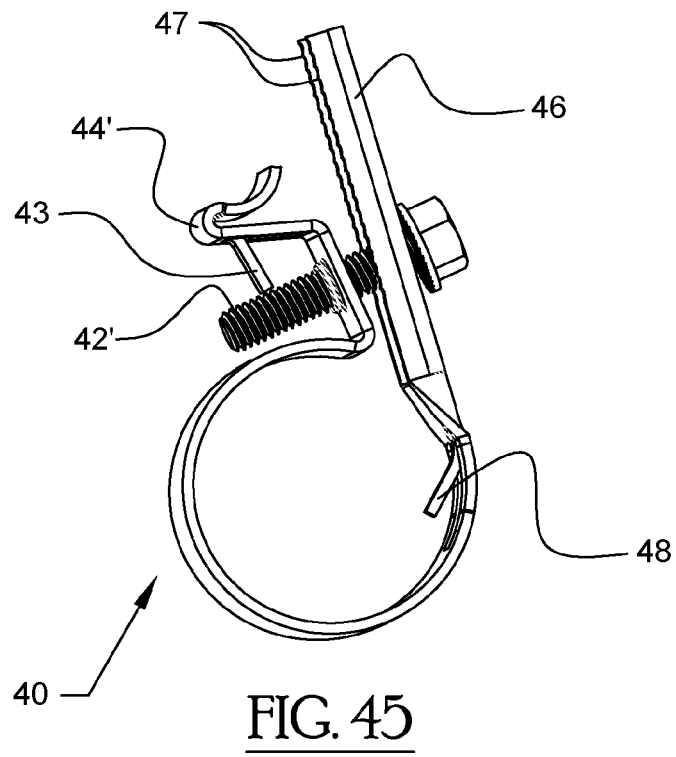
FIG. 45 is a side perspective view of another panel clamp member of the support assemblies described herein, according to another illustrative embodiment of the invention, wherein the panel clamp member of FIG. 45 is additionally provided with a downwardly extending projection that is capable of resting on the upper surface of the panel clamp fastener.
Figure 46:
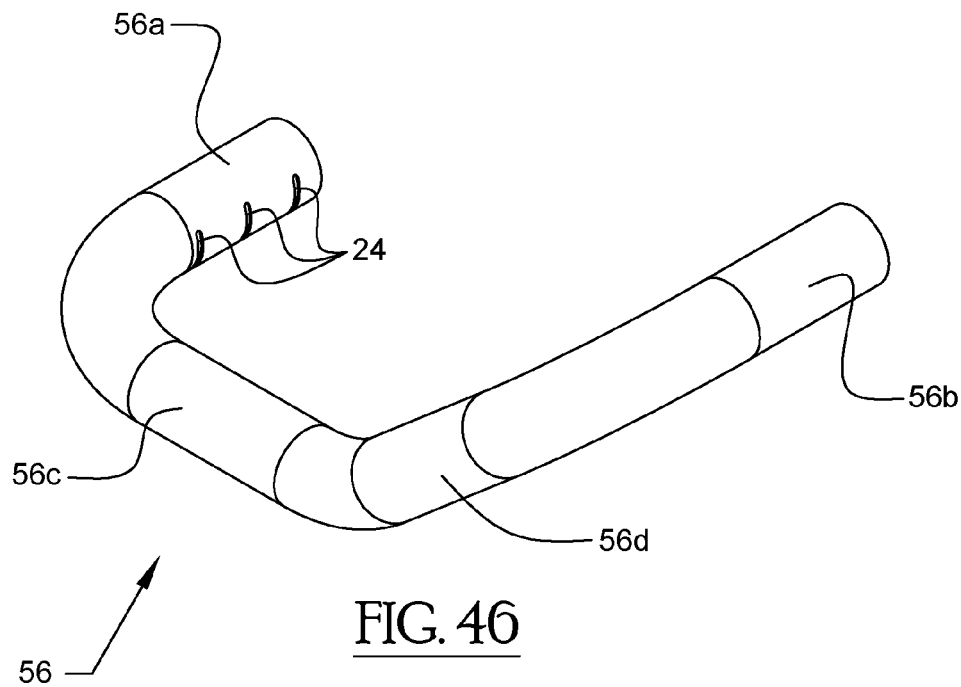
FIG. 46 is a perspective view of a tubular member of the support assembly depicted in the embodiment of FIGS. 22-28.
Figure 47:
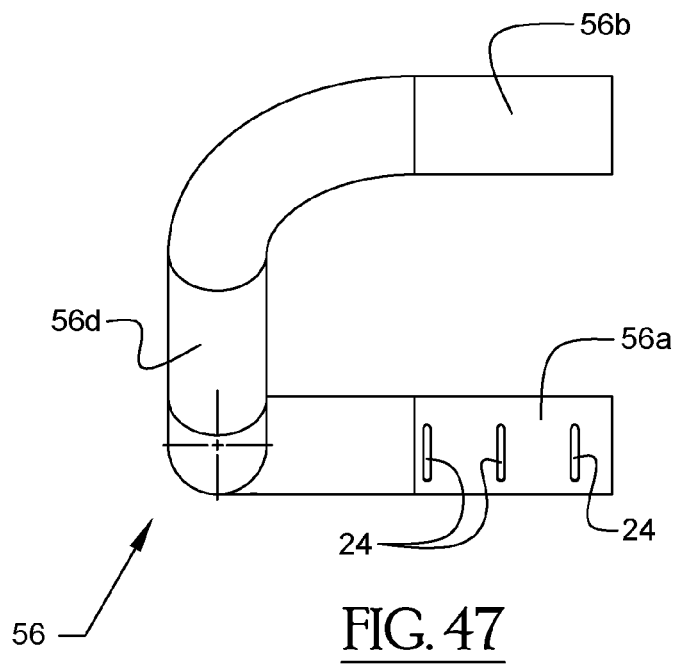
FIG. 47 is a side elevational view of the tubular member of FIG. 46.
Figure 48A:
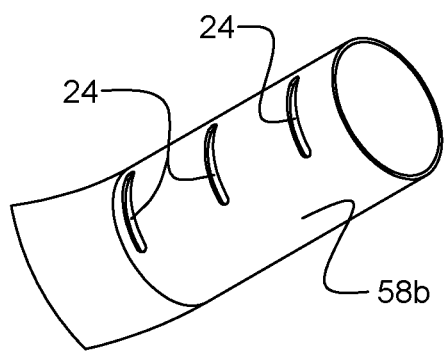
FIG. 48A is an enlarged perspective view of the panel clamp slots on the end portion of the tubular member illustrated in the perspective view of FIG. 48B (Detail "B")
Figure 48B:
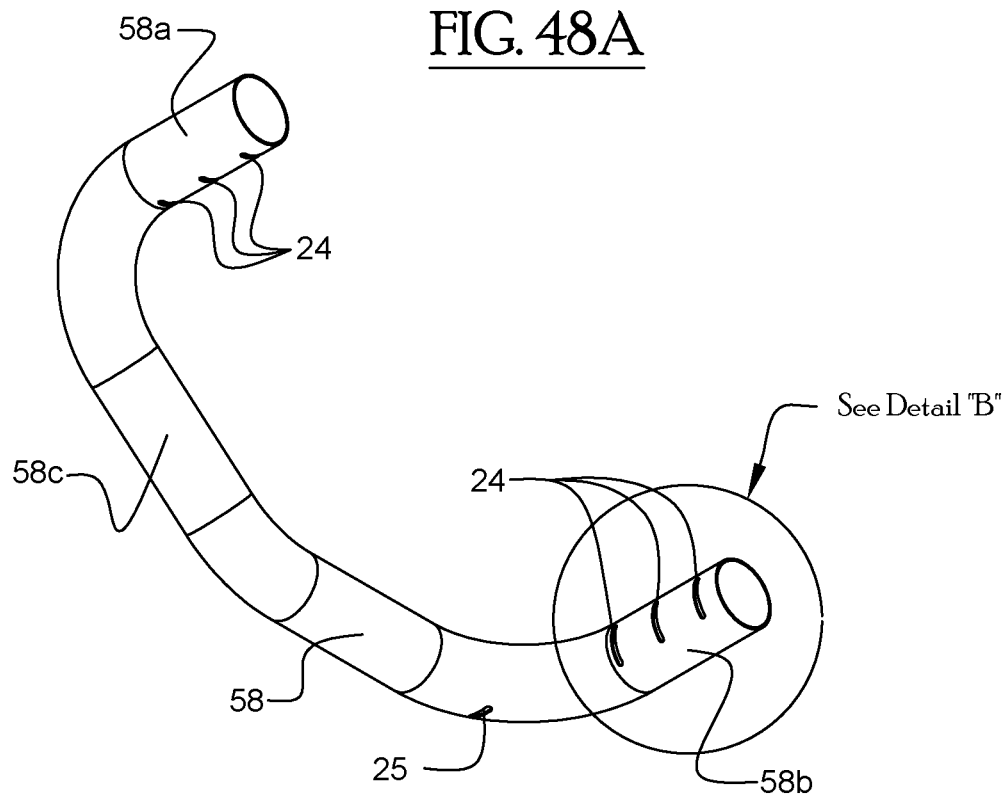
FIG. 48B is another perspective view of the tubular member of FIG. 46.
Figure 49:
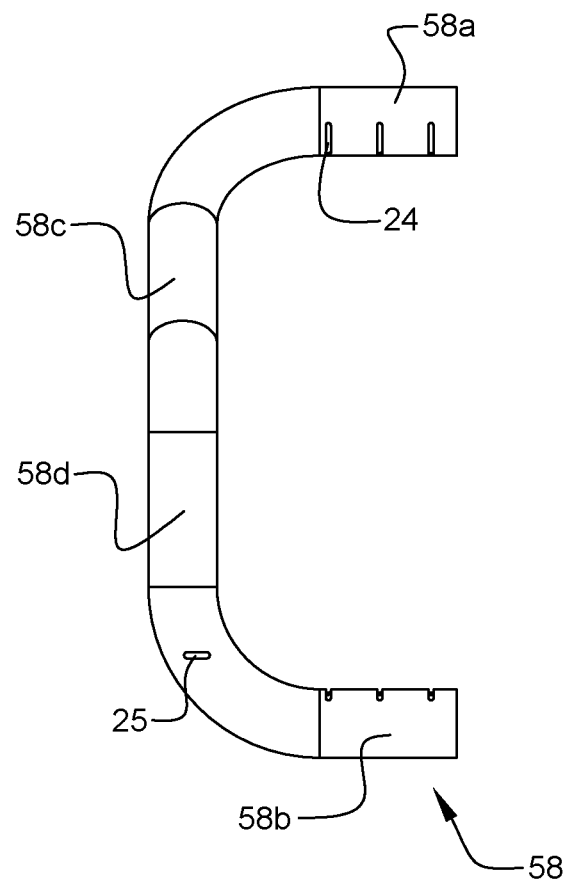
FIG. 49 is a bottom plan view of the tubular member of FIG. 46.

An alternative embodiment of the panel clamp member is depicted in FIG. 45. The panel clamp member 40' of FIG. 45 is similar in many respects to the aforedescribed panel clamp member 40 of FIGS. 41-44. That is, like the panel clamp member 40, the panel clamp member 40' of FIG. 45 includes a fastener member 42', a looped end portion 44', an upstanding portion 46 with serrations 47, and a tab member 48. Although, unlike the panel clamp member 40, the panel clamp member 40' of FIG. 45 further includes a downwardly extending projection or leg 43. The downwardly extending leg 43 of the panel clamp member 40' is capable of being disposed against an upper surface of the fastener member 42' (see FIG. 45) when the panel clamp member 40' is engaged with the photovoltaic module frame so that the downwardly extending leg 43 is able to reduce stresses imparted on a middle portion of the panel clamp member 40' by supporting a portion of the weight of the photovoltaic module 66 on the fastener member 42'.

Another illustrative embodiment of a support assembly for supporting one or more photovoltaic modules on a support surface (e.g., a roof) is seen generally at 200 in FIGS. 7-14. Referring to these figures, it can be seen that, in some respects, the illustrative embodiment of FIGS. 7-14 is similar to that of the embodiment of FIGS. 1-6. Moreover, many elements are common to both such embodiments. For the sake of brevity, the elements that the embodiment of the support assembly of FIGS. 7-14 has in common with the embodiment of FIGS. 1-6 will not be discussed because these components have already been explained in detail above. Furthermore, in the interest of clarity, these elements are denoted using the same reference characters that were used in the embodiment of FIGS. 1-6.

Figure 13:
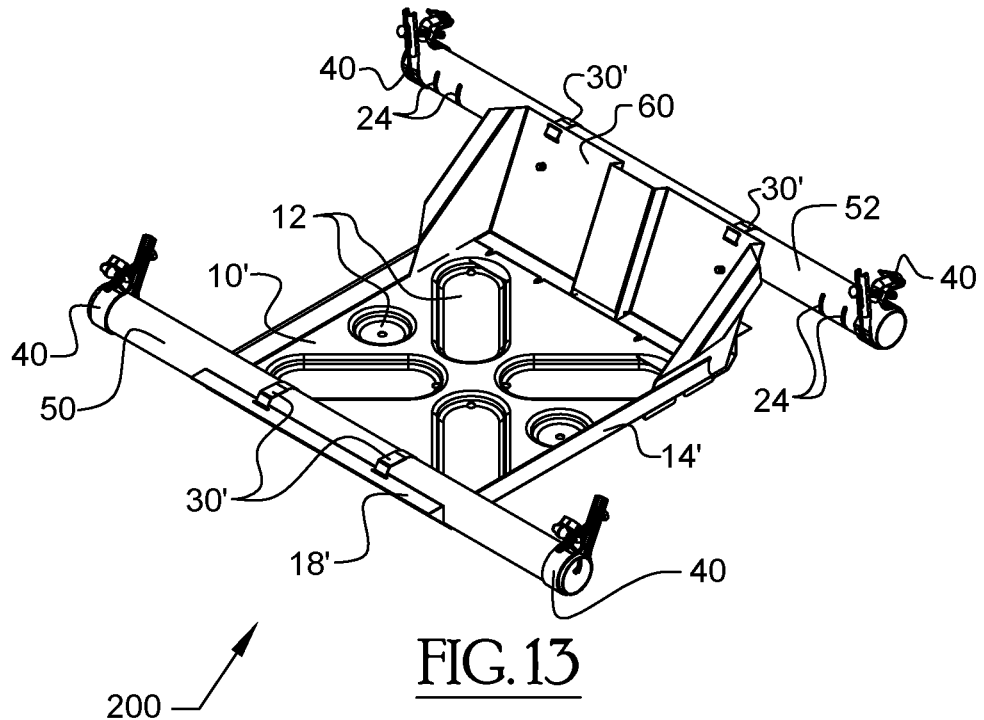
FIG. 13 is a top-side perspective view of the support assembly of FIG. 7.
Figure 14:
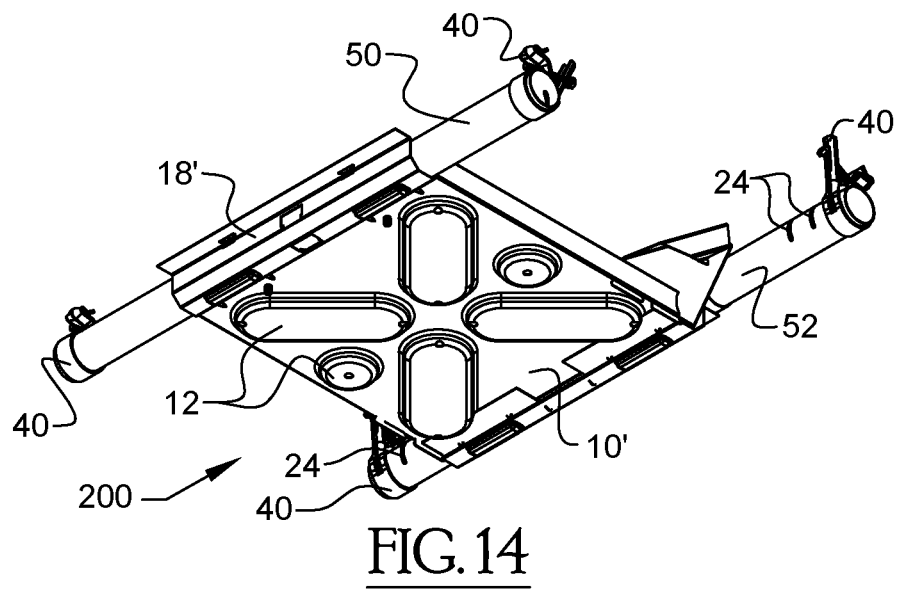
FIG. 14 is a bottom-side perspective view of the support assembly of FIG. 7.

Like the support assembly 100 described above, the support assembly 200 of FIGS. 7-14 generally includes a ballast tray 10' configured to accommodate one or more ballasts (e.g., ballasts 68—see FIG. 31); a pair of spaced-apart tubular members 50, 52 coupled to the ballast tray 10', each of the spaced-apart tubular members 50, 52 configured to support one or more photovoltaic modules 66 above a support surface (see FIG. 31), and a plurality of panel clamp members 40 coupled to the tubular members 50, 52. As shown in FIG. 13, a first pair of panel clamp members 40 is coupled to a first one 50 of the pair of spaced-apart tubular members 50, 52, and a second pair of panel clamp members 40 is coupled to a second one 52 of the pair of spaced-apart tubular members 50, 52. Each of the panel clamp members 40 is configured to secure a respective photovoltaic module frame of the one or more photovoltaic modules 66 to the support assembly 200.

However, unlike the support assembly 100 described above with regard to FIGS. 1-6, each of the spaced-apart tubular members 50, 52 of the support assembly 200 extends in a generally east-west direction of the one or more photovoltaic modules 66, rather than in a north-south direction, as described above for the embodiment of FIGS. 1-6. Also, referring to FIGS. 7, 9, 11, and 13, it can be see that, in the illustrative embodiment of FIGS. 7-14, each of the tubular members 50, 52 of the support assembly 200 is generally linear in shape (e.g., each of the tubular members 50, 52 has a straight pipe configuration). Advantageously, in the support assembly 200, the first and second tubular members 50, 52 are identical in form so that a single tube part can be interchangeably used for the both the first and second tubular members 50, 52, thereby reducing the part costs of the support assembly 200 by obviating the need for different tubes to be formed for each of the first and second tubular members 50, 52.

Figure 9:
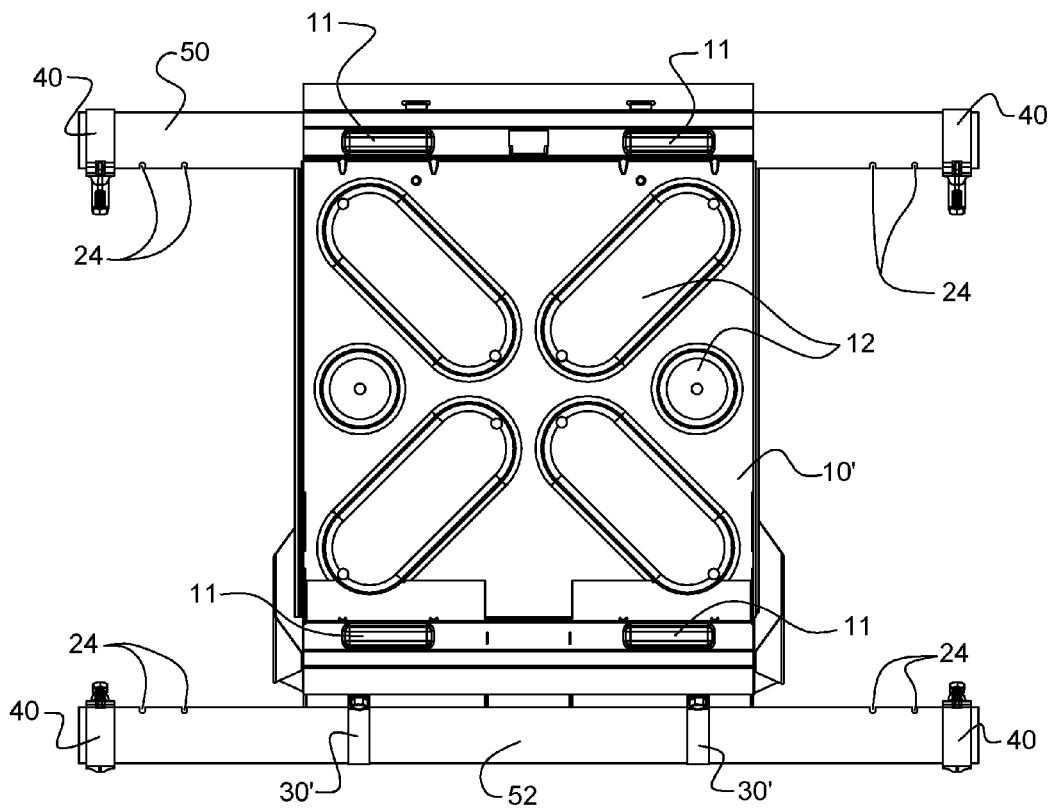
FIG. 9 is a bottom plan view of the support assembly of FIG. 7.
Figure 10:
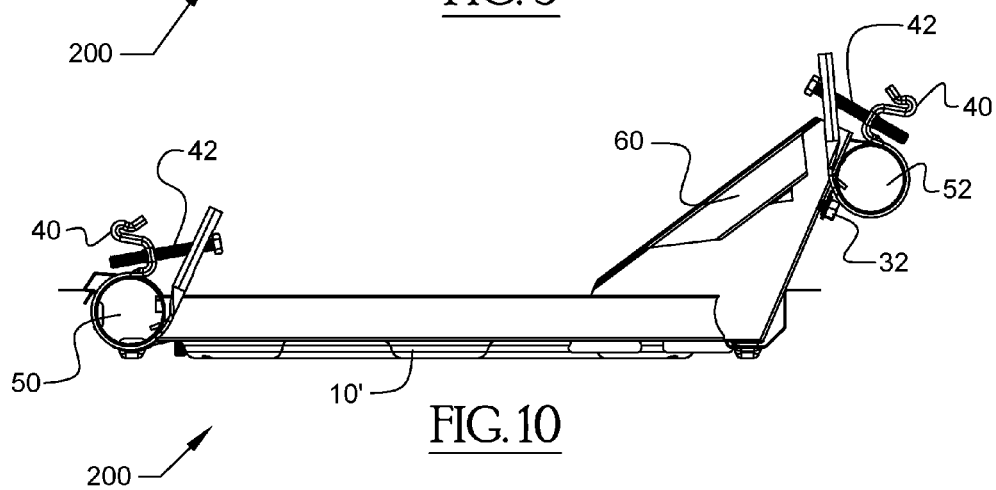
FIG. 10 is a side elevational view of the support assembly of FIG. 7.
Figure 11:
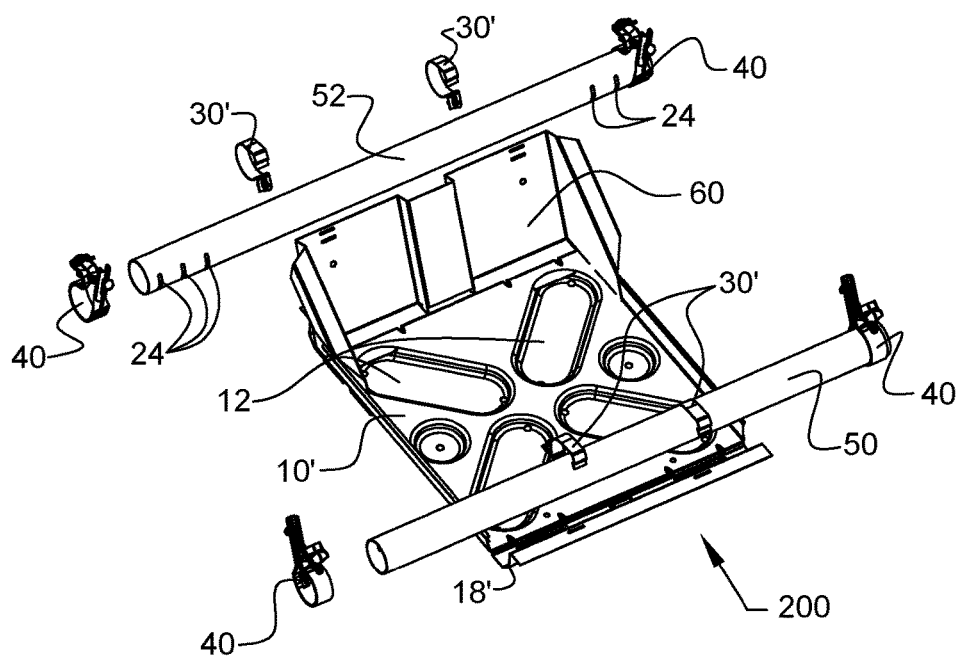
FIG. 11 is a partially exploded perspective view of the support assembly of FIG. 7, wherein the tubular members are exploded from the ballast tray in order to more clearly illustrate the manner in which the tubular members attach to the ballast tray, and the manner in which the panel clamp members attach to the tubular members.
Figure 12:
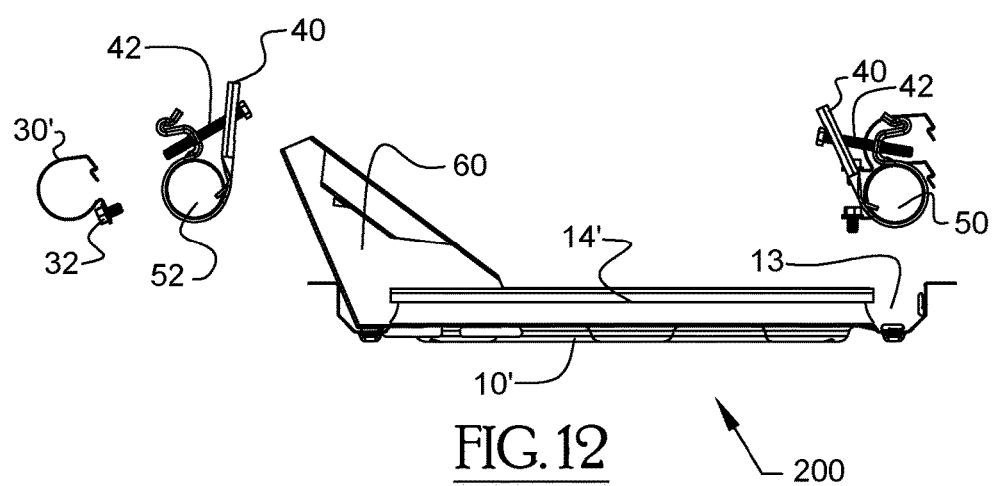
FIG. 12 is a side elevational view of the partially exploded support assembly of FIG. 11.

Referring to FIGS. 10-13, it can be seen that the support assembly 200 comprises a high-side connector member 60 for elevating the second tubular member 52 above the ballast tray 10' so that the second tubular member 52 is disposed at a higher elevation relative to the support surface (e.g., the roof) as compared to the first tubular member 50. In addition to supporting the second tubular member 52, the high-side connector member 60 also advantageously operates as a wind deflector configured to deflect wind up and over one or more photovoltaic modules 66 in an array rather than under the one or more photovoltaic modules 66. Similar to that described above for the tubular members 20, 22 of the support assembly 100, the tubular members 50, 52 of the support assembly 200 are coupled to the ballast tray 10' by means of base clamp members 30'. In particular, as shown in FIGS. 9 and 13, the low-side tubular member 50 is secured to front end of the ballast tray 10' by a pair of spaced-apart base clamp members 30', while the high-side tubular member 52 is secured to the upper edge portion of the high-side connector member 60 by a pair of spaced-apart base clamp members 30'. As shown in the side view of FIG. 12, the low-side tubular member 50 is received within tube receiving channel 13.

As shown in the bottom plan view of FIG. 9, the bottom of the ballast tray 10' is provided with a plurality of ballast tray feet 11 for resting against the support surface (e.g., roof) on which the ballast tray 10' is disposed. Similar to that described above for the embodiment of FIGS. 1-6, in order to contain the one or more ballasts 68 therein, the ballast tray 10' of the embodiment of FIGS. 7-14 is provided with an upturned lip 14' on the east and west edges thereof (e.g., see FIGS. 12 and 13), and is provided with upturned side portions 18' on the north and south sides thereof (e.g., see FIGS. 8, 11, 13, and 14). The low-side tubular member 50 is received within the tube receiving channel 13 disposed adjacent to the north upturned side portion 18' of the ballast tray 10'.

Yet another illustrative embodiment of a support assembly for supporting one or more photovoltaic modules on a support surface (e.g., a roof) is seen generally at 300 in FIGS. 15-21. Referring to these figures, it can be seen that, in some respects, the illustrative embodiment of FIGS. 15-21 is similar to that of the embodiment of FIGS. 1-6 and the embodiment of FIGS. 7-14. Moreover, many elements are common to all of these embodiments. For the sake of brevity, the elements that the embodiment of the support assembly of FIGS. 15-21 has in common with the embodiments of FIGS. 1-6 and 7-14 will not be discussed because these components have already been explained in detail above. Furthermore, in the interest of clarity, these elements are denoted using the same reference characters that were used in the embodiments of FIGS. 1-6 and 7-14.

Figure 15:
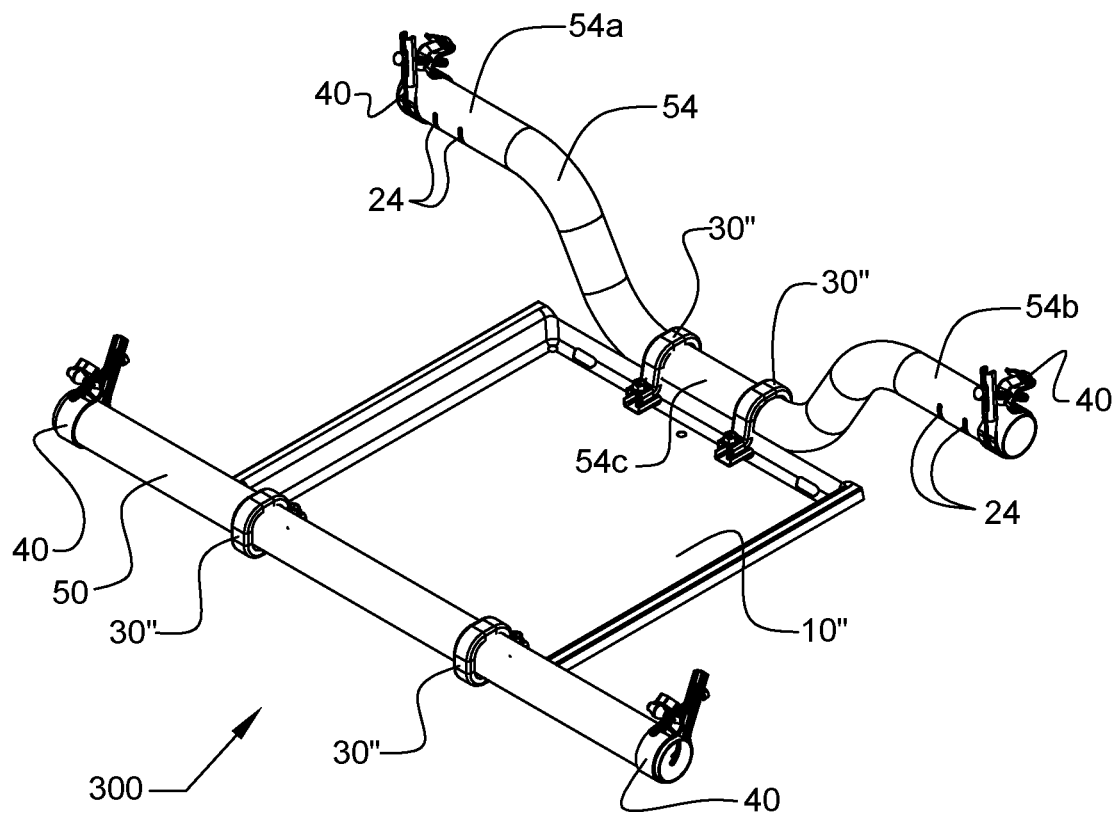
FIG. 15 is a top-side perspective view of a support assembly for photovoltaic modules, according to yet another illustrative embodiment of the invention.
Figure 16:
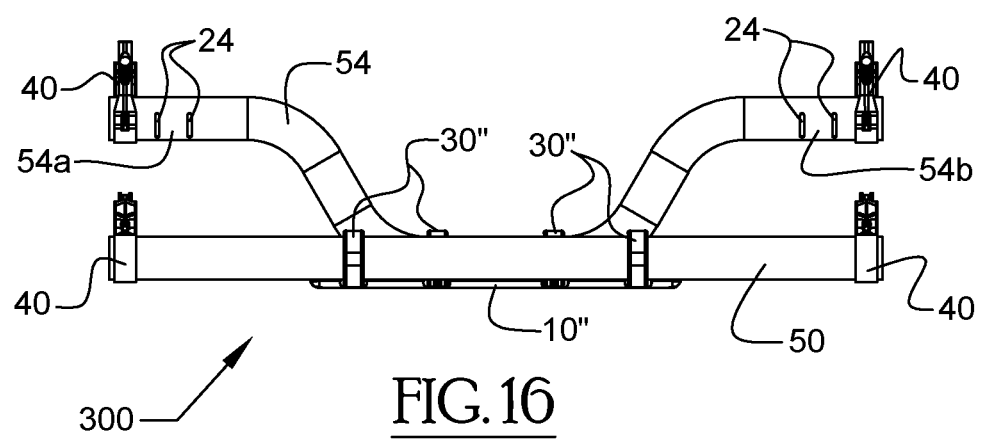
FIG. 16 is a front elevational view of the support assembly of FIG. 15.
Figure 17:
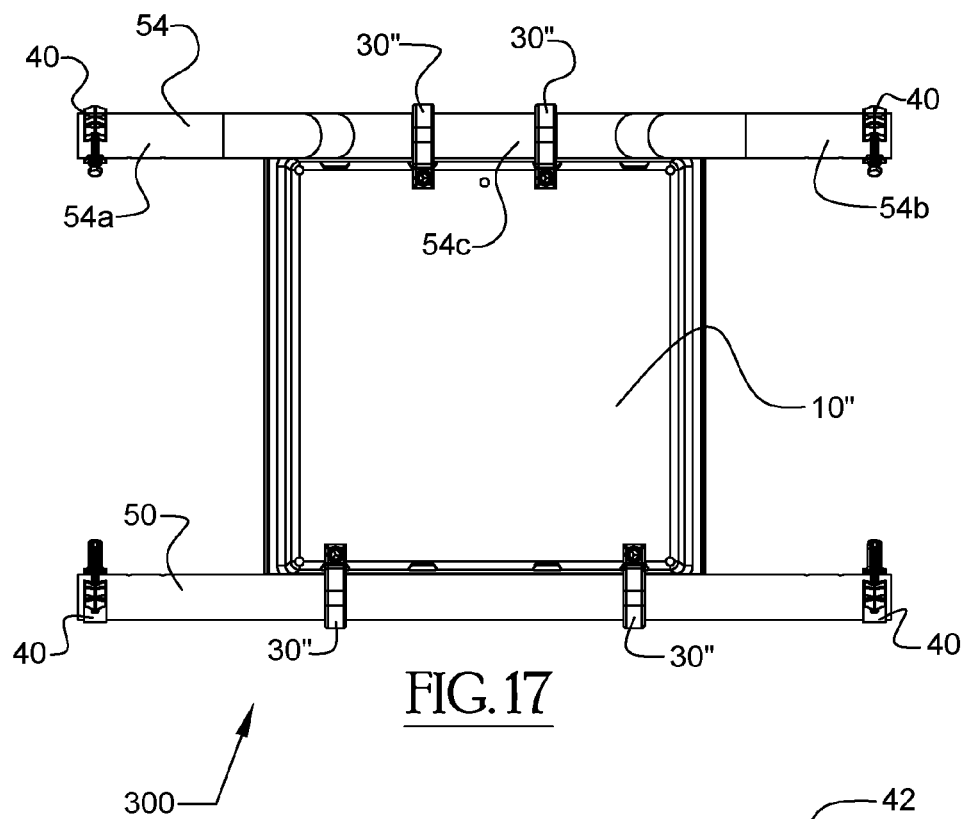
FIG. 17 is a top plan view of the support assembly of FIG. 15.
Figure 18:
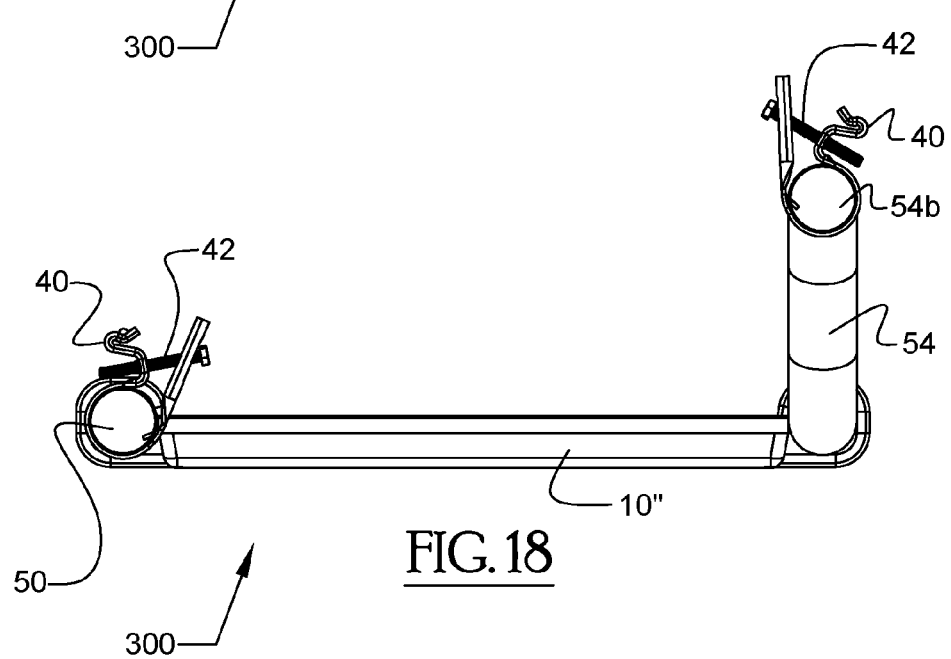
FIG. 18 is a side elevational view of the support assembly of FIG. 15.

Like the support assemblies 100 and 200 described above, the support assembly 300 of FIGS. 15-21 generally includes a ballast tray 10" configured to accommodate one or more ballasts (e.g., ballasts 68—see FIG. 31); a pair of spaced-apart tubular members 50, 54 coupled to the ballast tray 10", each of the spaced-apart tubular members 50, 54 configured to support one or more photovoltaic modules 66 above a support surface (see FIG. 31), and a plurality of panel clamp members 40 coupled to the tubular members 50, 54. As shown in FIG. 15, a first pair of panel clamp members 40 is coupled to a first one 50 of the pair of spaced-apart tubular members 50, 54, and a second pair of panel clamp members 40 is coupled to a second one 54 of the pair of spaced-apart tubular members 50, 54. Each of the panel clamp members 40 is configured to secure a respective photovoltaic module frame of the one or more photovoltaic modules 66 to the support assembly 300. Like the tubular members 50, 52 of the support assembly 200, the tubular members 50, 54 extend in a generally east-west direction of the one or more photovoltaic modules 66.

However, unlike the support assembly 200 described above with regard to FIGS. 7-14, the second tubular member 54 of the support assembly 300 in FIGS. 15-21 has a different configuration than the first tubular member 50. Similar to that described above for tubular members 50, 52 of the support assembly 200, the low-side tubular member 50 of the support assembly 300 is generally linear in shape (i.e., the low-side tubular member 50 has a straight pipe configuration). Although, unlike the high-side tubular member 52 of the support assembly 200, the high-side tubular member 54 of the support assembly 300 is not linear in shape. Rather, as shown in FIGS. 15, 16, 19, and 21, the high-side tubular member 54 has oppositely disposed bent end portions 54a, 54b and a generally straight middle portion 54c. As shown in these figures, the bent end portions 54a, 54b of the high-side tubular member 54 are disposed at a higher elevation relative to the support surface (e.g., relative to the roof) as compared to the low-side tubular member 50.

Figure 19:
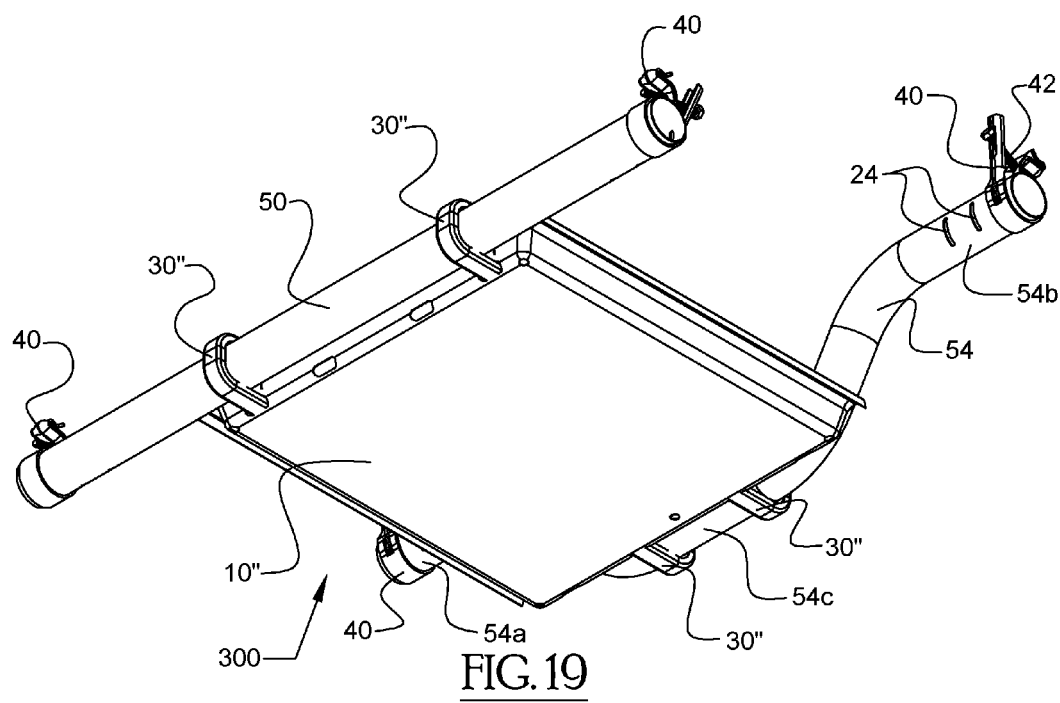
FIG. 19 is a bottom-side perspective view of the support assembly of FIG. 15.
Figure 20:
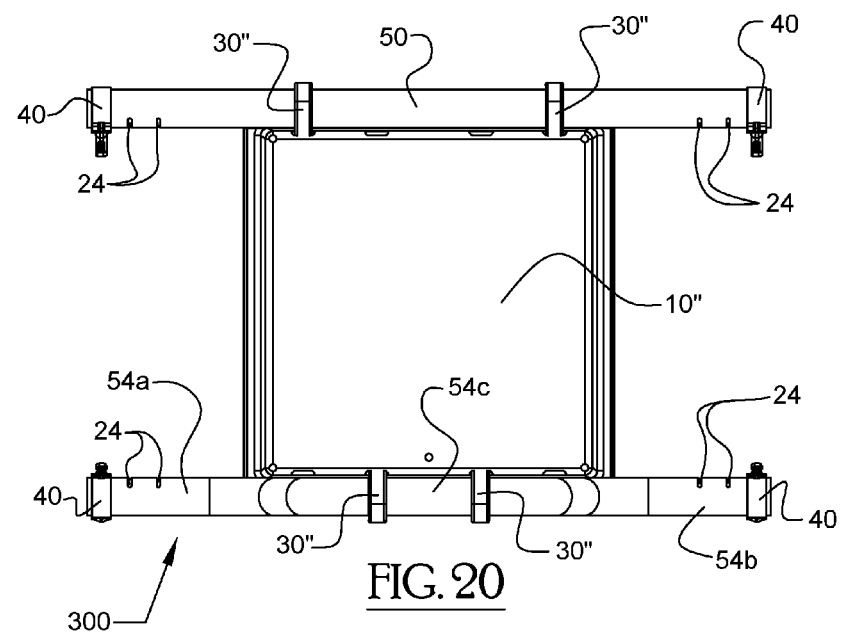
FIG. 20 is a bottom plan view of the support assembly of FIG. 15.

In the embodiment of FIGS. 15-21, the high-side tubular member 54 with upturned end portions 54a, 54b is used in place of the high-side connector member 60 described in conjunction with the support assembly 200. Similar to that described above for the support assemblies 100 and 200, the tubular members 50, 54 of the support assembly 300 are coupled to the ballast tray 10" by means of base clamp members 30". In particular, as shown in FIGS. 15 and 20, the low-side tubular member 50 is secured to the front end of the ballast tray 10" by a pair of spaced-apart base clamp members 30", while the generally straight middle portion 54c of the high-side tubular member 54 is secured to the rear end of the ballast tray 10" by a pair of spaced-apart base clamp members 30".

Figure 21:
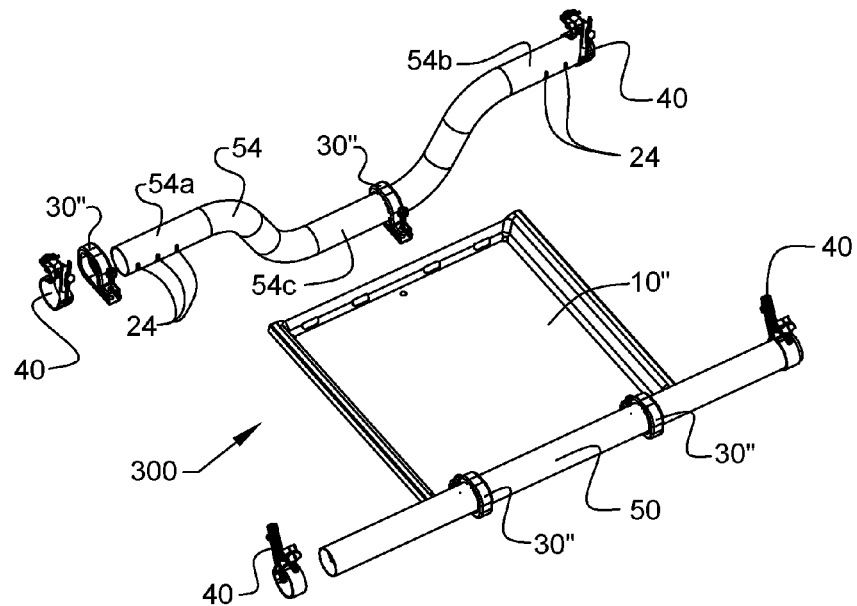
FIG. 21 is a partially exploded perspective view of the support assembly of FIG. 15, wherein one of the tubular members is exploded from the ballast tray in order to more clearly illustrate the manner in which the tubular member attaches to the ballast tray, and the manner in which the panel clamp member attaches to the tubular member.

As shown in FIGS. 15, 19, and 21, the ballast tray 10" of the support assembly 300 has a different configuration than the ballast trays 10, 10' described above. Although, like the ballast trays 10, 10', the ballast tray 10" is provided with an upturned lip disposed around the periphery thereof for containing the one or more ballasts 68 therein.

Still another illustrative embodiment of a support assembly for supporting one or more photovoltaic modules on a support surface (e.g., a roof) is seen generally at 300' in FIGS. 64A-70B. Referring to these figures, it can be seen that, in many respects, the illustrative embodiment of FIGS. 64A-70B is similar to that of the embodiment of FIGS. 15-21 described above. Moreover, many elements are common to both of these embodiments. For the sake of brevity, the elements that the embodiment of the support assembly of FIGS. 64A-70B has in common with the embodiment of FIGS. 15-21 will not be discussed because these components have already been explained in detail above. Furthermore, in the interest of clarity, these elements are denoted using the same reference characters that were used in the embodiment of FIGS. 15-21.

Figure 64A:
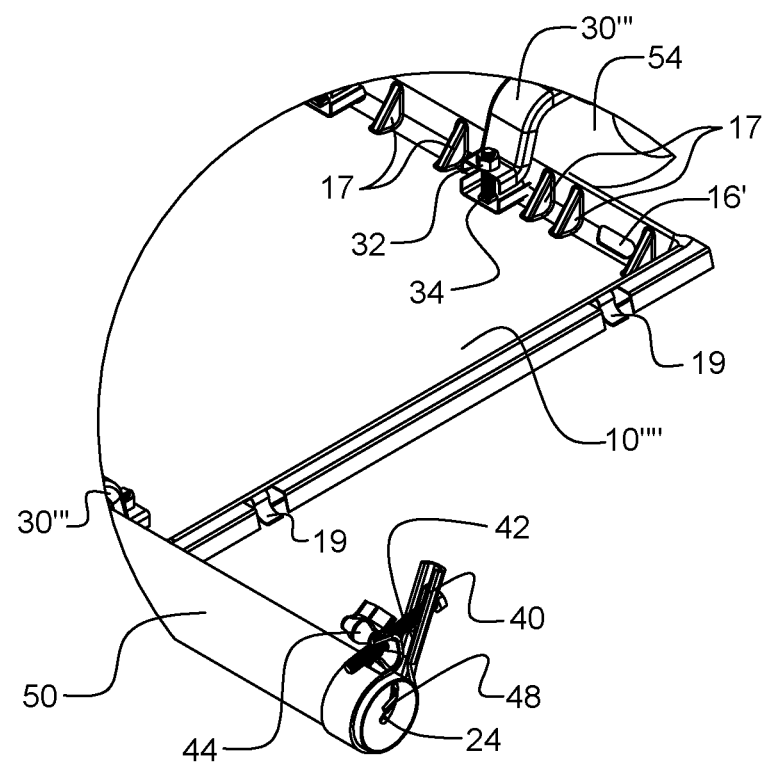
FIG. 64A is an enlarged perspective view of a portion of the support assembly of FIG. 64B, which illustrates the wire management feature of the ballast tray (Detail "F")
Figure 64B:
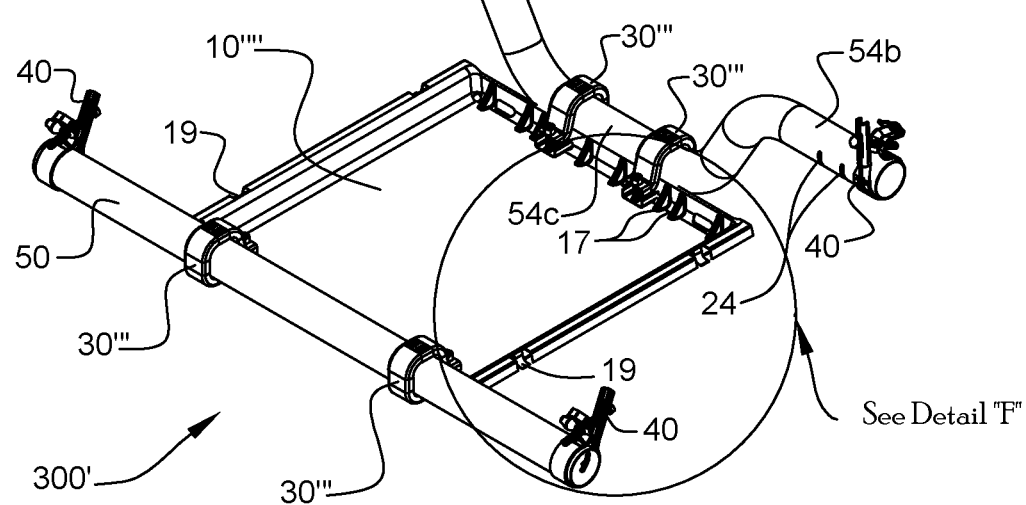
FIG. 64B is a top-side perspective view of a support assembly for photovoltaic modules, according to yet another illustrative embodiment of the invention, which is similar to the embodiment of FIGS. 15-21, except that the support assembly is provided with a slightly different ballast tray.

Like the support assembly 300 described above, the support assembly 300' of FIGS. 64A-70B generally includes a ballast tray 10"" configured to accommodate one or more ballasts (e.g., ballasts 68—see FIG. 31); a pair of spaced-apart tubular members 50, 54 coupled to the ballast tray 10"", each of the spaced-apart tubular members 50, 54 configured to support one or more photovoltaic modules 66 above a support surface (see FIG. 31), and a plurality of panel clamp members 40 coupled to the tubular members 50, 54. As shown in FIG. 64B, a first pair of panel clamp members 40 is coupled to a first one 50 of the pair of spaced-apart tubular members 50, 54, and a second pair of panel clamp members 40 is coupled to a second one 54 of the pair of spaced-apart tubular members 50, 54. Each of the panel clamp members 40 is configured to secure a respective photovoltaic module frame of the one or more photovoltaic modules 66 to the support assembly 300'. Like the tubular members 50, 54 of the support assembly 300, the tubular members 50, 54 of the support assembly 300' also extend in a generally east-west direction of the one or more photovoltaic modules 66.

However, the ballast tray 10"" of the support assembly 300' differs slightly from the ballast tray 10" of the support assembly 300 explained above. Referring to FIGS. 67, 68, 70A, and 70B, it can be seen that the ballast tray 10"" comprises a plurality of spaced-apart gussets 17 disposed along the north and south sides of the ballast tray 10"". Advantageously, the gussets 17 reinforce the ballast tray 10"" so as to increase its structural integrity and rigidity. Further, as best illustrated in FIGS. 65, 67, 68, 70A, and 70B, the ballast tray 10"" is provided with a plurality of drainage apertures 15, 16' formed therethrough configured to drain water from the ballast tray 10"". The drainage apertures 15 are disposed in the corners of the ballast tray 10"" (see Detail "G" in FIG. 70A), while the drainage apertures 16' are disposed between the corner drainage apertures 15 along the north and south sides of the ballast tray 10"". Also, as depicted in FIGS. 67, 68, 70A, and 70B, the east and west edges of the ballast tray 10"" are provided with pairs of spaced-apart wire management clips 19 for accommodating one or more electrical wires of the plurality of photovoltaic modules 66 in the array.

Figure 65:
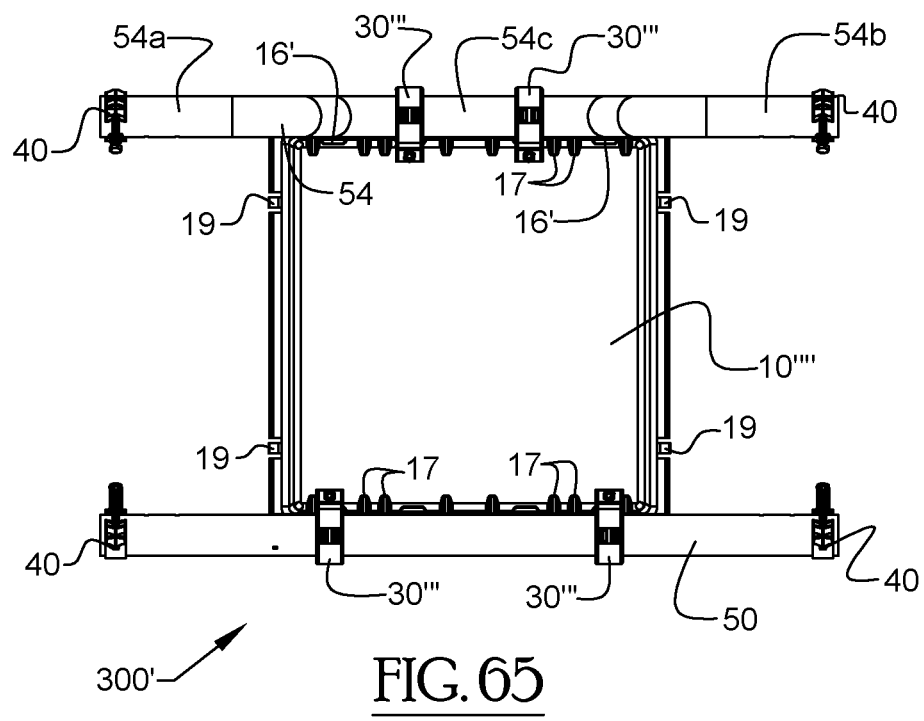
FIG. 65 is a top plan view of the support assembly of FIG. 64B.
Figure 66:
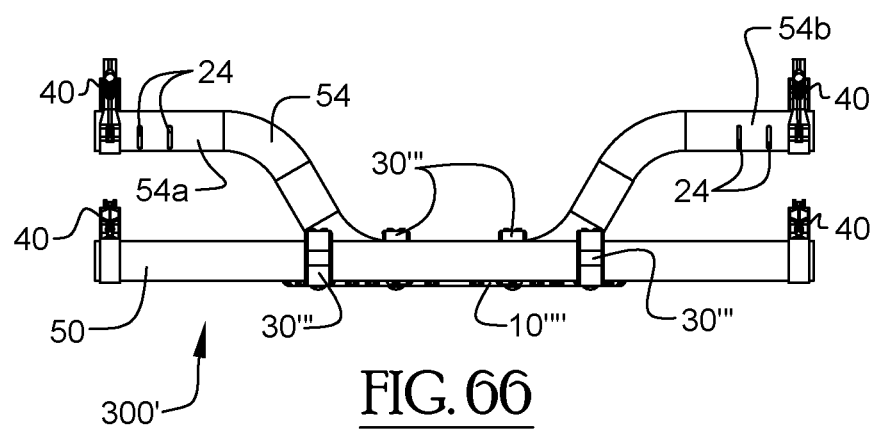
FIG. 66 is a front elevational view of the support assembly of FIG. 64B.
Figure 67:
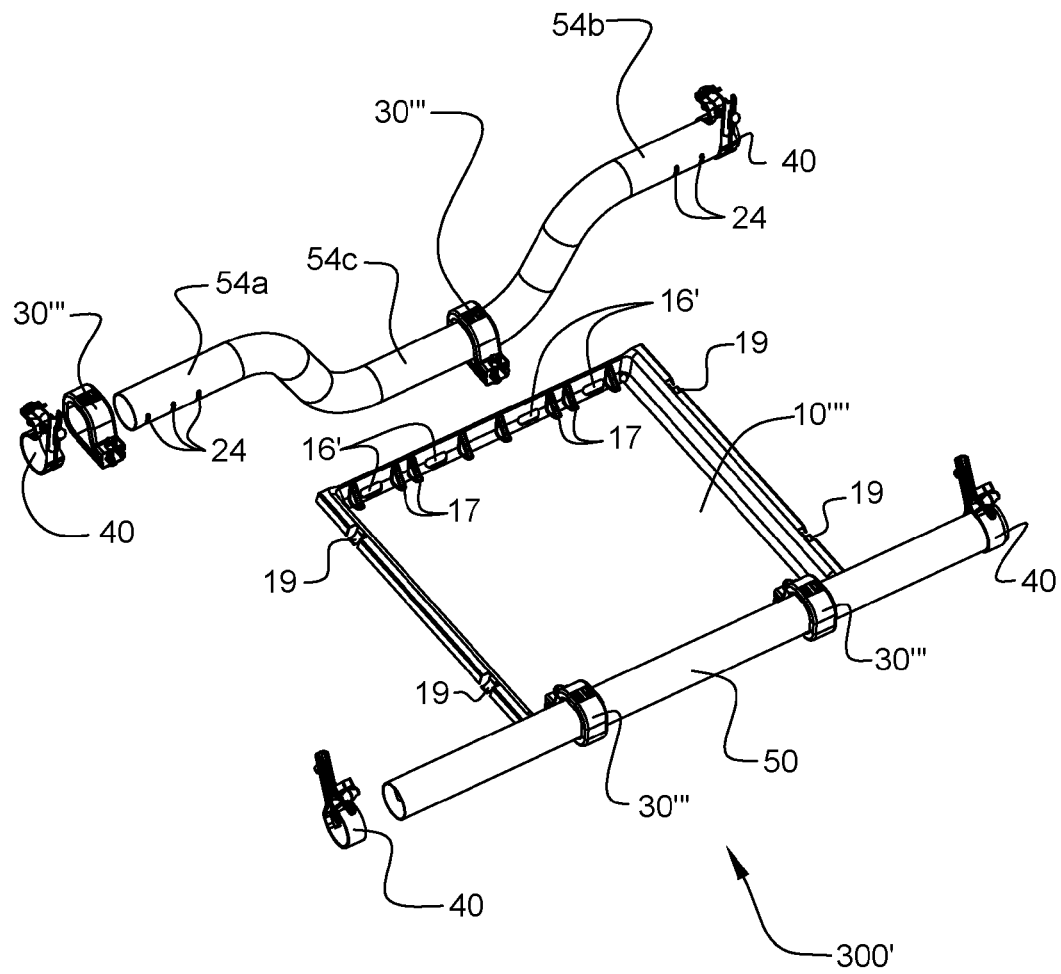
FIG. 67 is a partially exploded perspective view of the support assembly of FIG. 64B, wherein one of the tubular members is exploded from the ballast tray in order to more clearly illustrate the manner in which the tubular member attaches to the ballast tray, and the manner in which the panel clamp member attaches to the tubular member.
Figure 68:
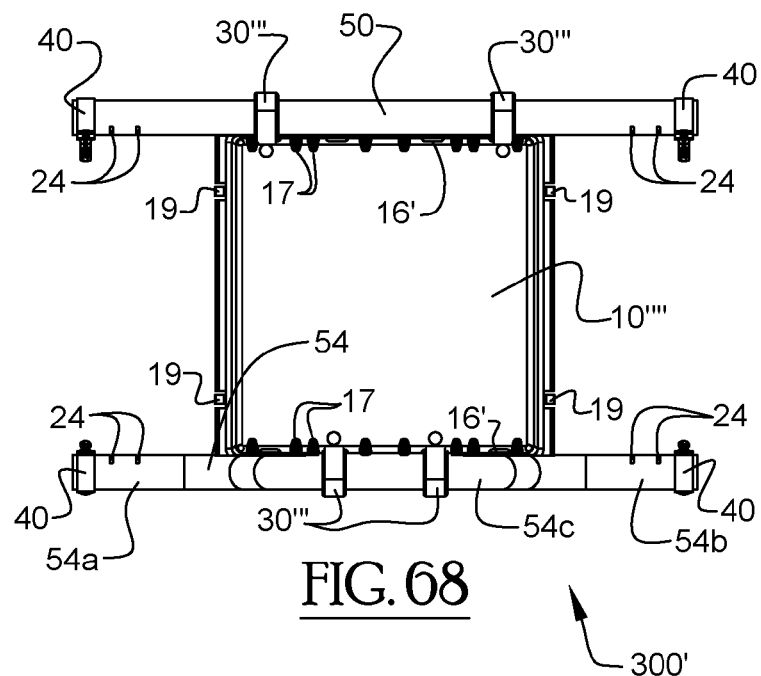
FIG. 68 is a bottom plan view of the support assembly of FIG. 64B.
Figure 69:
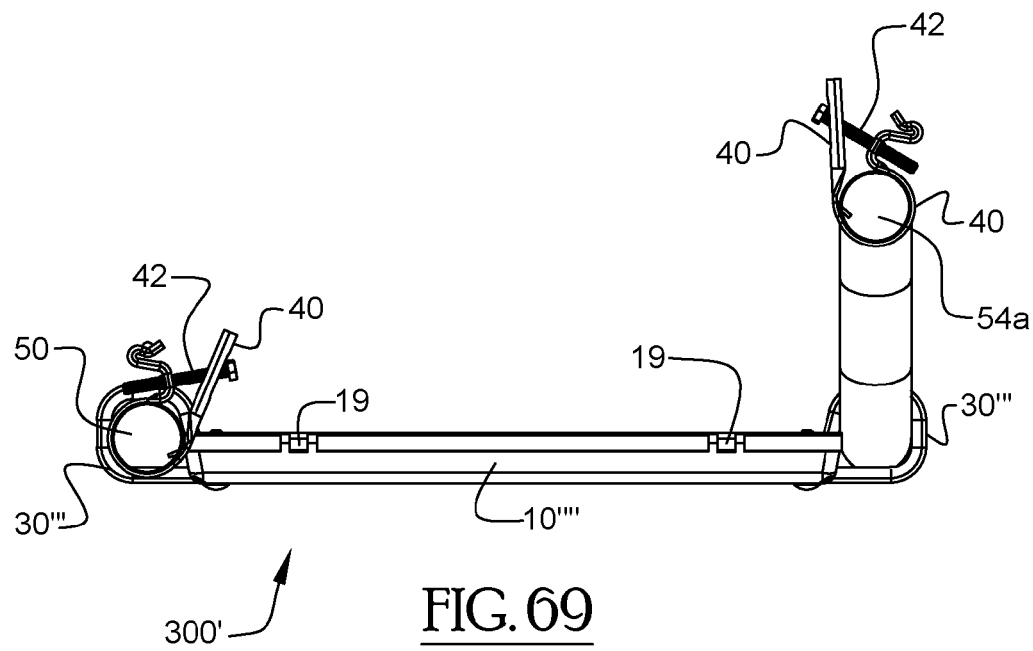
FIG. 69 is a side elevational view of the support assembly of FIG. 64B.
Figure 70A:
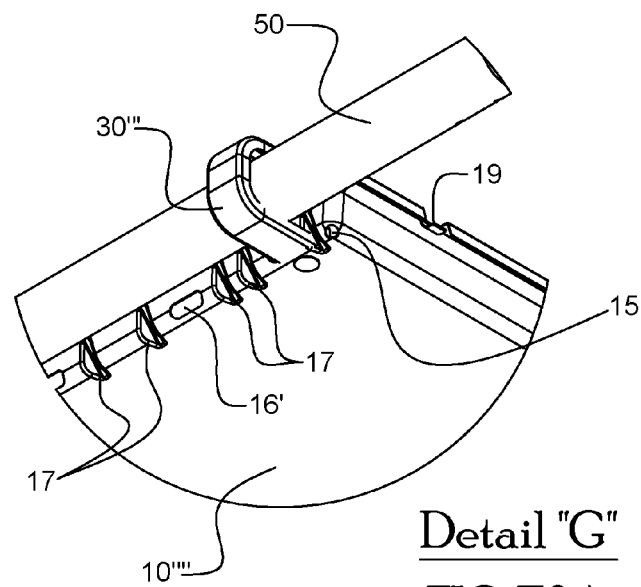
FIG. 70A is an enlarged perspective view of a portion of the support assembly of FIG. 70B, which illustrates the drainage holes in the bottom of the ballast tray (Detail "G")
Figure 70B:
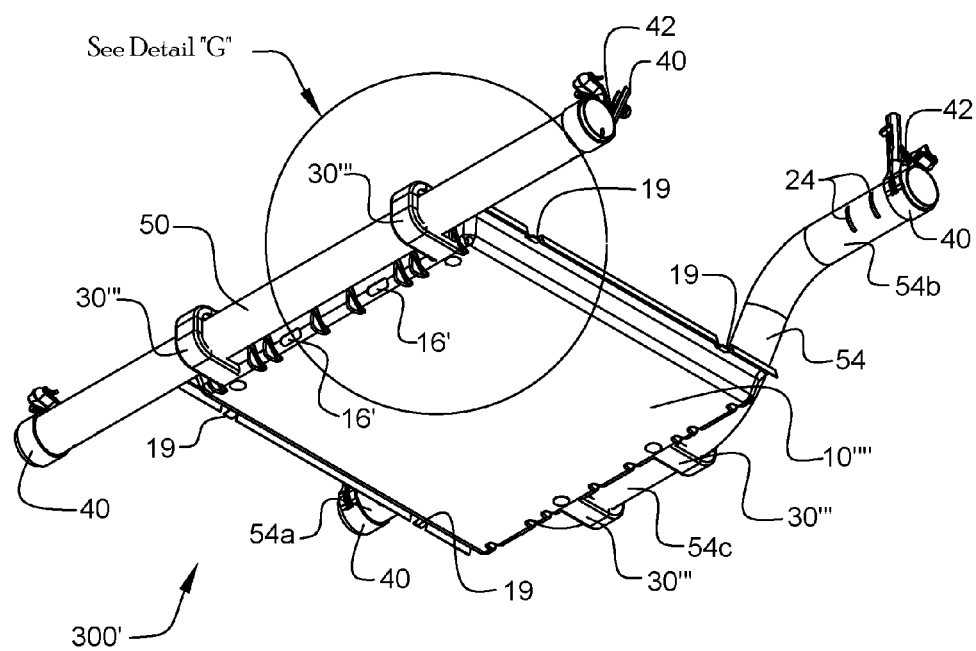
FIG. 70B is a bottom perspective view of the support assembly of FIG. 64B.

Similar to the embodiment of FIGS. 15-21 explained above, the tubular members 50, 54 of the support assembly 300' are coupled to the ballast tray 10"" by means of base clamp members 30"'. In particular, as shown in FIGS. 65 and 67, the low-side tubular member 50 is secured to the front end of the ballast tray 10"" by a pair of spaced-apart base clamp members 30"', while the generally straight middle portion 54c of the high-side tubular member 54 is secured to the rear end of the ballast tray 10"" by a pair of spaced-apart base clamp members 30"'.

Figure 50:
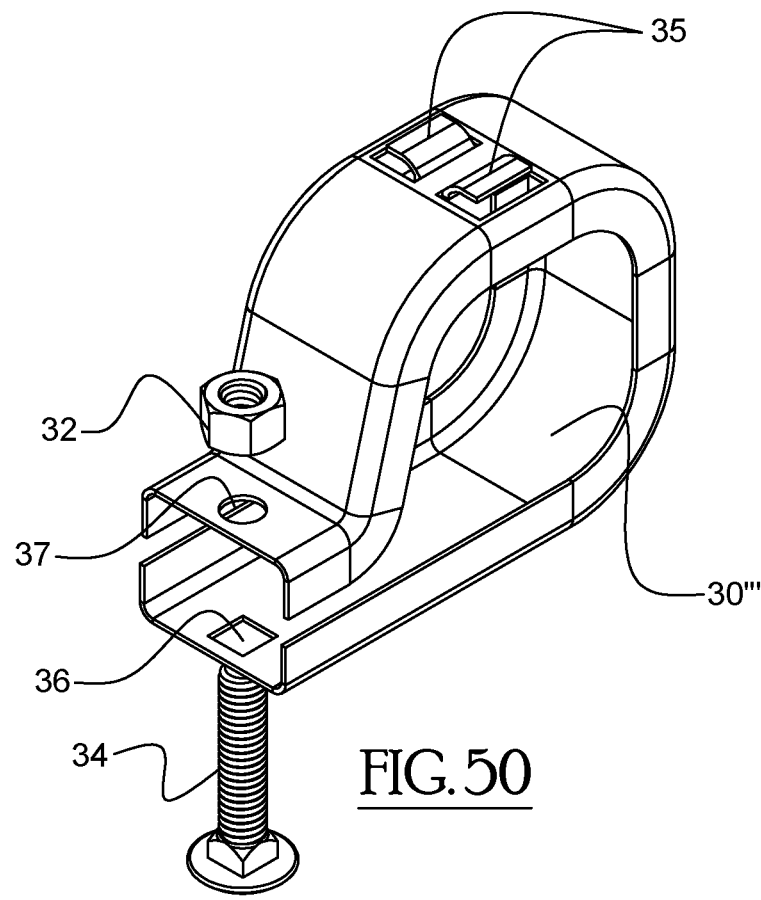
FIG. 50 is a top-side perspective view of a base clamp member of the support assembly depicted in the embodiment of FIGS. 64A-70B.
Figure 51:
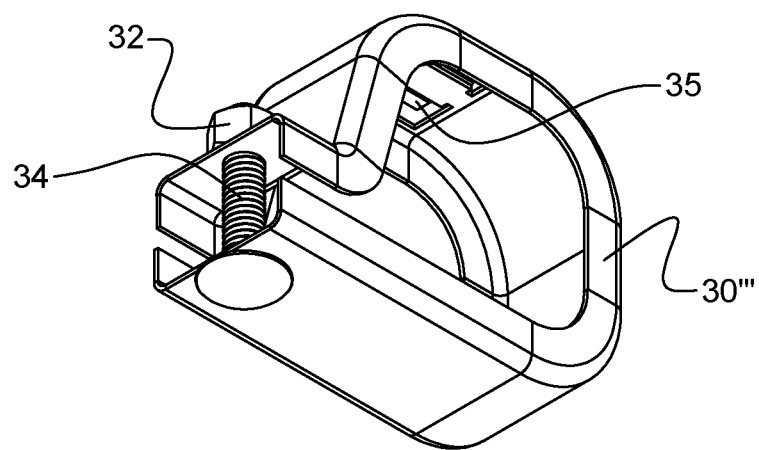
FIG. 51 is a bottom-side perspective view of the base clamp member of FIG. 50.
Figure 52:
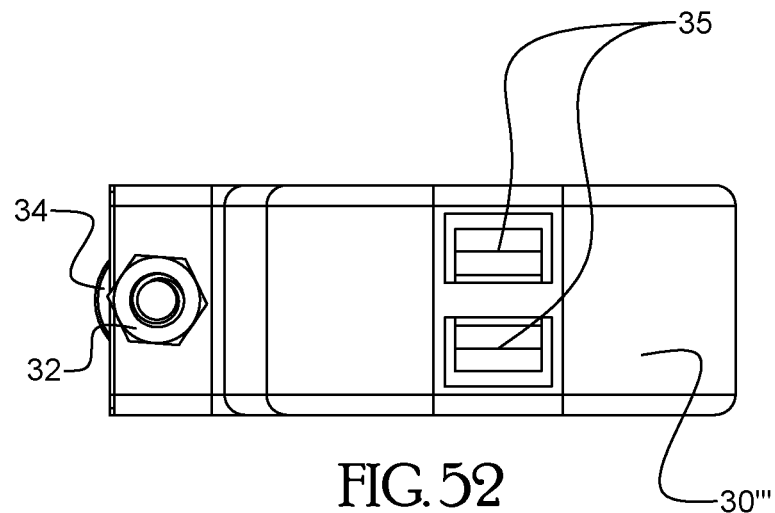
FIG. 52 is a top plan view of the base clamp member of FIG. 50.
Figure 53:
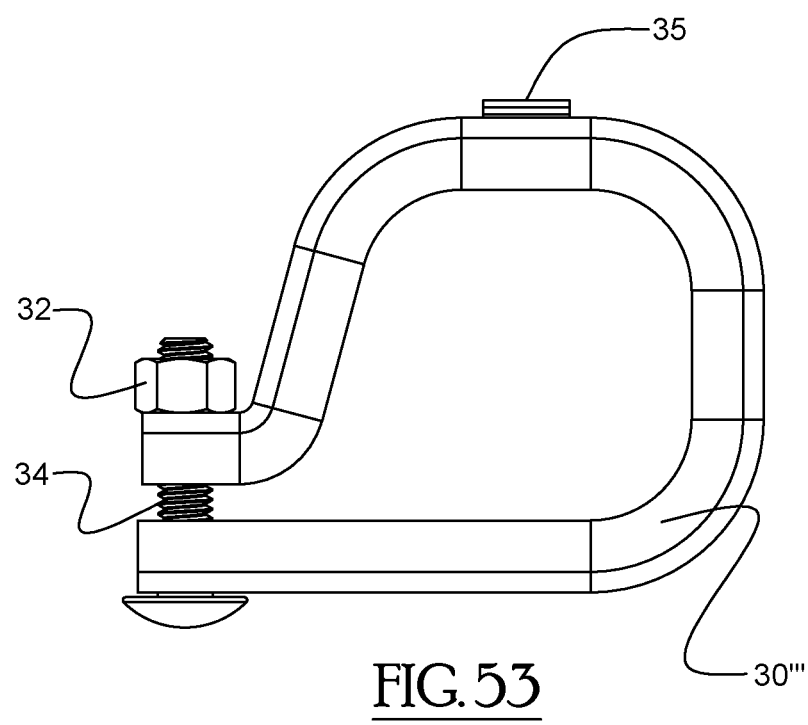
FIG. 53 is a side elevational view of the base clamp member of FIG. 50.
Figure 54:
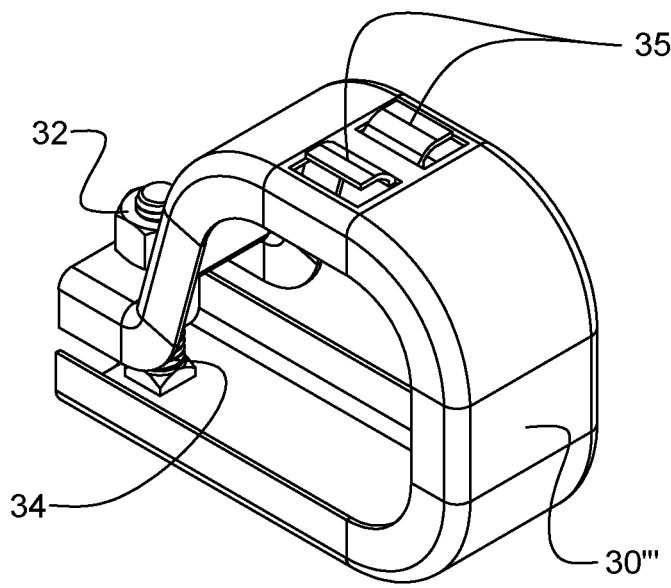
FIG. 54 is another top-side perspective view of the base clamp member of FIG. 50.
Figure 55:
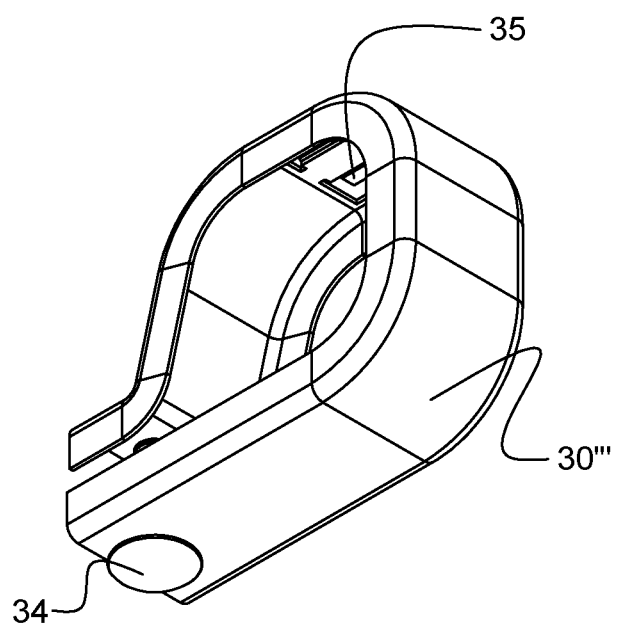
FIG. 55 is another bottom-side perspective view of the base clamp member of FIG. 50.
Figure 56:
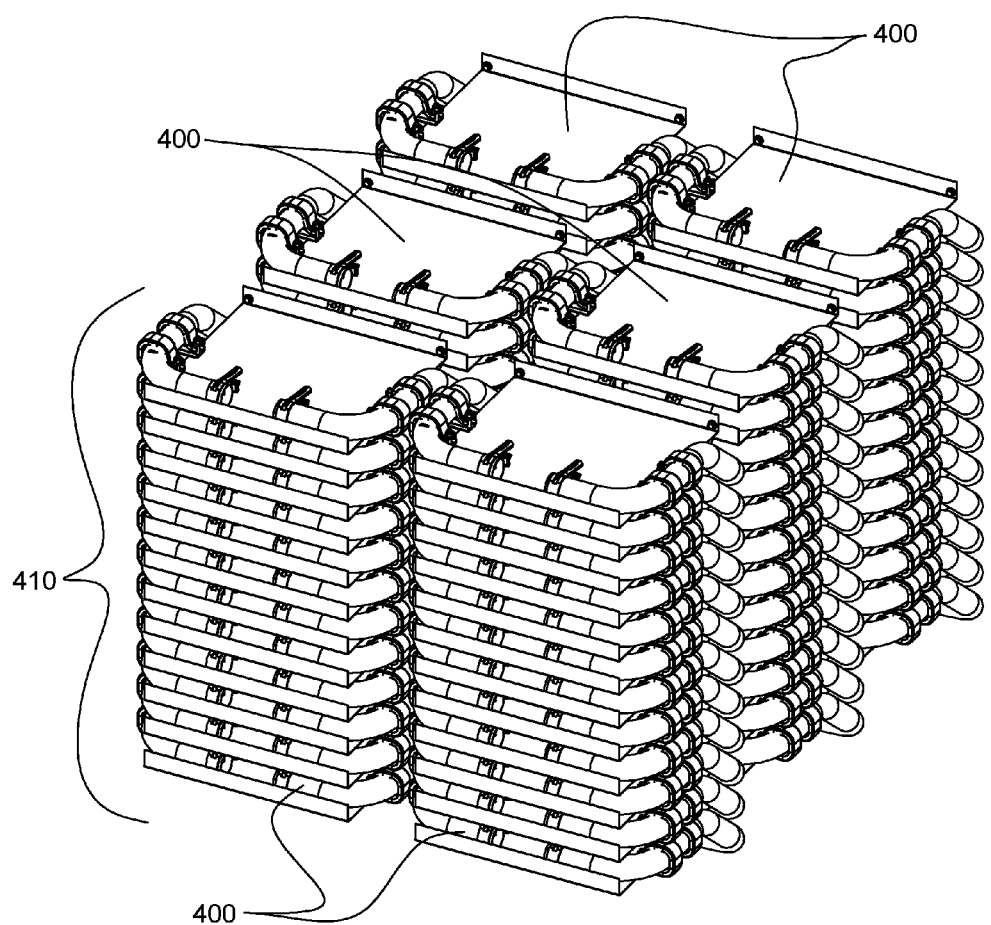
FIG. 56 is a perspective view illustrating the manner in which the support assembly depicted in the embodiment of FIGS. 22-28 is capable of being stacked with other such support assemblies.
Figure 57:
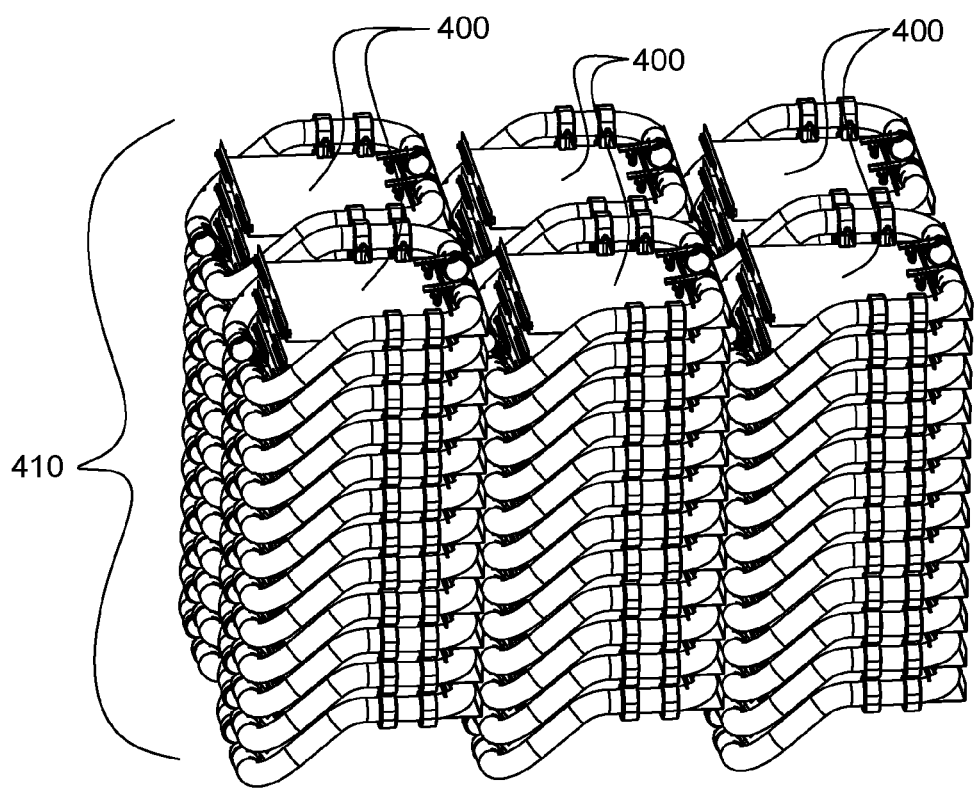
FIG. 57 is another perspective view of the stacked support assemblies illustrated in FIG. 56.
Figure 58:
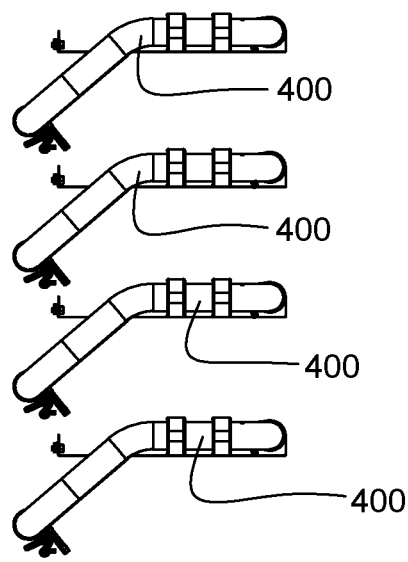
FIG. 58 is an exploded side elevational view illustrating the nesting arrangement of the stacked support assemblies shown in FIGS. 56 and 57.
Figure 59:
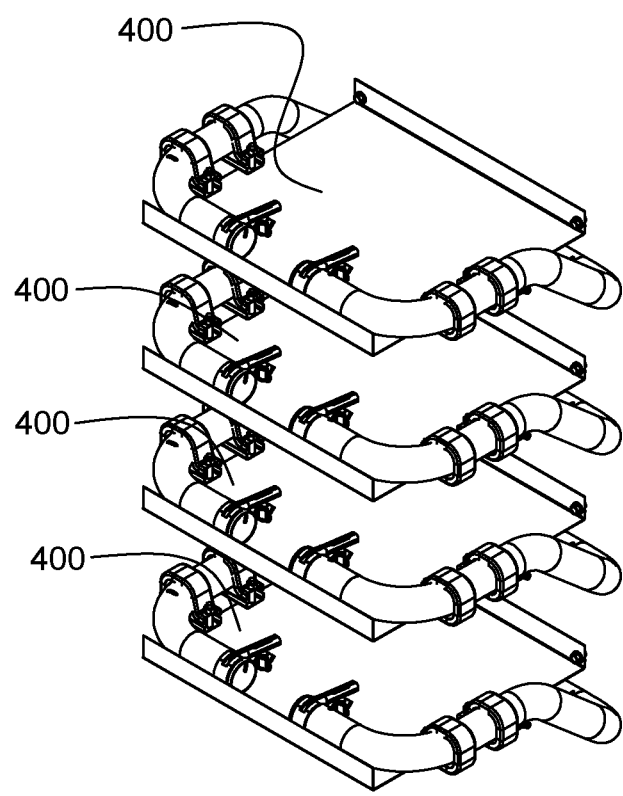
FIG. 59 is an exploded perspective view illustrating the nesting arrangement of the stacked support assemblies shown in FIGS. 56 and 57.
Figure 60A:
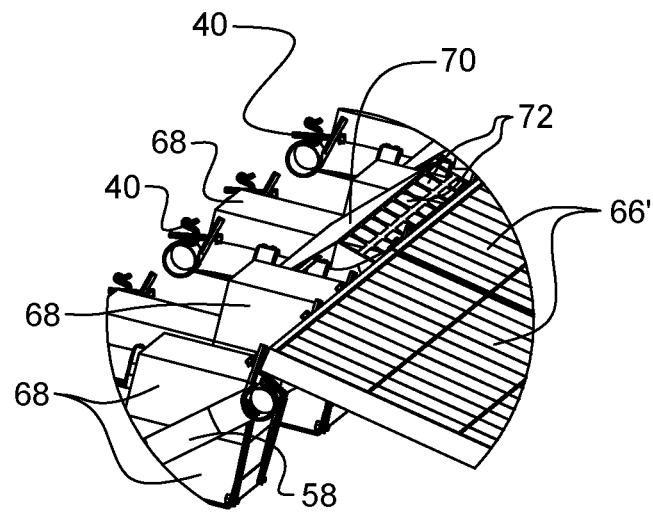
FIG. 60A is an enlarged perspective view of a portion of the photovoltaic module array of FIG. 60B, which illustrates the venting apertures in the wind deflector member (Detail "C")
Figure 60B:
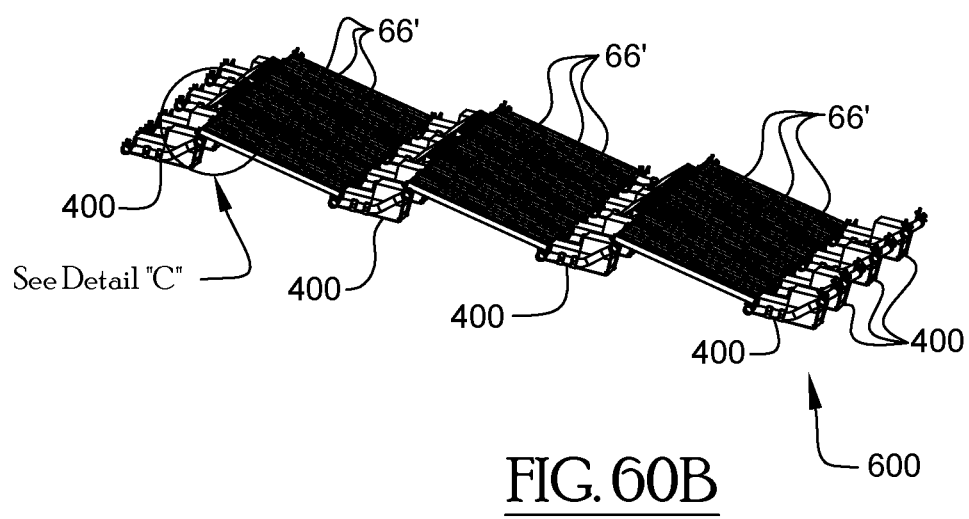
FIG. 60B is a perspective view of a photovoltaic module array, according to another illustrative embodiment of the invention, wherein the photovoltaic modules of the array are disposed in a portrait configuration and the photovoltaic modules are supported using a plurality of support assemblies of the embodiment of FIGS. 22-28.

The details of the illustrative base clamp members 30"' are shown in FIGS. 50-55. As shown in these figures, it can be seen that the base clamp member 30"' is provided with a threaded fastener member 34 (e.g., a threaded bolt or screw) and an associated nut 32 for securing the base clamp member 30"' to the ballast tray 10"". Referring to the perspective view of FIG. 50, it can be seen that the threaded fastener member 34 passes through the square-shaped lower fastener aperture 36 in the bottom of the base clamp member 30"' and a circular upper fastener aperture 37 disposed above the lower fastener aperture 36. In the illustrative embodiment, the square-shaped lower fastener aperture 36 accommodates the square cross-section of the threaded fastener member 34 near the fastener head, while the circular upper fastener aperture 37 accommodates the circular cross-section of the shaft of the threaded fastener member 34. Turning to FIGS. 50, 52, and 54, it can be seen that the base clamp member 30''' also includes tab members 35 disposed on the top thereof for receiving the bottom edge of a wind deflector 70 (see Detail "D" in FIG. 61A). The details of the wind deflectors 70 will be described in more detail hereinafter.

Yet another illustrative embodiment of a support assembly for supporting one or more photovoltaic modules on a support surface (e.g., a roof) is seen generally at 400 in FIGS. 22-28. Referring to these figures, it can be seen that, in some respects, the illustrative embodiment of FIGS. 22-28 is similar to the aforedescribed embodiments of the support assemblies 100, 200, 300, and 300'. Moreover, many elements are common to all of these embodiments. For the sake of brevity, the elements that the embodiment of the support assembly of FIGS. 22-28 has in common with the aforedescribed embodiments will not be discussed because these components have already been explained in detail above. Furthermore, in the interest of clarity, these elements are denoted using the same reference characters that were used in the embodiments of FIGS. 1-6, 7-14, 15-21, and 64A-70B.

Figure 22:
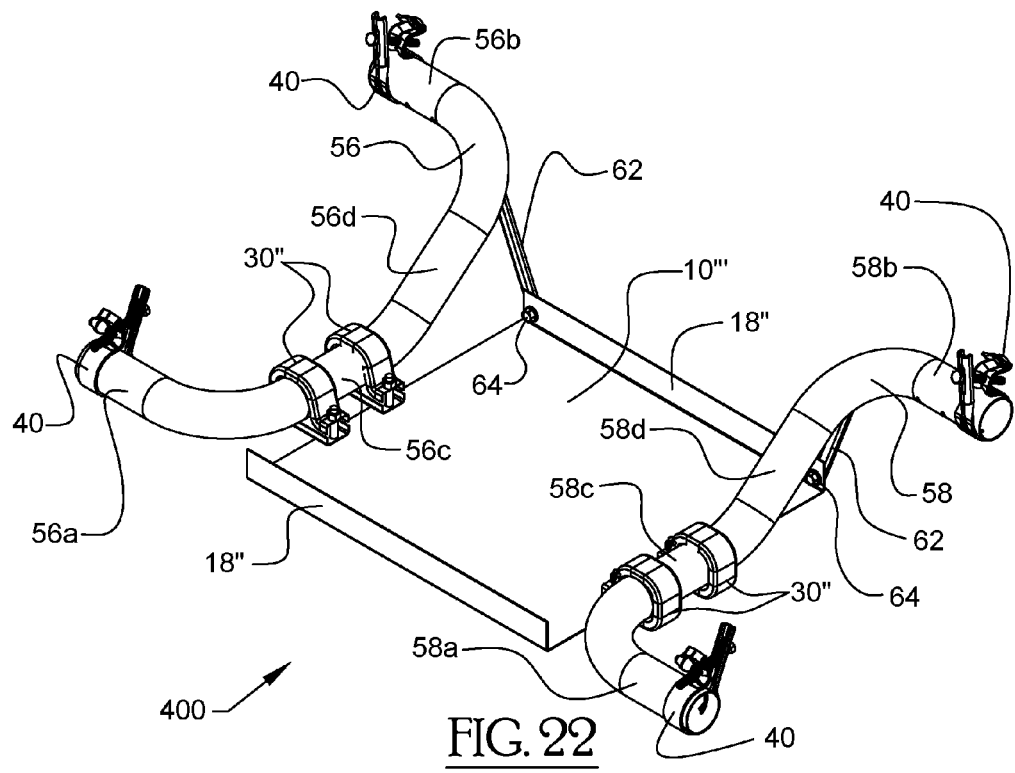
FIG. 22 is a top-side perspective view of a support assembly for photovoltaic modules, according to still another illustrative embodiment of the invention.
Figure 23:
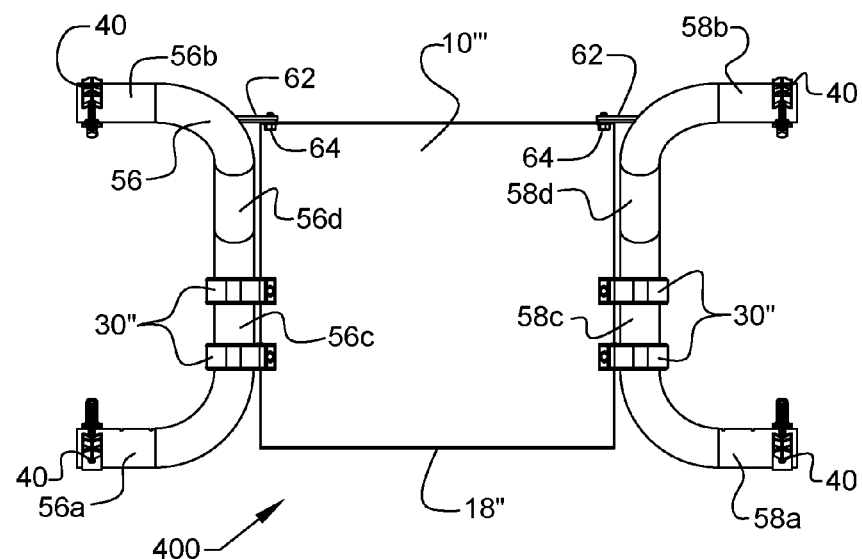
FIG. 23 is a top plan view of the support assembly of FIG. 22.
Figure 24:
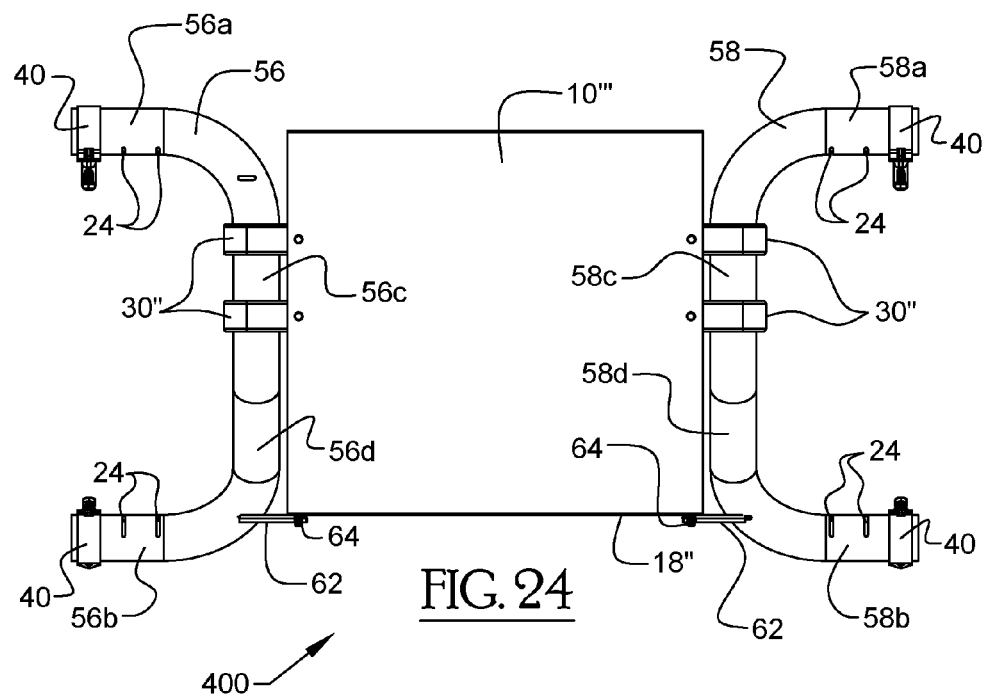
FIG. 24 is a bottom plan view of the support assembly of FIG. 22.
Figure 25:
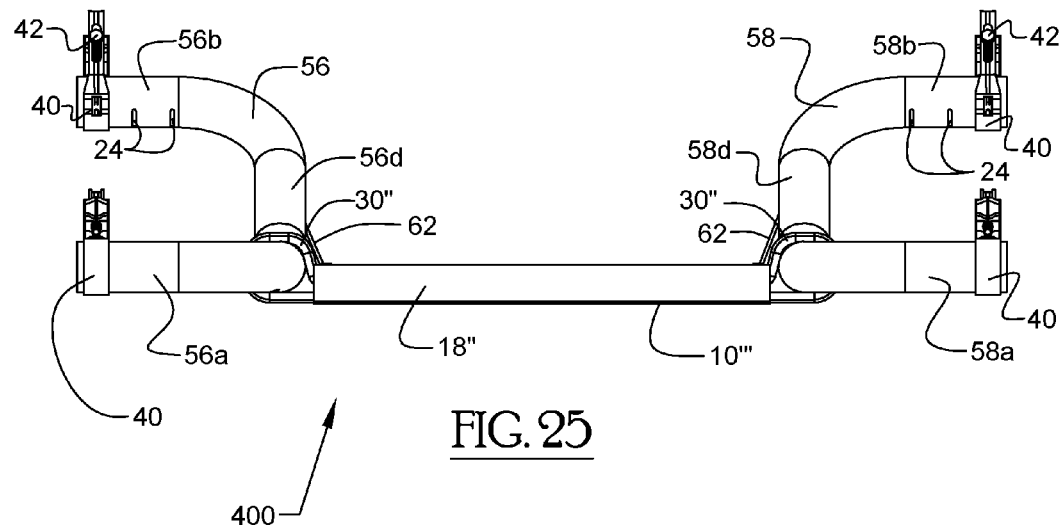
FIG. 25 is a front elevational view of the support assembly of FIG. 22.
Figure 26:
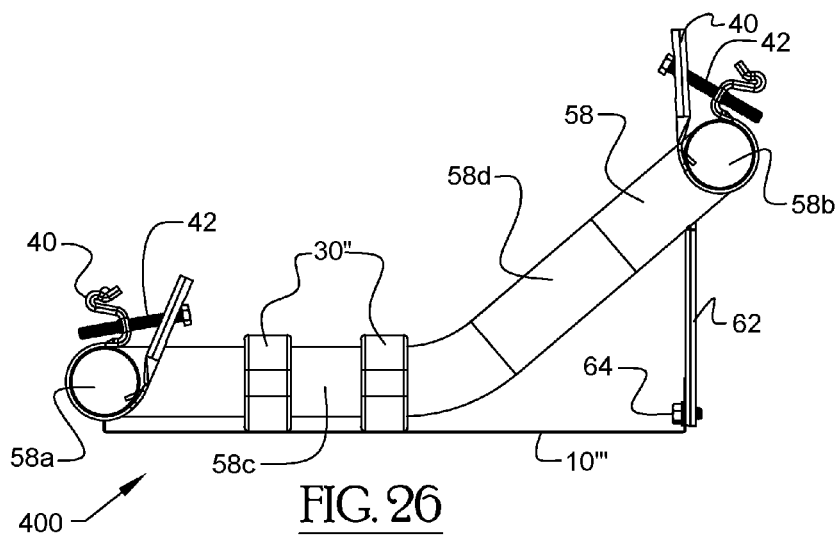
FIG. 26 is a side elevational view of the support assembly of FIG. 22.
Figure 27:
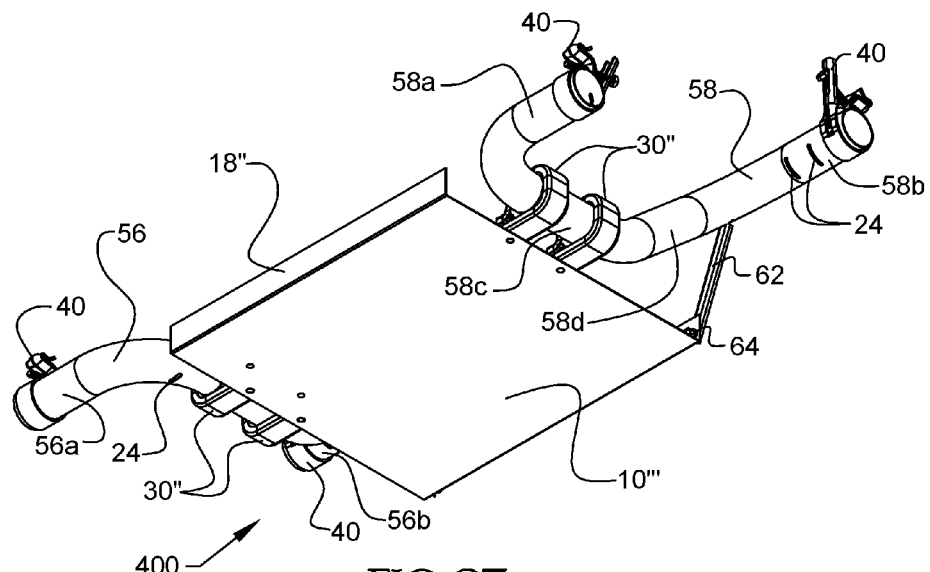
FIG. 27 is a bottom-side perspective view of the support assembly of FIG. 22.
Figure 28:
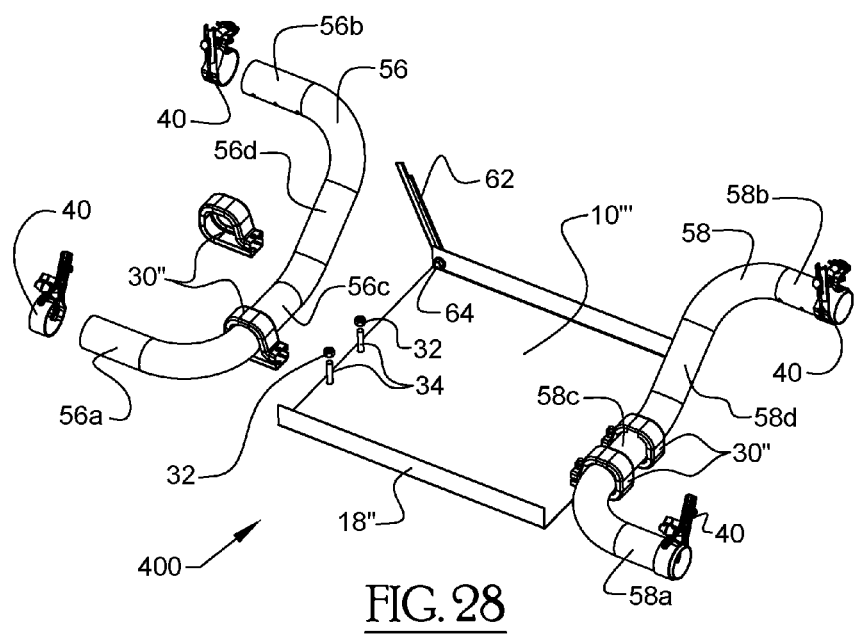
FIG. 28 is a partially exploded perspective view of the support assembly of FIG. 22, wherein one of the tubular members is exploded from the ballast tray in order to more clearly illustrate the manner in which the tubular member attaches to the ballast tray, and the manner in which the panel clamp member attaches to the tubular member.
Figure 29:
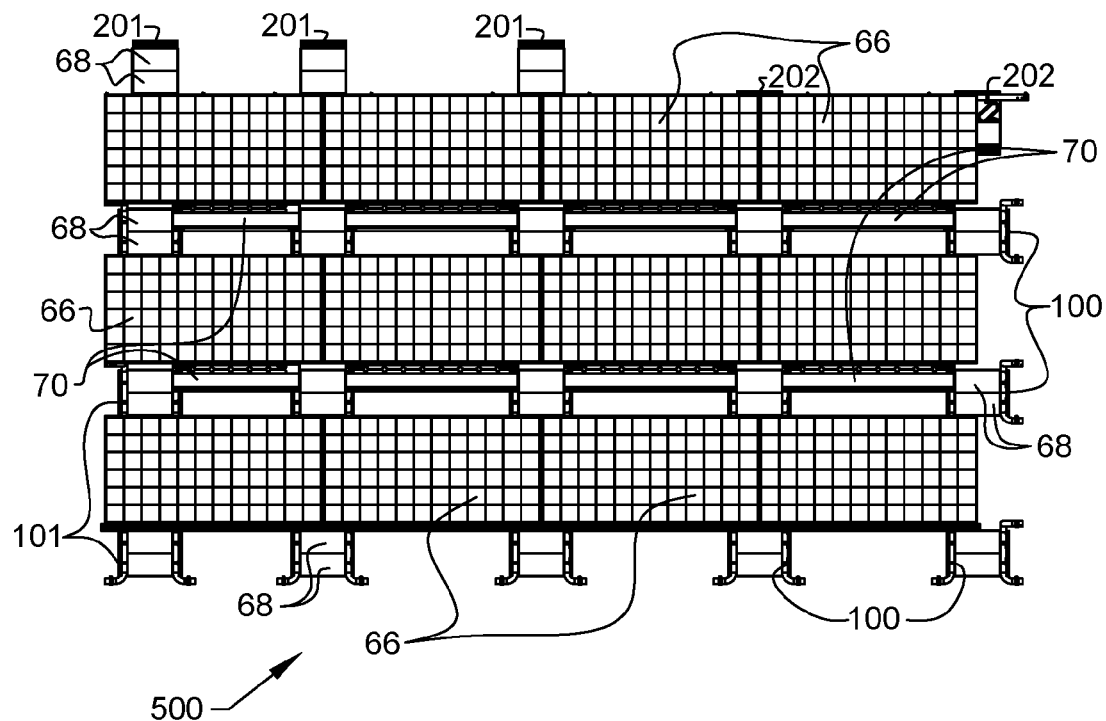
FIG. 29 is a top plan view of a photovoltaic module array, according to one illustrative embodiment of the invention, wherein the photovoltaic modules of the array are disposed in a landscape configuration and the photovoltaic modules are supported using a plurality of support assemblies, some of the support assemblies are tucked underneath the photovoltaic modules in the array, and the south row of the array comprises a plurality of connector tubes connecting support assemblies to one another in an east-west direction.
Figure 30:
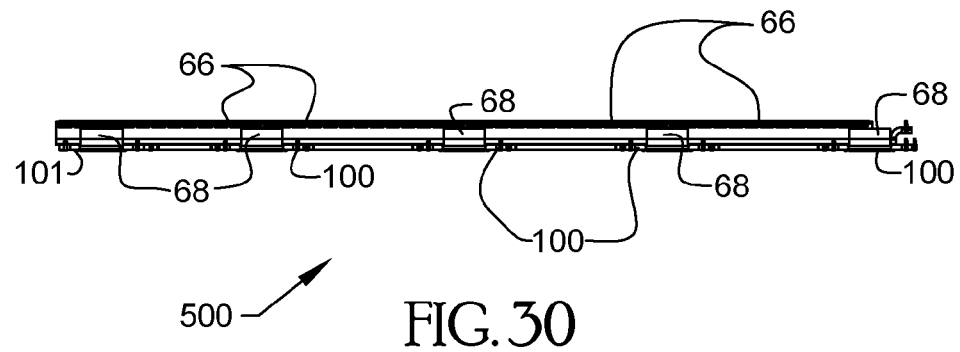
FIG. 30 is a north side elevational view of the photovoltaic module array of FIG. 29.

Like the support assemblies 100, 200, 300, and 300' described above, the support assembly 400 of FIGS. 22-28 generally includes a ballast tray 10''' configured to accommodate one or more ballasts (e.g., ballasts 68—see FIG. 31); a pair of spaced-apart tubular members 56, 58 coupled to the ballast tray 10''', each of the spaced-apart tubular members 56, 58 configured to support one or more photovoltaic modules 66 above a support surface (see FIG. 31), and a plurality of panel clamp members 40 coupled to the tubular members 56, 58. As shown in FIG. 22, a first pair of panel clamp members 40 is coupled to a first one 56 of the pair of spaced-apart tubular members 56, 58, and a second pair of panel clamp members 40 is coupled to a second one 58 of the pair of spaced-apart tubular members 56, 58. Each of the panel clamp members 40 is configured to secure a respective photovoltaic module frame of the one or more photovoltaic modules 66 to the support assembly 400. Like the tubular members 20, 22 of the support assembly 100, the tubular members 56, 58 extend in a generally north-south direction of the one or more photovoltaic modules 66. In FIGS. 22 and 28, it can be seen that the ballast tray 10''' of the support assembly 400 is provided with upturned front and rear sides 18'' in order to contain the one or more ballasts 68 therein.

However, the tubular members 56, 58 of the support assembly 400 have a different configuration than the tubular members 20, 22, 50, 52, 54 described above in conjunction with the preceding embodiments. As best shown in the perspective views of FIGS. 22, 46, and 47, the first tubular member 56 has a first bent end portion 56a for supporting a photovoltaic module at a first elevation, a second bent end portion 56b for supporting a photovoltaic module at a second elevation that is higher than the first elevation relative to the support surface (e.g., the roof), and a straight middle portion 56c and an inclined middle portion 56d that connects the first and second end portions 56a, 56b to one another. Similarly, as shown in FIGS. 22 and 48A-49, the second tubular member 58 has a first bent end portion 58a for supporting a photovoltaic module at a first elevation, a second bent end portion 58b for supporting a photovoltaic module at a second elevation that is higher than the first elevation relative to the support surface (e.g., the roof), and a straight middle portion 58c and an inclined middle portion 58d that connects the first and second end portions 58a, 58b to one another. In the embodiment of FIGS. 22-28, the longitudinal axes of the middle portions 56c, 56d, 58c, 58d of the tubular members 56, 58 generally extend in the north-south direction of the support assembly 400, but the longitudinal axes of the bent end portions 56a, 56b, 58a, 58b point in the east-west direction of the support assembly 400 (i.e., the bent end portions 56a, 56b, 58a, 58b are generally transversely oriented relative to the middle portions 56c, 56d, 58c, 58d of the tubular members 56, 58). Also, as depicted in FIGS. 24, 27 and 46-49, the bent end portions 56a, 56b of the first tubular member 56 and the bent end portions 58a, 58b of the second tubular member 58 each comprises a plurality of spaced-apart slots 24 formed in the bent end portions 56a, 56b, 58a, 58b of the first and second tubular members 56, 58. As described above for the support assembly 100, the spaced-apart slots 24 serve as visual and tactile indicia for representing a plurality of predetermined mounting locations for the panel clamp members 40. Each of the spaced-apart slots 24 is indicative of a respective predetermined mounting location for a panel clamp member 40. The slot alignment tab member 48 of each panel clamp member 40 engages with a respective one of the slots 24 in the tubular members 56, 58. The engagement between the slot 24 in the tubular member 56, 58 and the tab member 48 of the panel clamp member 40 limits a rotation of the panel clamp member 40 on the tubular member 56, 58 so as to facilitate ease of installation of the photovoltaic modules 66. Advantageously, in the illustrative embodiment of the support assembly 400, the first and second tubular members 56, 58 are identical in form so that a single tube part can be interchangeably used for the both the first and second tubular members 56, 58, thereby reducing the part costs of the support assembly 400 by obviating the need for different tubes to be formed for each of the first and second tubular members 56, 58.

Turning to FIGS. 22, 26, 27, and 28, it can be seen that the upper end portion of each tubular member 56, 58 of the support assembly 400 is supported by a support bracket 62. The upper end of each support bracket 62 is received within a slot 25 disposed in the underside of each tubular member 56, 58 (refer to FIGS. 48B and 49). The oppositely-disposed lower end of each support bracket is secured to the upturned rear side 18'' by a fastener 64 (e.g., a threaded bolt or screw—see FIG. 28). As such, the support brackets 62 elevate the second bent end portions 56b, 58b of the tubular members 56, 58 a predetermined distance above the support surface (e.g., the roof) on which the photovoltaic array is installed.

As described above for the tubular members 20, 22 of the support assembly 100, each of the tubular members 56, 58 of the support assembly 400 may be configured to be rotatably converted from a shipping position to a mounting position. Advantageously, as shown in FIGS. 56-59, when the tubular members 56, 58 of the support assemblies 400 are in their shipping positions, the support assemblies 400 are configured to nest with one another so that compact stacked arrangements 410 of support assemblies 400 may be formed, thereby minimizing the shipping size of the support assemblies 400 (see FIG. 56). Thus, in the illustrative embodiment, the stacked shipping arrangement 410 of the nested support assemblies 400 enables the shipping and handling costs associated with transporting the support assemblies 400 to be lowered. In one or more embodiments, the compact stacked arrangements 410 of support assemblies 400 can be shipped using standard pallet sizes, thereby obviating the need for specialized shipping pallets. In addition, the support assemblies 100, 300, 300' described above are also capable of nesting with one another so that compact stacked arrangements of the support assemblies 100, 300, 300' may be formed.

Thus, because the tubular members 56, 58 of the support assemblies 400 are convertible between shipping and mounting positions, the tubular members 56, 58 are able to be furnished to the installer preassembled on the ballast tray 10''', thereby reducing the installation time necessary to install the photovoltaic array on the support surface (e.g., on the roof). Also, in the illustrative embodiment, each of the panel clamp members 40 is preassembled on the tubular members 56, 58 of the support assemblies 400 to further reduce the requisite installation time. Further, in the illustrative embodiment, when the tubular members 56, 58 are in their mounting positions, rotational movement of the tubular members 56, 58 relative to their base clamp members 30'' is restricted to a predetermined angular range so as to enhance an installation speed of the support assembly 400. In addition, when the tubular members 56, 58 are in their mounting positions, the rotational adjustability of the tubular members 56, 58 relative to their base clamp members 30'' also enables undulations of the support surface (e.g., of the roof) in a generally east-west direction to be accommodated. Once the desired rotational positions of the tubular members 56, 58 are obtained by the installer, the tubular members 56, 58 are fixed in place relative to the base clamp members 30'' by tightening fasteners of the base clamp members 30''.

Yet another illustrative embodiment of a support assembly for supporting one or more photovoltaic modules on a support surface (e.g., a roof) is seen generally at 420 in FIGS. 73-79. Referring to these figures, it can be seen that, in some respects, the illustrative embodiment of FIGS. 73-79 is similar to that of the embodiment of FIGS. 7-14. Moreover, some elements are similar between the two embodiments. For the sake of brevity, the elements that the embodiment of the support assembly of FIGS. 73-79 has in common with the embodiment of FIGS. 7-14 will not be discussed in detail because these components have already been explained in detail above. Furthermore, in the interest of clarity, these elements are denoted using reference characters that are similar to those used in the embodiment of FIGS. 7-14.

Figure 73:
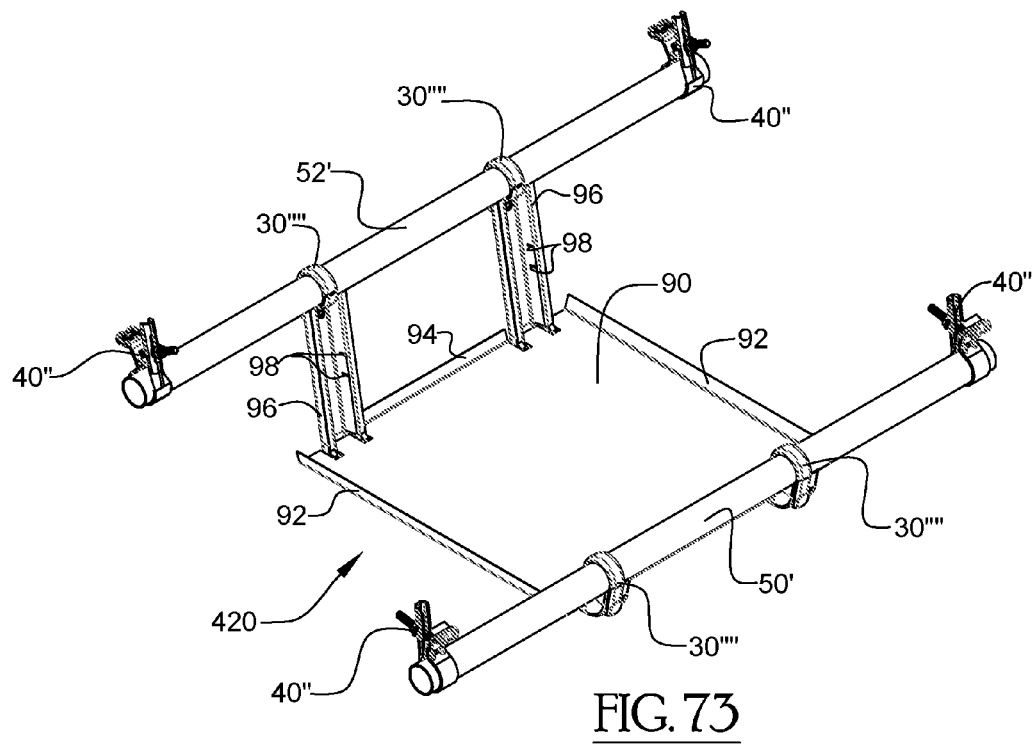
FIG. 73 is a top-side perspective view of a support assembly for photovoltaic modules, according to yet another illustrative embodiment of the invention.
Figure 74:
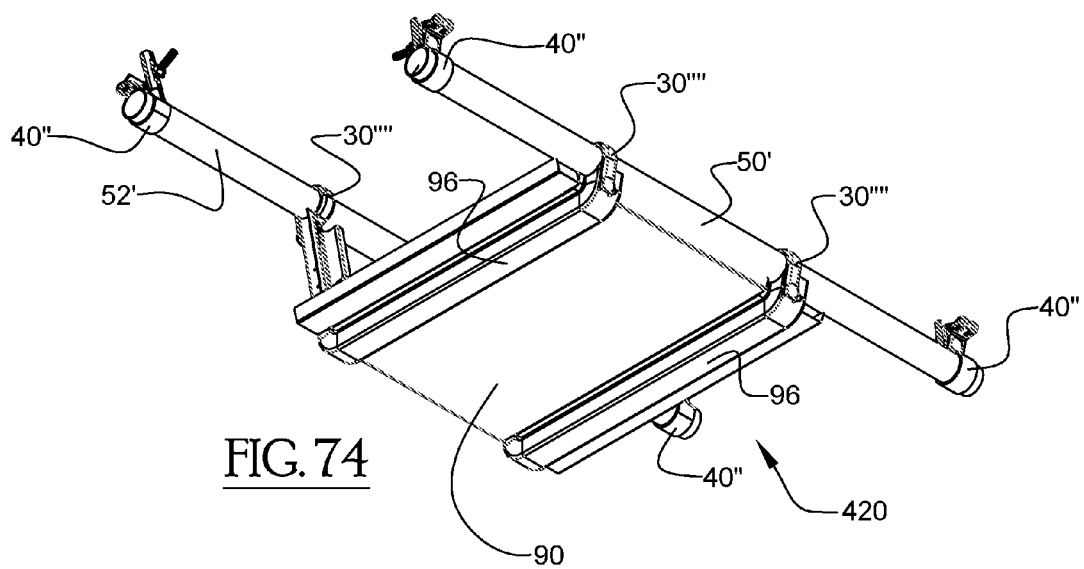
FIG. 74 is a bottom-side perspective view of the support assembly of FIG. 73.
Figure 75:
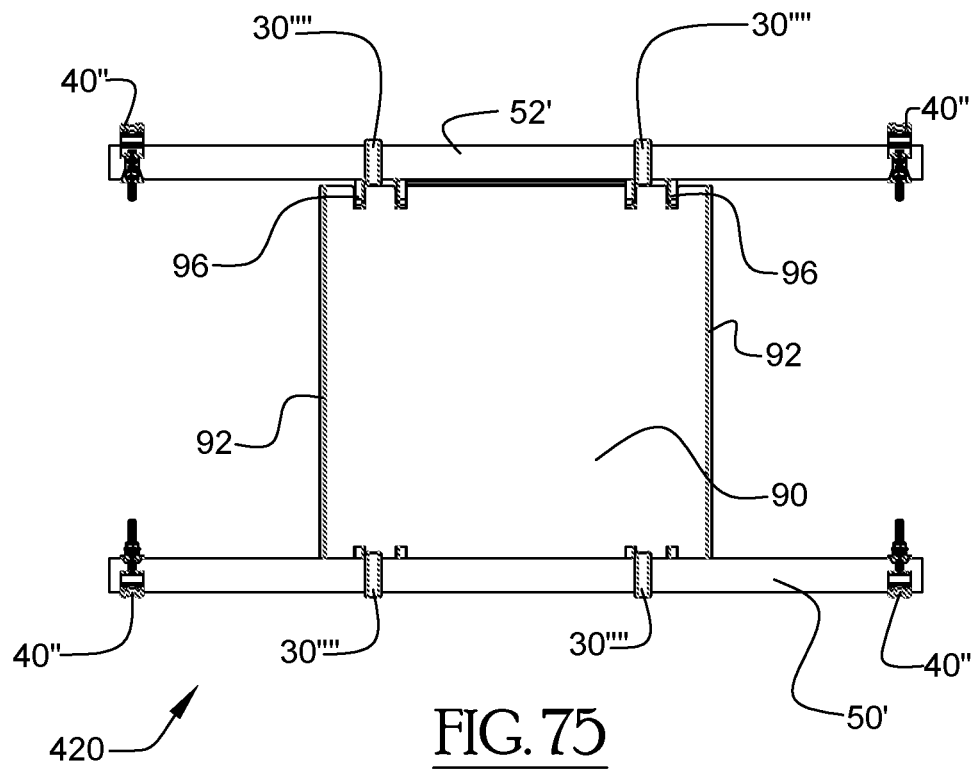
FIG. 75 is a top plan view of the support assembly of FIG. 73.
Figure 76:
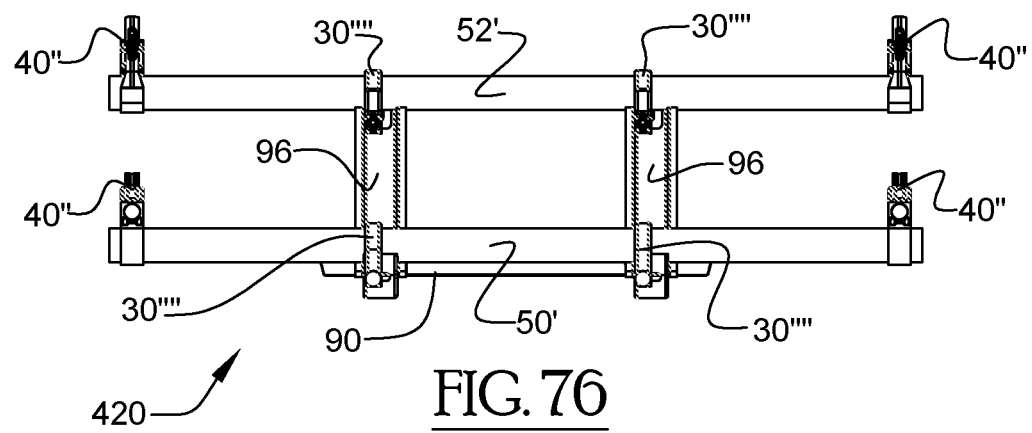
FIG. 76 is a front elevational view of the support assembly of FIG. 73.

Similar to the support assembly 200 described above, the support assembly 420 of FIGS. 73-79 generally includes a ballast tray 90 configured to accommodate one or more ballasts (e.g., ballasts 68—see FIG. 80A); a pair of spaced-apart tubular members 50', 52', each of the spaced-apart tubular members 50', 52' configured to support one or more photovoltaic modules 66 above a support surface (see FIG. 80A), and a plurality of panel clamp members 40'' coupled to the tubular members 50', 52'. As shown in FIG. 73, a first pair of panel clamp members 40'' is coupled to a first one 50' of the pair of spaced-apart tubular members 50', 52', and a second pair of panel clamp members 40'' is coupled to a second one 52' of the pair of spaced-apart tubular members 50', 52'. Each of the panel clamp members 40'' is configured to secure a respective photovoltaic module frame of the one or more photovoltaic modules 66 to the support assembly 420.

However, unlike the support assembly 200 described above with regard to FIGS. 7-14, each of the spaced-apart tubular members 50', 52' of the support assembly 420 is connected to a pair of spaced-apart channel members 96 by base clamp members 30''''. When the support assembly 420 is disposed on the support surface (e.g., the roof), each of the channel members 96 longitudinally extends in a generally north-south direction. Referring to the exploded side view of FIG. 78, it can be seen that each of the channel members 96 has a curved first end 96a for receiving a bottom portion of the tubular member 50' disposed at the lower elevation and a curved second end 96b for receiving a bottom portion of the tubular member 52' disposed at the higher elevation. In addition, turning to the exploded perspective view of FIG. 77, it can be seen that the ends 96a, 96b of each channel member 96 are provided with a generally L-shaped slot 97 formed therein for receiving a fastener of a respective base clamp member 30''''. In the illustrative embodiment, as best shown in the side view of FIG. 79, each of the channel members 96 is generally L-shaped with curved corners so as to prevent damage to the support surface (e.g., the roof surface). Also, as shown in FIGS. 73, 78, and 79, the upstanding portion of each channel member 96, which supports the tubular member 52' disposed at the higher elevation, is provided with a pair of spaced-apart slots 98 disposed in one side thereof for receiving hook members 108 of a wind deflector bracket member 102 (as will be described in more detail hereinafter). Advantageously, the U-shaped cross-section of each channel member 96 increases the strength and rigidity of the channel member 96. Also, the U-shaped cross-section of each channel member 96 advantageously enables the channel members 96 to be used as wireways in the north-south direction of a photovoltaic array.

Next, the tubular members 50', 52' of the support assembly 420 will be described in more detail. Like the support assembly 200 described above with regard to FIGS. 7-14, each of the spaced-apart tubular members 50', 52' of the support assembly 420 extends in a generally east-west direction of the one or more photovoltaic modules 66 (see FIG. 80A). Also, referring to FIGS. 73-77, it can be see that, in the illustrative embodiment of FIGS. 73-79, each of the tubular members 50', 52' of the support assembly 420 is generally linear in shape (e.g., each of the tubular members 50', 52' has a straight pipe configuration). Advantageously, in the support assembly 420, the first and second tubular members 50', 52' are identical in form so that a single tube part can be interchangeably used for both the first and second tubular members 50', 52', thereby reducing the part costs of the support assembly 420 by obviating the need for different tubes to be formed for each of the first and second tubular members 50', 52'. Unlike the tubular members 50, 52 described above with regard to the support assembly 200, the first and second tubular members 50', 52' of the support assembly 420 are not provided with spaced-apart panel clamp slots 24 formed therein. Rather, with reference to FIGS. 90A and 90B, each panel clamp member 40'' is provided with a projection or protrusion 116 extending from an inside surface of the semi-circular tube receiving portion 41 of the panel clamp member 40'' that is pressed into the side of the tubular member 50', 52' when the panel clamp fastener 42 is tightened, thereby preventing a rotation of the panel clamp member 40'' on the tubular member 50', 52'.

Figure 77:
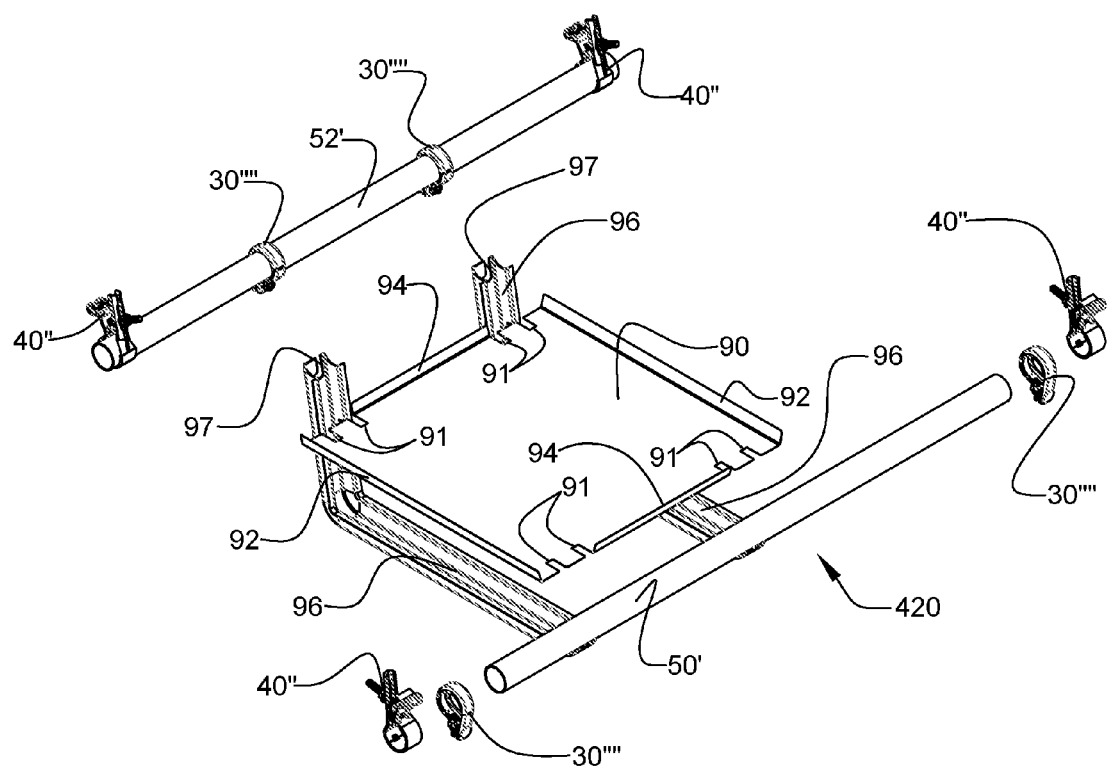
FIG. 77 is a partially exploded perspective view of the support assembly of FIG. 73, wherein the tubular members are exploded from the channel members in order to more clearly illustrate the manner in which the tubular members attach to the channel members, and the manner in which the panel clamp members attach to the tubular members.

Now, referring primarily to the exploded perspective view of FIG. 77, the ballast tray 90 of the support assembly 420 will be explained. Similar to that described above for the embodiment of FIGS. 1-6, in order to contain the one or more ballasts 68 therein, the ballast tray 90 of the embodiment of FIGS. 73-79 is provided with upturned sides 92 on the east and west edges thereof (e.g., see FIG. 77), and is provided with upturned sides 94 on the north and south edges thereof (e.g., see FIG. 77). The opposed side portions of the channel members 96 are received within the spaced-apart channel member slots 91 disposed at the north and south sides of the ballast tray 90.

Figure 90A:
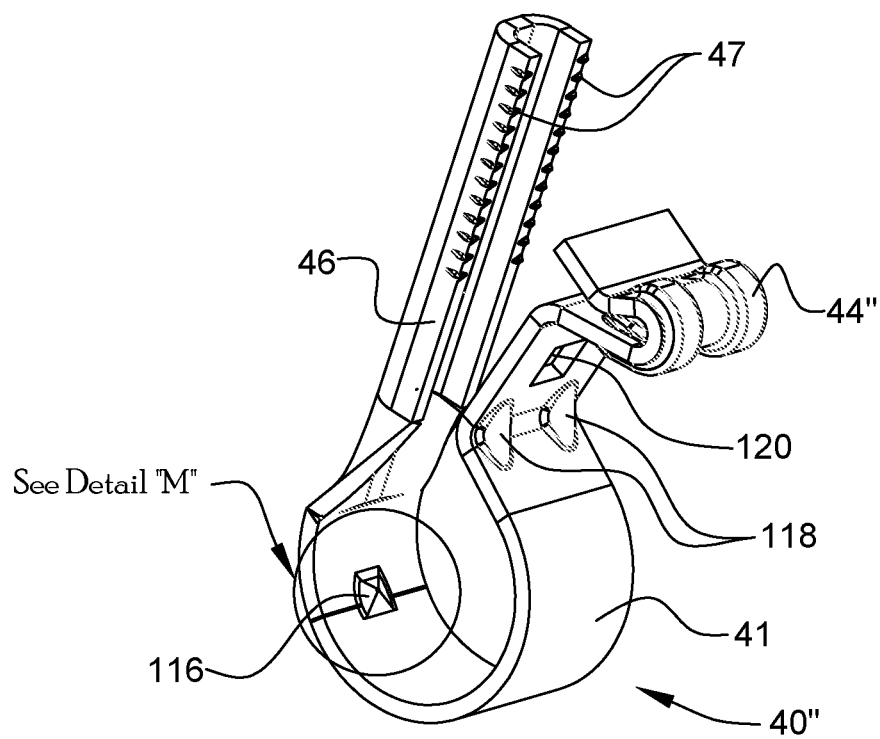
FIG. 90A is a side perspective view of a panel clamp member of the support assembly depicted in the embodiment of FIGS. 73-79.
Figure 90B:
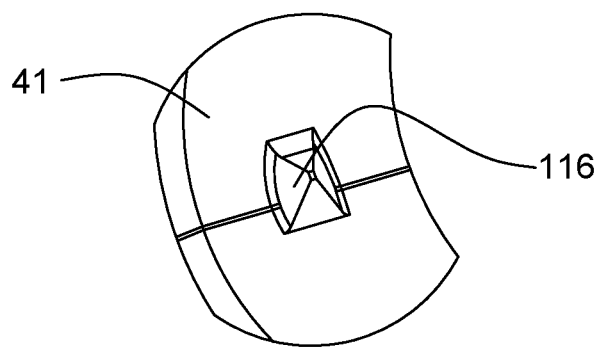
FIG. 90B is an enlarged perspective view of the protrusion on the semi-circular tube receiving portion of the panel clamp member illustrated in the side perspective view of FIG. 90A (Detail "M").

With particular reference to FIGS. 90A and 90B, the panel clamp member 40" used in conjunction with the support assembly 420 will be described. As shown in FIG. 90A, the panel clamp member 40" is similar in many respects to the aforedescribed panel clamp members 40, 40' illustrated in FIGS. 41-45. That is, like the panel clamp members 40, 40', the panel clamp member 40" of FIGS. 90A and 90B includes a semi-circular tube receiving portion 41, a fastener member 42" (see e.g., FIG. 80B), a looped end portion 44", and an upstanding portion 46 with serrations 47. Although, unlike the panel clamp members 40, 40', the panel clamp member 40" of FIGS. 90A and 90B further includes a projection or protrusion 116 extending from an inside surface thereof for "digging into" the outer side surface of the tubular member 50', 52 so as to limit or prevent a rotation of the panel clamp member 40" on the tubular member 50', 52'. In one or more exemplary embodiments, the projection or protrusion 116 may be formed in the semi-circular tube receiving portion 41 of the panel clamp member 40" by stamping a dimple into the outer surface of the semi-circular tube receiving portion 41. In addition, as shown in FIG. 90A, a pair of spaced-apart reinforcement gussets 118 are provided at the location where the semi-circular tube receiving portion 41 adjoins the downwardly extending portion of the looped end portion 44" so as to enhance the strength of the panel clamp member 40". Also, with reference again to the perspective view of FIG. 90A, it can be seen that the downwardly extending portion of the looped end portion 44" comprises a square aperture 120 formed therethrough for accommodating a shaft portion of the panel clamp fastener member 42" having a square-shaped cross-section disposed proximate to the head portion of the fastener member 42" (e.g., a square-shaped upper shaft portion of a carriage bolt disposed directly beneath the head of the bolt).

Figure 87A:
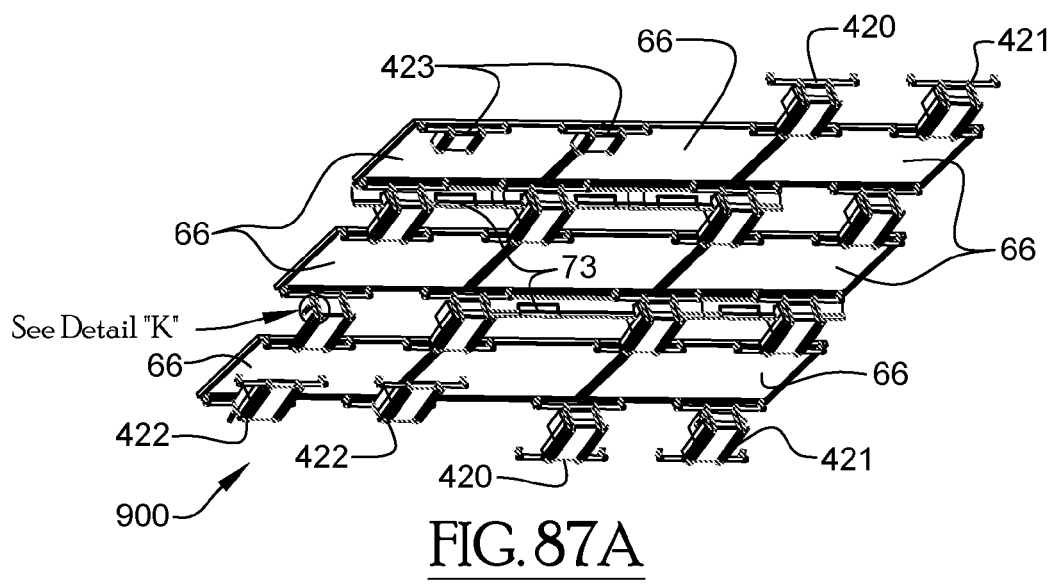
FIG. 87A is a bottom perspective view of the photovoltaic module array of FIG. 80A.
Figure 87B:
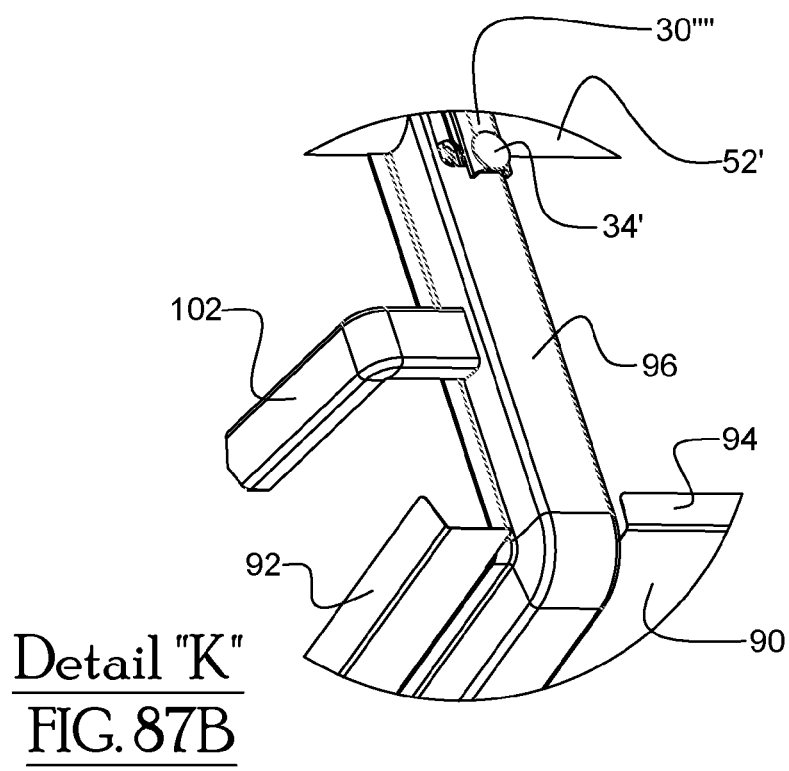
FIG. 87B is an enlarged rear perspective view of a wind deflector bracket and channel member in the photovoltaic module array of FIG. 87A, which illustrates the manner in which the wind deflector bracket is attached to the channel member (Detail "K")
Figure 89:
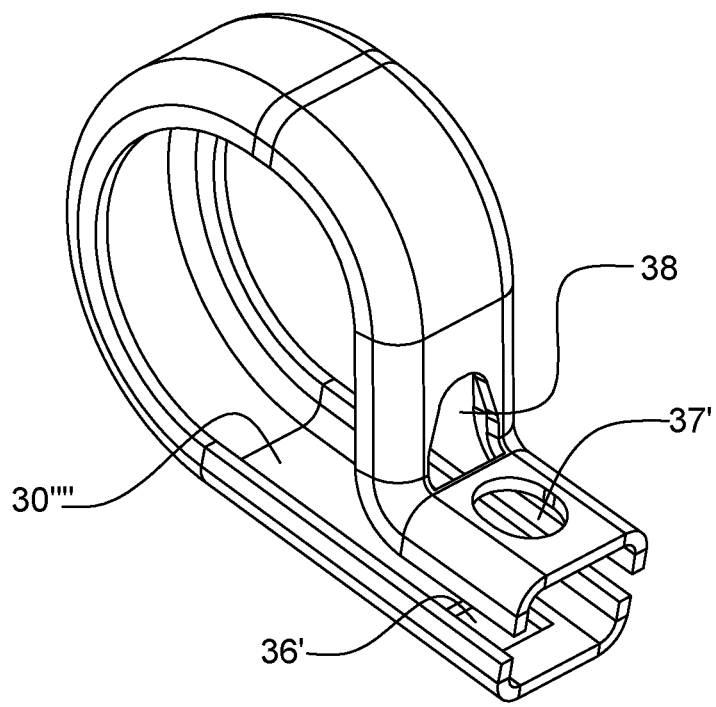
FIG. 89 is a top-side perspective view of a base clamp member of the support assembly depicted in the embodiment of FIGS. 73-79.

Now, referring to FIG. 89, the base clamp member 30"" used in conjunction with the support assembly 420 will be explained. Similar to that described above for the base clamp 30''', it can be seen that the base clamp member 30"" is provided with a square-shaped lower fastener aperture 36' in the bottom of the base clamp member 30"" and a circular upper fastener aperture 37' disposed above the lower fastener aperture 36'. As described above for the base clamp 30''', in the illustrative embodiment, the square-shaped lower fastener aperture 36' accommodates the square cross-section of a threaded fastener member near the fastener head, while the circular upper fastener aperture 37' accommodates the circular cross-section of the shaft of the threaded fastener member. In addition, as shown in FIG. 89, the base clamp member 30"" has a clearance aperture 38 formed therein, which is disposed to the side of the circular fastener aperture 37', for accommodating the nut of the base clamp fastener member and/or accommodating a tool (e.g., a socket) used to tighten the nut of the base clamp fastener member. As shown in the detail view of FIG. 87B, each base clamp member 30"" is secured to its respective tubular member 50', 52 by the base clamp fastener 34'.

In an exemplary embodiment, the constituent components of the support assemblies 100, 200, 300, 300', 400, and 420 are formed from a suitable metallic material, and do not comprise any plastic. For example, the constituent components of the support assemblies 100, 200, 300, 300', 400, and 420 may be stamped and/or extruded from a strong, yet lightweight metal.

FIGS. 29-38 illustrate a photovoltaic system 500 according to one embodiment of the present invention. The illustrated photovoltaic system or array 500 includes a 3×4 array of solar panels or photovoltaic modules 66 configured to be disposed on a substantially flat support surface (e.g., with a pitch range of about 0 degrees to about 5 degrees) in the form of a building rooftop by a mounting system according to the present invention. The illustrated mounting system includes a plurality of support assemblies 100, 101, 201, 202 that rest on the support surface and support and orient the photovoltaic modules 66 above the support surface and a plurality of ballasts 68 in the form of ballast blocks that weight the support assemblies 100, 101, 201, 202 to the support surface to maintain the position of the support assemblies 100, 101, 201, 202 on the support surface. The illustrated photovoltaic system 500 has each of the rectangular-shaped photovoltaic modules 66 oriented in a landscape orientation, that is, with the longest axis of the photovoltaic modules 66 extending in a lateral or side-to-side direction, which is typically the east-west direction. It is noted, however, that the photovoltaic modules can alternatively be oriented by the support assemblies 100, 101, 201, 202 in a portrait orientation, that is, with the longest axis of the photovoltaic modules 66' extending in a forward-rearward direction which is typically the south-north direction (see FIGS. 60A-61B). In either the landscape or portrait orientations, the illustrated photovoltaic modules are supported in an inclined position such that the forward end of each photovoltaic module 66 is positioned lower than its rearward end so that typically the southern end is positioned lower than the northern end.

With reference to the perspective view of FIG. 31, it can be seen that the south edge of the first row of photovoltaic modules 66 in the illustrated photovoltaic system 500 are supported using support assemblies 201, 202. The support assemblies 201, 202 are similar to the support assemblies 200 described above, except that each of the support assemblies 201, 202 is only provided with one tubular member 50. In FIG. 31, the ballast trays 10' of the three (3) support assemblies 201 are disposed in front of the photovoltaic modules 66, while the ballast trays 10' of the two (2) support assemblies 202 are tucked underneath the photovoltaic modules 66 in the south row so as to minimize the footprint of the photovoltaic system 500 on the support surface (e.g., on the roof). While not explicitly shown in the embodiment of FIGS. 29-38, it is to be understood that one or more of the support assemblies at the north edge of the photovoltaic array may also be tucked underneath the north row of photovoltaic modules 66. With the exception of the aforedescribed south edge of the first row of photovoltaic modules 66, the remainder of the photovoltaic modules 66 in the illustrated photovoltaic system 500 of FIGS. 29-38 are supported using the support assemblies 100, 101. The support assemblies 101 are identical to the support assemblies 100, except that they are tucked underneath the photovoltaic modules 66 at the east edge of the photovoltaic system 500 (i.e., they are tucked underneath the photovoltaic modules 66 at the east end of each row of the photovoltaic array). Although not explicitly shown in the embodiment of FIGS. 29-38, it is to be understood that one or more of the support assemblies at the west edge of the photovoltaic array may also be tucked underneath the rows of photovoltaic modules 66.

Figure 38:
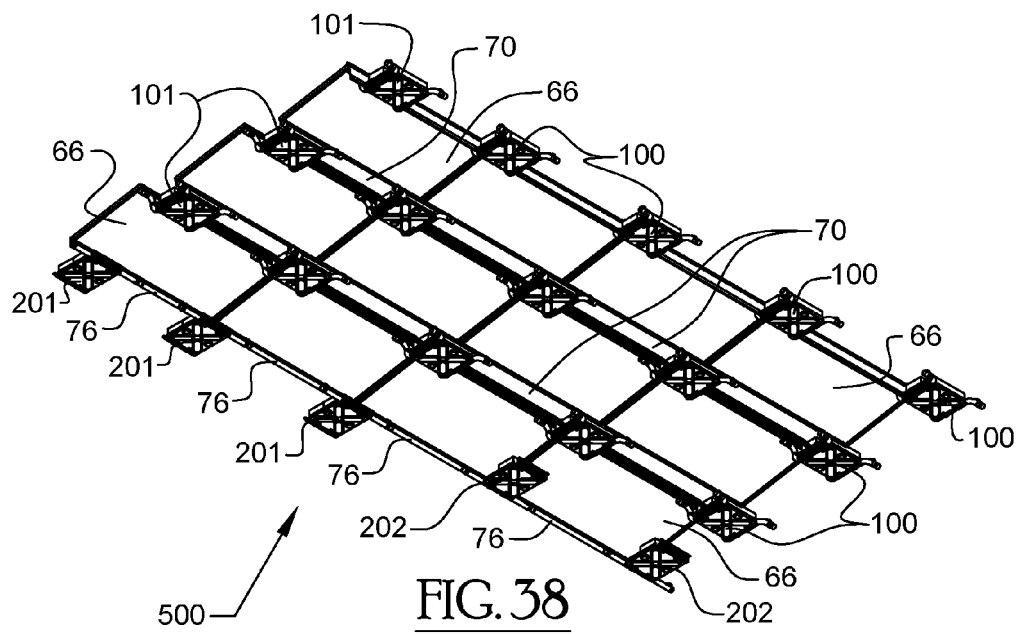
FIG. 38 is another bottom-side perspective view of the photovoltaic module array of FIG. 29, wherein the array is being viewed from a different angle than that of FIG. 36.

Turning to the perspective views of FIGS. 31 and 38, it can be seen that the support assemblies 201, 202 in the southernmost row of the illustrated photovoltaic system 500 are connected to one another by means of a plurality of generally straight connector tubes 76 extending in an east-west direction of the photovoltaic array. More particularly, in the embodiment of FIGS. 29-38, the tubular member 50 of each support assembly 201, 202 is connected to one or more adjacent support assemblies 201, 202 by means of one or more connector tubes 76. Advantageously, the connector tubes 76 in the photovoltaic system 500 of FIGS. 29-38 are configured to provide additional structural support in the east-west direction, and additionally to distribute a load between the plurality of support assemblies 201, 202 so that a ballast weight is capable of being reduced. While not explicitly shown in the embodiment of FIGS. 29-38, it is to be understood that one or more additional connector members may be used to connect support assemblies in different rows of the photovoltaic array to one another. These additional connector members would extend in a generally north-south direction of the photovoltaic array so as to provide additional structural support in the north-south direction.

Figure 71:
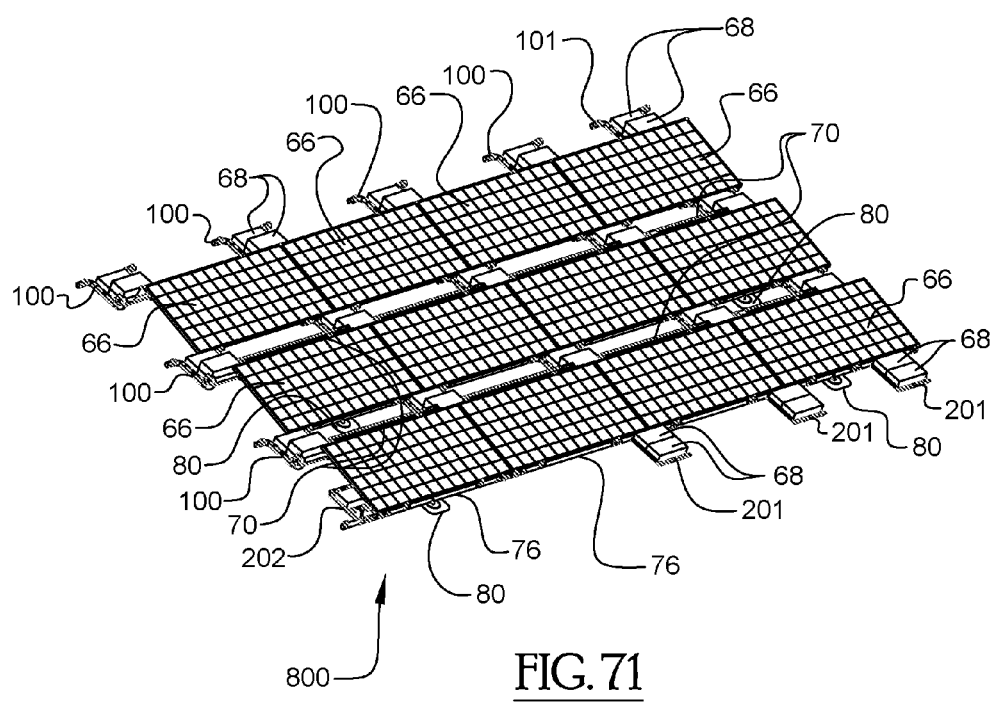
FIG. 71 is a top-side perspective view of a photovoltaic module array, according to yet another illustrative embodiment of the invention, which is similar to the embodiment of FIGS. 29-38, except that some of connector tubes connecting the support assemblies to one another in an east-west direction are attached to the roof using roof mounts.
Figure 72A:
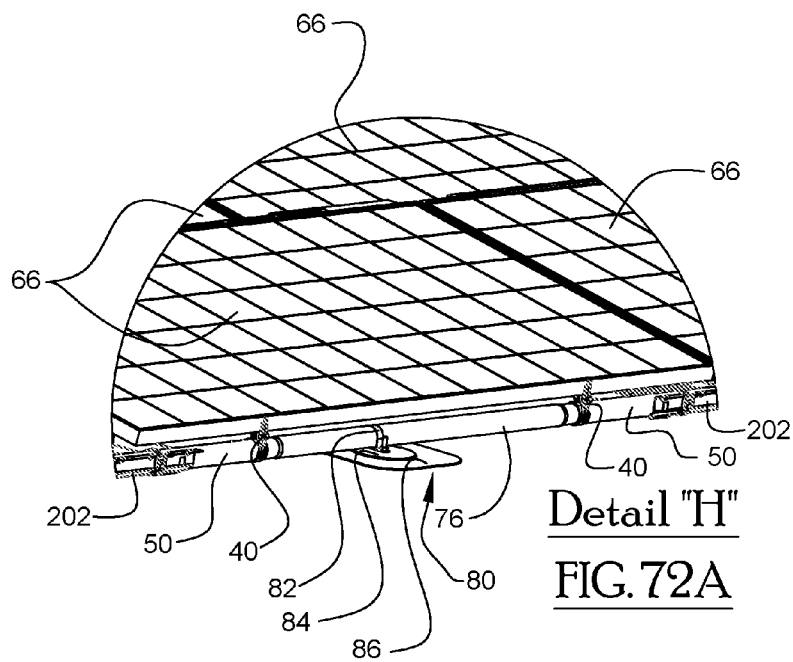
FIG. 72A is an enlarged perspective view of a portion of the photovoltaic module array of FIG. 72B, which illustrates the roof mount used to secure one of the east-west connector tubes to the roof (Detail "H")
Figure 72B:
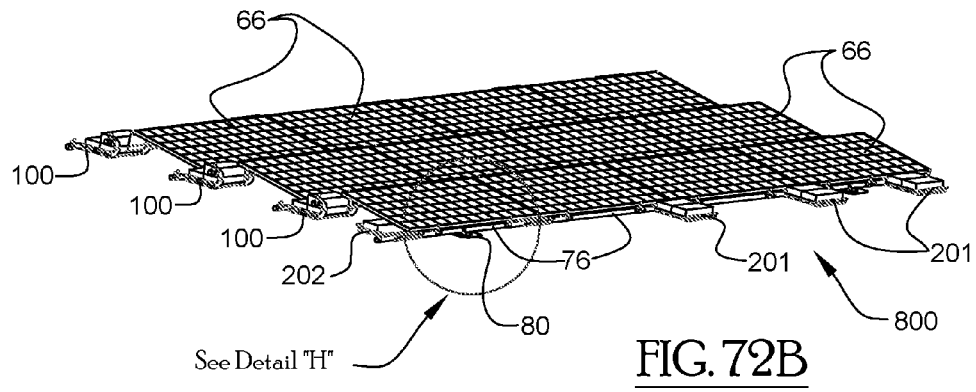
FIG. 72B is another perspective view of the photovoltaic module array of FIG. 71.

Another illustrative embodiment of a photovoltaic system comprising a plurality of plurality of photovoltaic modules 66 disposed in an array is seen generally at 800 in FIGS. 71-72B. Referring to these figures, it can be seen that, in many respects, the illustrative embodiment of FIGS. 71-72B is similar to that of the embodiment of FIGS. 29-38. Moreover, many elements are common to both such embodiments. For the sake of brevity, the elements that the embodiment of the photovoltaic system of FIGS. 71-72B has in common with the embodiment of FIGS. 29-38 will not be discussed because these components have already been explained in detail above. Furthermore, in the interest of clarity, these elements are denoted using the same reference characters that were used in the embodiment of FIGS. 29-38.

Unlike the aforedescribed photovoltaic system 500 depicted in FIGS. 29-38, the photovoltaic system 800 of FIGS. 71-72B utilizes a plurality of roof mounts 80 in order to positively attach the photovoltaic system 800 to the support surface (e.g., to the roof). That is, unlike the non-penetrating photovoltaic system 500 described above, which does not penetrate the support surface, the roof mounts 80 of the photovoltaic system 800 may be designed to penetrate the support surface (e.g., penetrate the roof membrane) so that they may be affixedly attached to one or structural members (e.g., joists, beams, or roof rafters) or to one or more other elements of the roofing system (e.g., to the roofing membrane or the roof deck). For example, the roof mounts 80 may be required for photovoltaic systems installed in geographical regions with unusually high winds, or in regions having particular seismic mounting requirements.

With particular reference to the detail view of FIG. 72A (i.e., Detail "H"), it can be seen that, in the illustrated embodiment of FIGS. 71-72B, each roof mount 80 generally comprises a roof mount clamp member 82 that is secured to one of the connector tubes 76, an intermediate plate 84 disposed at the base of the roof mount clamp member 82, and a flashing base plate 86 disposed underneath the intermediate plate 84. The flashing base plate 86 is configured to prevent water from entering into the space beneath the support surface (e.g., to prevent water from rain or snow from entering the joist space beneath the roof). While not explicitly shown in FIGS. 71-72B, each roof mount 80 further comprises a fastener member (e.g., a bolt or screw) that secures the respective roof mount 80 to the structural member (e.g., the joist, beam, or roof rafter) or to one or more other elements of the roofing system (e.g., to the roofing membrane or the roof deck).

Figure 33:
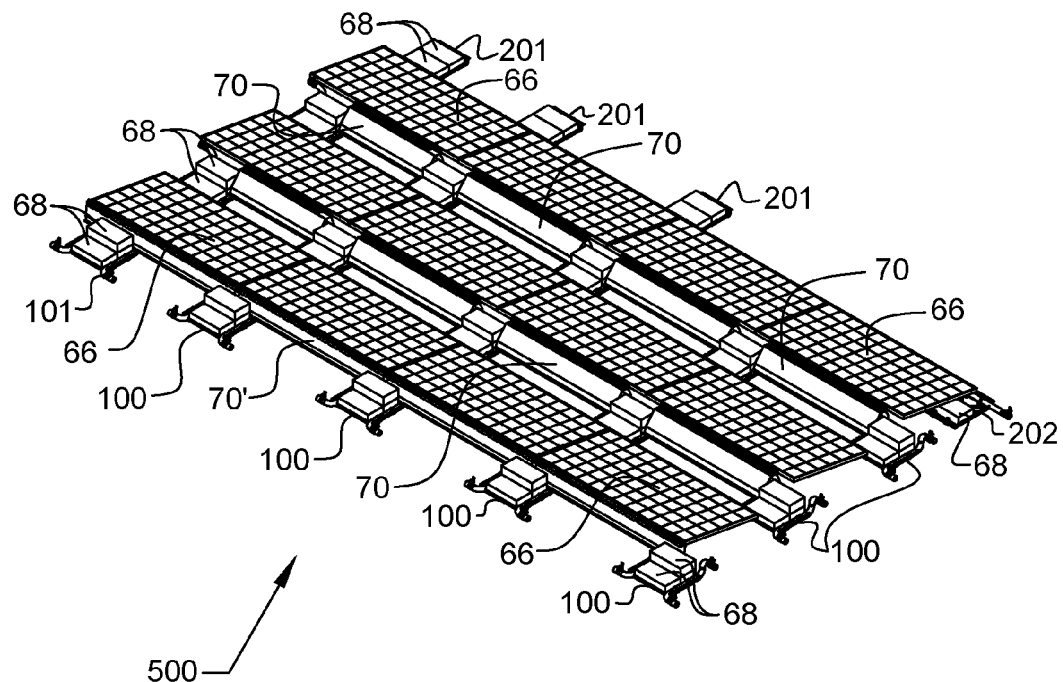
FIG. 33 is another top-side perspective view of the photovoltaic module array of FIG. 29.
Figure 34:
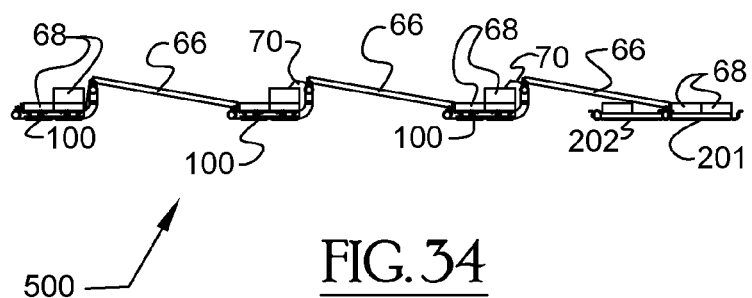
FIG. 34 is a west side elevational view of the photovoltaic module array of FIG. 29.
Figure 35:
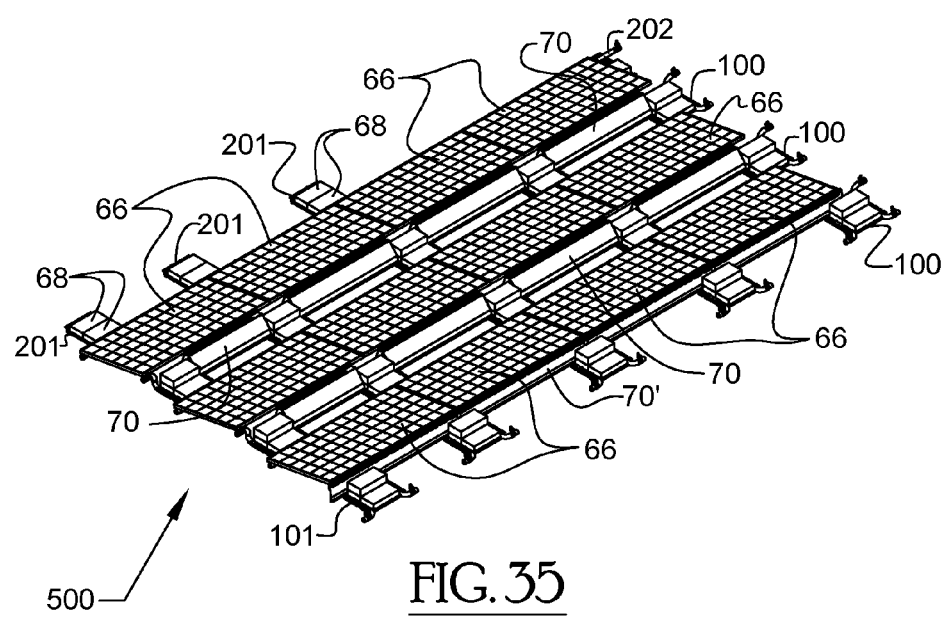
FIG. 35 is yet another top-side perspective view of the photovoltaic module array of FIG. 29.
Figure 36:
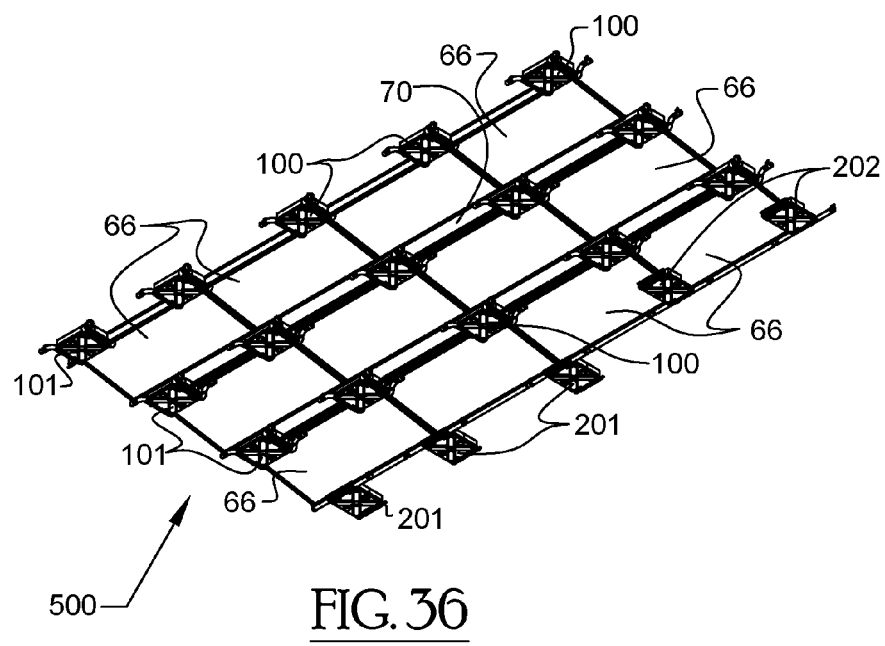
FIG. 36 is a bottom-side perspective view of the photovoltaic module array of FIG. 29.
Figure 37:
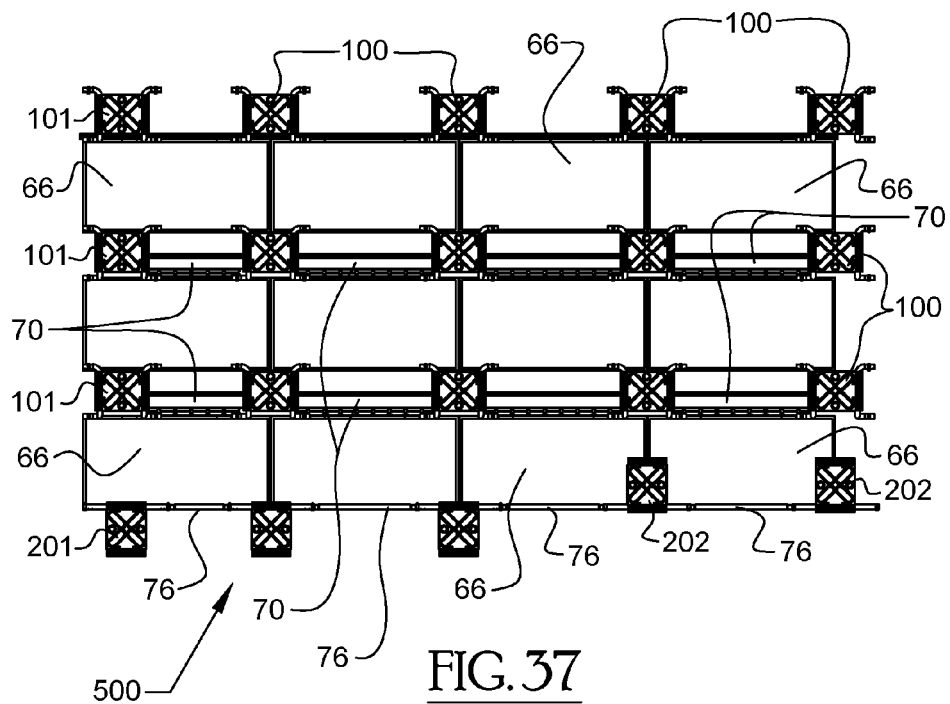
FIG. 37 is a bottom plan view of the photovoltaic module array of FIG. 29.

Both the illustrative photovoltaic systems 500, 800 in FIGS. 29-38 and 71-72B further include a plurality of wind deflectors 70, 70' supported by the support assemblies 100, 101 of the array in order to reduce wind load by deflecting the wind up and over the array of photovoltaic modules 66 rather than under the photovoltaic modules 66. As shown in FIGS. 33 and 35, the intermediate wind deflectors 70 generally extend between the support assemblies 100 in the middle of the array, while the wind deflectors 70' at the north side of the array generally span the full width of the photovoltaic array. As shown in FIGS. 33 and 35, the wind deflectors 70' at the north side of the array generally have a steeper slope than the intermediate wind deflectors 70 in the middle of the array.

Now, further features of the wind deflectors 70 will be explained in conjunction with the photovoltaic systems in the illustrative embodiments of FIGS. 60A-61B and FIGS. 62A-63. Initially, as shown in the illustrative photovoltaic system 600 of FIGS. 60A-61B, which comprises a 3×3 array of photovoltaic modules 66' disposed in a portrait configuration, it can be seen that a bottom edge portion of each wind deflector member 70 is coupled to the tab members 35 on the base clamp members 30''' of the support assemblies 400, while the top edge portion of each wind deflector member 70 attaches to one or more panel clamp members 40 (refer to Detail "D" in FIG. 61A). More particularly, as shown in the detail view of FIG. 61A, the generally horizontal bottom ledge or deflector flange 71 of each wind deflector member 70 is received within the slot defined by the tab members 35 on the base clamp members 30''' so as to hold the bottom edge of the wind deflector member 70 in place. In the illustrative embodiment, the top edge portion of each wind deflector member 70 is secured in place by means of the fasteners 42 of the panel clamp members 40. Thus, advantageously, the bottom edge portions of the wind deflector members 70 are configured to be attached to the support assemblies 400 without the use of fasteners.

In an alternative embodiment, the ballast trays 10''' of the support assemblies 400 may comprise a projection defining a slot for receiving the bottom edge portion of the wind deflector member 70, rather than the bottom edge portion of the wind deflector member 70 being held by the tab members 35 on the base clamp members 30'''.

Turning again to the detail view of FIG. 61A, additional features of the wind deflector members 70 will be described. As shown in this figure, the wind deflector member 70 comprises a middle sloped portion 74 and a top ledge portion connected to the top end of the middle sloped portion 74. The top ledge portion of the wind deflector member 70 is provided with a plurality of apertures 72 formed therein for generally equalizing a pressure above and below the photovoltaic modules 66' in the photovoltaic system 600 of FIGS. 60A-61B (e.g., equalizing the pressure resulting from wind forces acting on the array). In addition, the plurality of apertures 72 in the top ledge portion of the wind deflector member 70 are further used for ventilating the region beneath photovoltaic modules 66' so as to reduce a temperature of the region beneath the photovoltaic modules 66'. Also, the plurality of apertures 72 in the top ledge portion of the wind deflector member 70 further allow for dimensional differences in the photovoltaic modules 66', and accommodate thermal expansion and contraction of the wind deflector members 70. In one exemplary embodiment, the plurality of apertures 72 in the top ledge portion of the wind deflector member 70 may be in the form of elongate slots with their longitudinal axes extending in the lengthwise direction of the wind deflector members 70.

Figure 61A:
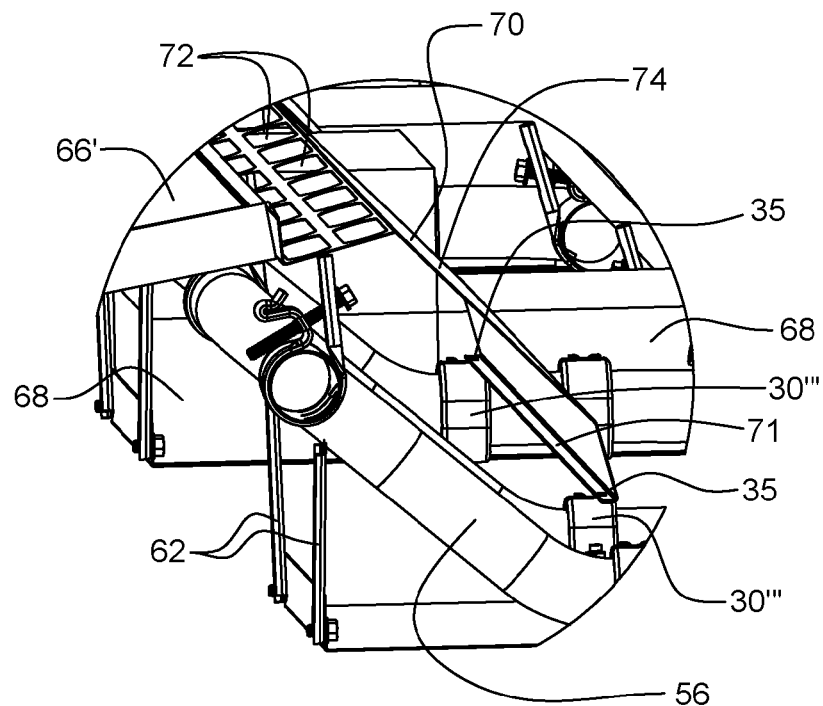
FIG. 61A is an enlarged side perspective view of a portion of the photovoltaic module array of FIG. 61B, which illustrates the venting apertures in the wind deflector member and the attachment of the bottom edge of the wind deflector member to the base clamp member of the support assembly (Detail "D")
Figure 61B:
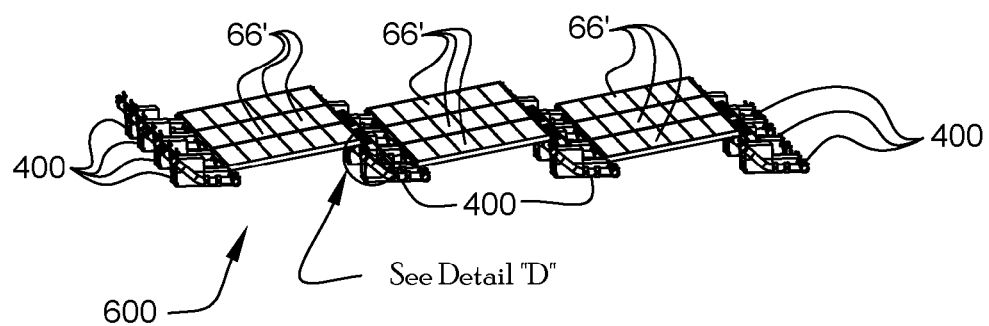
FIG. 61B is another perspective view of the photovoltaic module array of FIG. 60B.

In one or more embodiments, at least one portion of the wind deflector member 70 is provided with an increased slope so as to increase an aerodynamic efficiency of the wind deflector member 70 (e.g., the portion of the wind deflector 70 in FIG. 61A between the bottom deflector flange 71 and the middle sloped portion 74 has an increased slope).

Figure 62A:
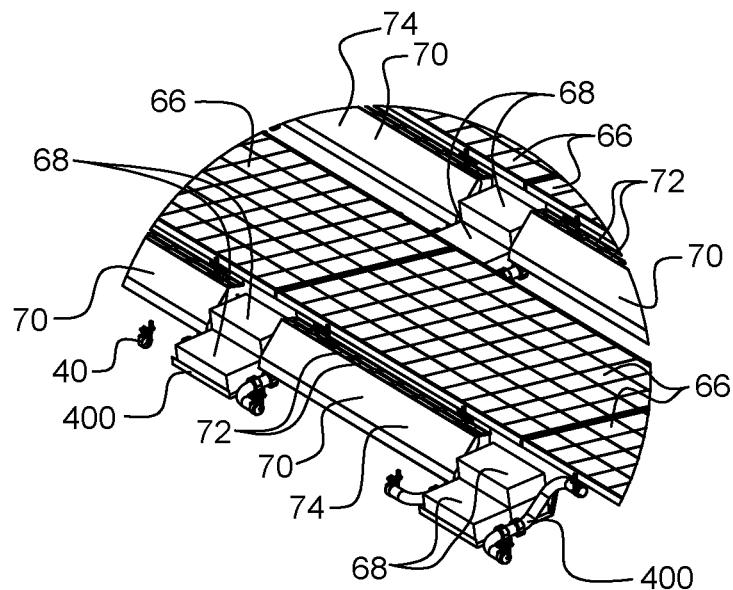
FIG. 62A is an enlarged perspective view of a portion of the photovoltaic module array of FIG. 62B, which illustrates the angled wind deflector member disposed between the support assemblies (Detail "E")
Figure 62B:
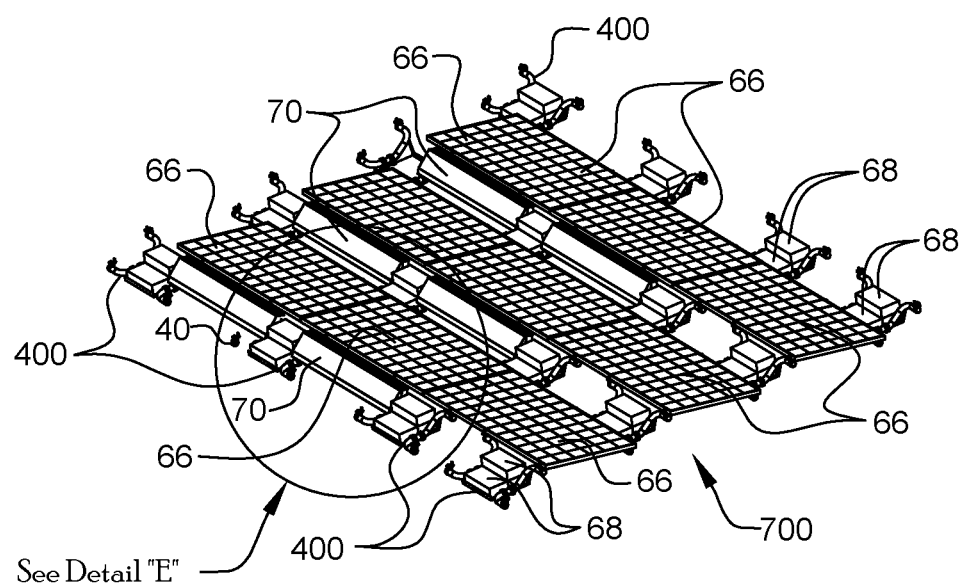
FIG. 62B is a perspective view of a photovoltaic module array, according to yet another illustrative embodiment of the invention, wherein the photovoltaic modules of the array are disposed in a landscape configuration and the photovoltaic modules are supported using a plurality of support assemblies of the embodiment of FIGS. 22-28.
Figure 63:
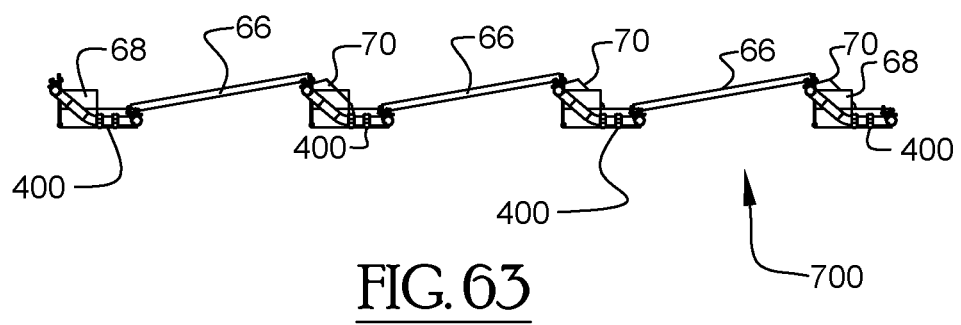
FIG. 63 is a side elevational view of the photovoltaic module array of FIG. 62B.

Turning to the illustrative photovoltaic system 700 of FIGS. 62A-63, which comprises a 3×3 array of photovoltaic modules 66 disposed in a landscape configuration, it can be seen that wind deflectors 70 generally extend between the support assemblies 400. More particularly, as shown in the detail view of FIG. 62A, a wind deflector 70 extends between the stacked ballasts 68 disposed in the ballast pans 10''' of the support assemblies 400.

In an exemplary embodiment, the wind deflector members 70 are preferably formed from a lightweight metallic material (e.g., a suitable lightweight metal), but can alternatively comprise any other suitable material. The wind deflector 70 is preferably lightweight and non-structural, that is, it does not significantly increase the structural strength or stiffness of the photovoltaic array.

FIGS. 80A-84, 87A, and 88A illustrate a photovoltaic system 900 according to still another embodiment of the present invention. The illustrated photovoltaic system or array 900 includes a 3×3 array of solar panels or photovoltaic modules 66 configured to be disposed on a substantially flat support surface (e.g., with a pitch range of about 0 degrees to about 5 degrees) in the form of a building rooftop by a mounting system according to the present invention. The illustrated mounting system includes a plurality of support assemblies 420', 421, 422, 423 that rest on the support surface and support and orient the photovoltaic modules 66 above the support surface and a plurality of ballasts 68 in the form of ballast blocks that weight the support assemblies 420', 421, 422, 423 to the support surface to maintain the position of the support assemblies 420', 421, 422, 423 on the support surface. Similar to the photovoltaic system 500 described above, the photovoltaic system 900 has each of the rectangular-shaped photovoltaic modules 66 oriented in a landscape orientation, that is, with the longest axis of the photovoltaic modules 66 extending in a lateral or side-to-side direction, which is typically the east-west direction. It is noted, however, that the photovoltaic modules can alternatively be oriented by the support assemblies 420', 421, 422, 423 in a portrait orientation, that is, with the longest axis of the photovoltaic modules 66' extending in a forward-rearward direction, which is typically the south-north direction (see FIGS. 60A-61B). In either the landscape or portrait orientations, the illustrated photovoltaic modules are supported in an inclined position such that the forward end of each photovoltaic module 66 is positioned lower than its rearward end so that typically the southern end is positioned lower than the northern end.

Figure 80A:
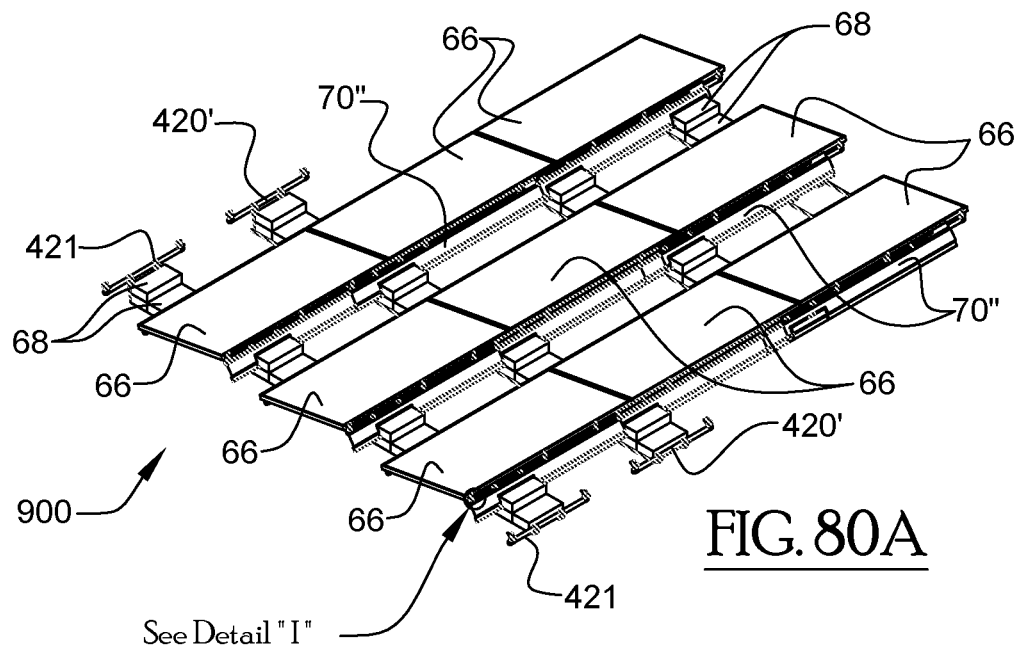
FIG. 80A is a top-side perspective view of a photovoltaic module array, according to still another illustrative embodiment of the invention, wherein the photovoltaic modules of the array are disposed in a landscape configuration and the photovoltaic modules are supported using a plurality of support assemblies, and wherein some of the support assemblies are tucked underneath the photovoltaic modules in the array.
Figure 80B:
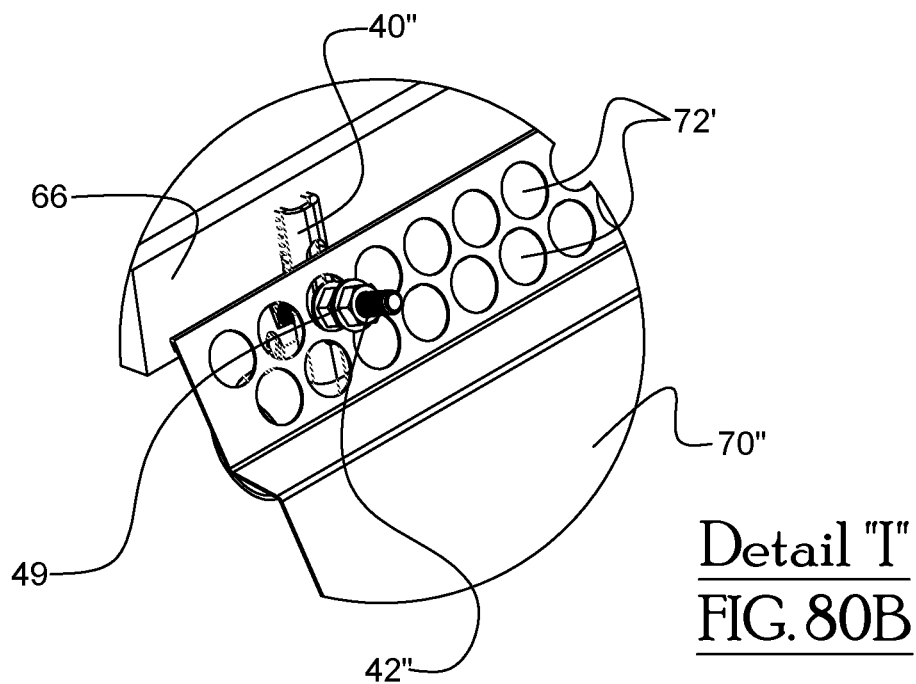
FIG. 80B is an enlarged perspective view of a corner of a wind deflector in the photovoltaic module array of FIG. 80A, which illustrates the venting apertures in the wind deflector member and the securement of the wind deflector to the panel clamp (Detail "I")
Figure 81A:
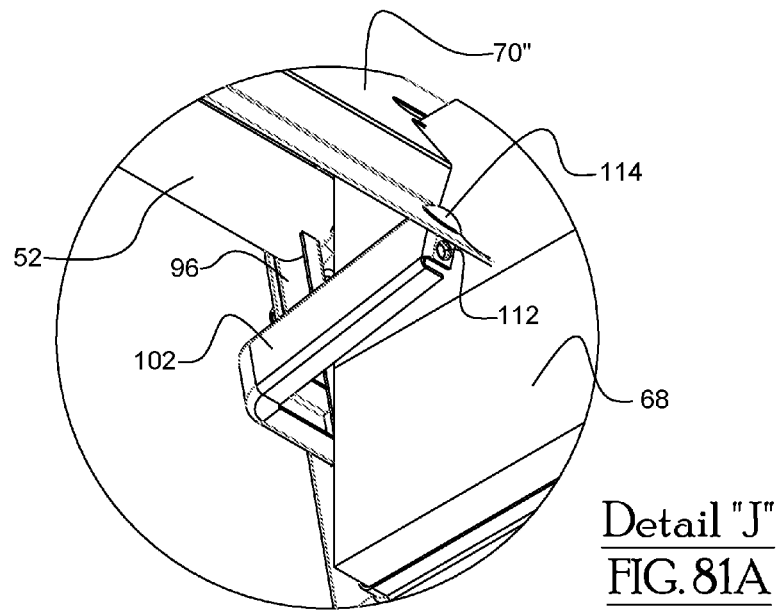
FIG. 81A is an enlarged perspective view of a wind deflector bracket in the photovoltaic module array of FIG. 81B, which illustrates the securement of the wind deflector to the wind deflector bracket (Detail "J")
Figure 81B:
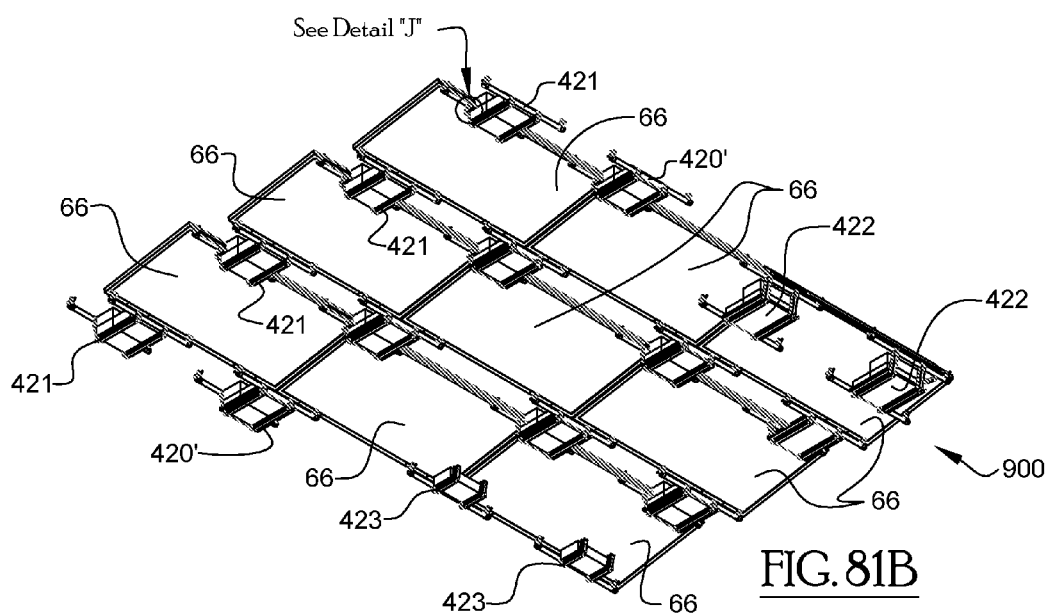
FIG. 81B is a bottom-side perspective view of the photovoltaic module array of FIG. 80A, wherein the photovoltaic module array is oriented in a south-facing manner.
Figure 82:
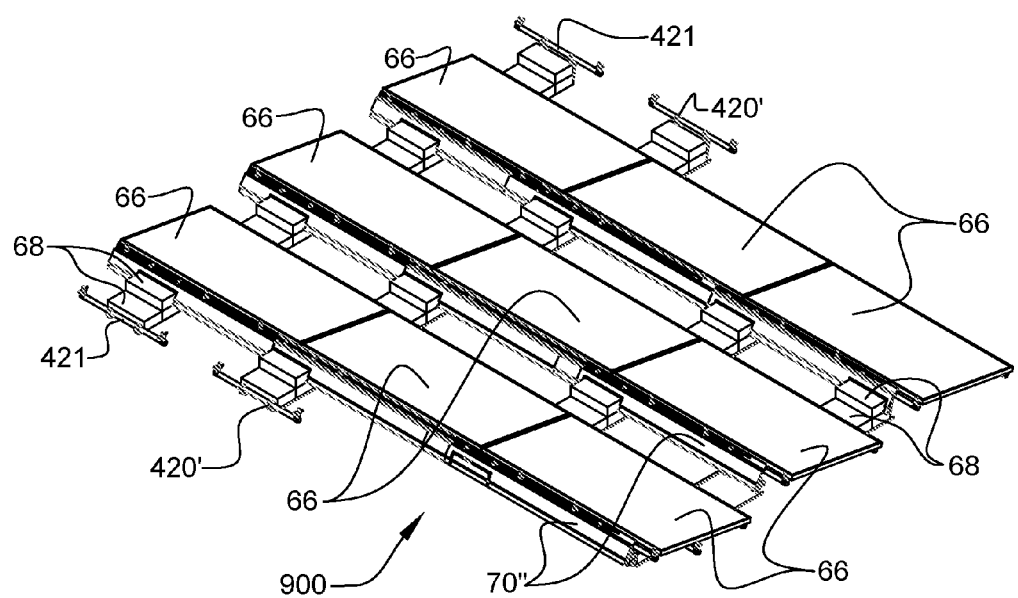
FIG. 82 is another top-side perspective view of the photovoltaic module array of FIG. 80A, wherein the photovoltaic module array is oriented in a south-facing manner.

With reference to the perspective views of FIGS. 80A and 81B, it can be seen that the north edge of the third row of photovoltaic modules 66 in the illustrated photovoltaic system 900 are supported using support assemblies 420', 421, 422. The support assemblies 420', 421, 422 have generally the same structure as the support assemblies 420 described above, except that the ballast trays 90 have been removed from the support assemblies 420', 421 in order to illustrate the underside of the ballasts 68 supported using the channel members 96. As shown in FIGS. 80A and 81B, the ballasts 68 of the support assemblies 420', 421 are disposed behind the photovoltaic modules 66, while the ballast trays 90 and the ballasts 68 of the two (2) support assemblies 422 are tucked underneath the photovoltaic modules 66 in the north row so as to minimize the footprint of the photovoltaic system 900 on the support surface (e.g., on the roof). Referring collectively to FIGS. 81B, 82, and 83, it can be seen that one or more of the support assemblies at the south edge of the photovoltaic array may also be tucked underneath the north row of photovoltaic modules 66. In particular, similar to the north edge of the photovoltaic system 900, the south edge of the first row of photovoltaic modules 66 in the illustrated photovoltaic system 900 are also supported using support assemblies 420', 421, 423. As shown in FIGS. 81B and 83, the ballasts 68 of the support assemblies 420', 421 are disposed in front of the photovoltaic modules 66, while the ballasts 68 of the two (2) support assemblies 423 are tucked underneath the photovoltaic modules 66 in the south row so as to minimize the footprint of the photovoltaic system 900 on the support surface (e.g., on the roof) and also to enhance the aesthetic appearance of the photovoltaic array. The support assemblies 423 are structurally similar to the support assemblies 420 described above, except that the channel members 96 of these support assemblies 423 only support a single ballast 68 (see FIG. 81B). Referring again to FIGS. 81B and 83, it can be seen that the support assemblies 421 are tucked underneath the photovoltaic modules 66 at the east edge of the photovoltaic system 900 (i.e., they are tucked underneath the photovoltaic modules 66 at the east end of each row of the photovoltaic array). In addition, as shown in the embodiment of FIGS. 80A-84, 87A, and 88A, the support assemblies at the west edge of the photovoltaic array are also be tucked underneath the rows of photovoltaic modules 66.

Figure 88A:
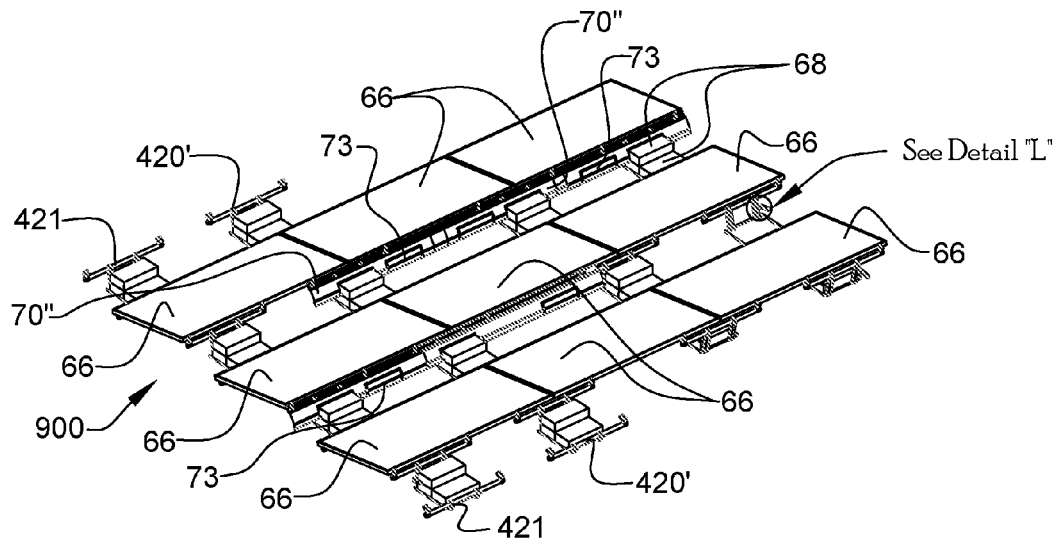
FIG. 88A is another top-side perspective view of the photovoltaic module array of FIG. 80A, wherein several wind deflectors have been removed to better illustrate the tucked support assemblies and the wind deflector bracket.

With reference to FIGS. 80A, 82, and 88A, it can be seen that the illustrative photovoltaic system 900 further includes a plurality of wind deflectors 70" supported by the support assemblies 420', 421, 422, 423 of the array in order to reduce wind load by deflecting the wind up and over the array of photovoltaic modules 66 rather than under the photovoltaic modules 66. As shown in FIGS. 80A and 88A, the wind deflectors 70" may be provided in sections across the width of the photovoltaic array so as to span generally the full width of the array. Also, as shown in FIG. 88A, the wind deflectors 70" may be provided with stamped ballast knock-out panels 73 that can be selectively removed from the wind deflectors 72" in order to accommodate the stacked ballasts 68 in the support assemblies 420', 421, 422, 423. In addition, as best illustrated in the detail view of FIG. 80B, the upper flange portions of the wind deflectors 70" are provided with a plurality of apertures 72' formed therethrough for generally equalizing a pressure above and below the photovoltaic modules 66 in the photovoltaic system 900 of FIGS. 80A-84, 87A, and 88A (e.g., equalizing the pressure resulting from wind forces acting on the array). Also, the plurality of apertures 72' in the upper flange portions of the wind deflectors 70" are further used for ventilating the region beneath photovoltaic modules 66 so as to reduce a temperature of the region beneath the photovoltaic modules 66.

Figure 88B:
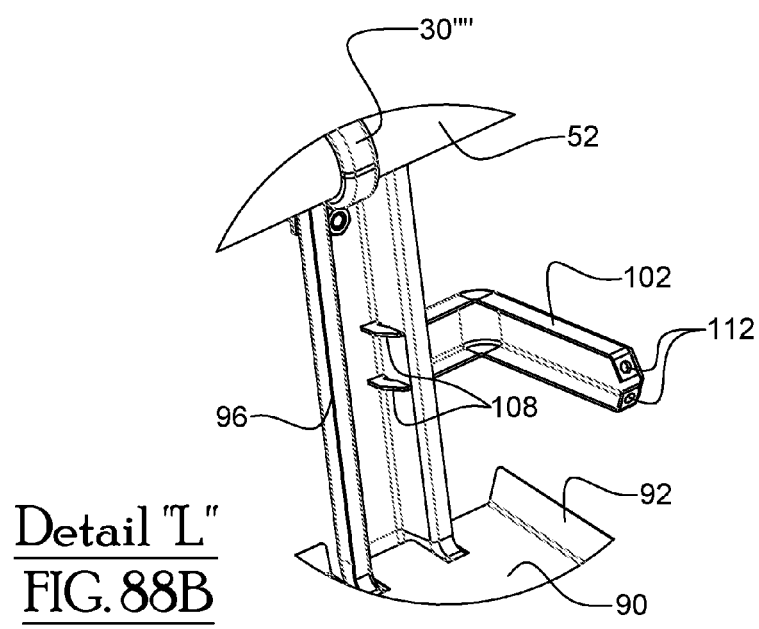
FIG. 88B is an enlarged frontal perspective view of a wind deflector bracket and channel member in the photovoltaic module array of FIG. 88A, which illustrates the manner in which the wind deflector bracket is attached to the channel member (Detail "L")

Now, the manner in which the wind deflectors 70" are supported by the support assemblies 420', 421, 422, 423 will be explained. Initially, as shown in the detail view of FIG. 80B, the top edge portion of each wind deflector member 70" is secured in place by means of the fasteners 42" of the panel clamp members 40". In particular, the fastener 42" of the panel clamp member 40" is inserted through one of the ventilation apertures 72' in the upper flange portion of the wind deflector 70", and the fastener 42" is secured to the wind deflector 70" using one or more nuts 49. As illustrated in the detail view of FIG. 81A, the bottom edge portion of each wind deflector member 70" is secured in place by means of the wind deflector bracket 102. More specifically, as shown in the detail views of FIGS. 87B and 88B, the wind deflector bracket 102 is attached to the upstanding portion of one of the channel members 96 by inserting the hook members 108 of the wind deflector bracket member 102 into the spaced-apart slots 98 of the channel member 96, and then rotating the wind deflector bracket 102 so that the wind deflector bracket member 102 is locked into place by means of the engagement between the hook members 108 of the wind deflector bracket member 102 and the slots 98 of the channel member 96. Then, the bottom edge portion of the wind deflector member 70" is secured to the wind deflector bracket 102 by means of the fastener 114 (see FIG. 81A).

Figure 85:
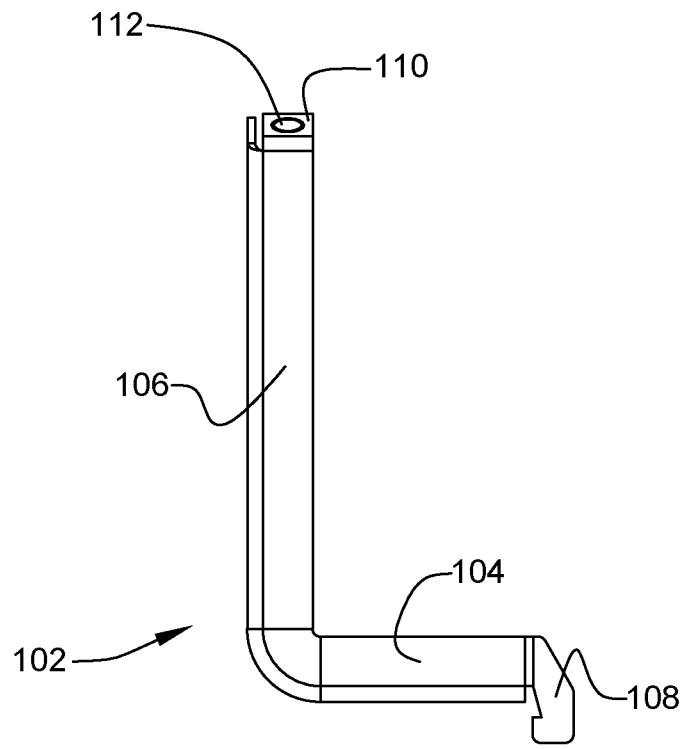
FIG. 85 is a side view of the wind deflector bracket illustrated in FIG. 81A.
Figure 86:
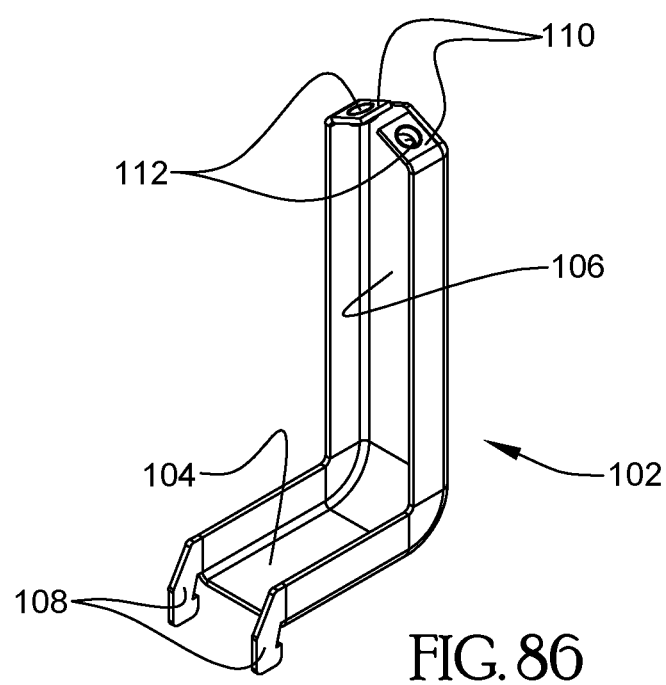
FIG. 86 is a perspective view of the wind deflector bracket illustrated in FIG. 81A.

Next, with reference to FIGS. 85 and 86, the structure of the illustrative wind deflector bracket 102 will be described. As shown in these figures, the wind deflector bracket 102 has a generally L-shaped body portion with a short leg 104 and a long leg 106 connected to the short leg 104. The short leg 104 is perpendicularly disposed relative to the long leg 106 (i.e., the leg members 104, 106 form an approximately 90 degree angle at their adjoining corner of the wind deflector bracket 102). As shown in FIGS. 85 and 86, the distal end of the short leg 104 of the wind deflector bracket 102 is provided with the pair of hook members 108, while the distal end of the long leg 106 of the wind deflector bracket 102 is provided with angled faces or surfaces 110. Each angled face 110 at the distal end of the long leg 106 comprises a respective threaded fastener aperture 112 for threadingly receiving the fastener 114 that secures the bottom edge portion of the wind deflector member 70" to the wind deflector bracket 102.

The mounting systems disclosed herein are fast and easy to install due to a very high degree of pre-assembly. This helps to reduce the total installed cost of the PV array thereby helping solar energy compete more effectively with fossil fuel derived energy. Logistic issues are simplified and logistic costs are reduced by the high degree of pre-assembly and because the main assembly folds into a shipping position such that the assemblies nest and stack in a configuration that allows for more assemblies to fit within a truck or container. The PV module support assemblies described herein also allow for adjustment in multiple dimensions which allows the array to conform to the pitch and roll of the underlying roof surface.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A support assembly for supporting one or more photovoltaic modules on a support surface, said support assembly comprising:
a pair of spaced-apart channel members, at least one of said pair of spaced-apart channel members configured to extend in a generally north-south direction of said one or more photovoltaic modules;
a pair of spaced-apart tubular members coupled to said pair of spaced-apart channel members, each of said pair of spaced-apart tubular members configured to support one or more photovoltaic modules above a support surface, and at least one of said pair of spaced-apart tubular members configured to extend in a generally east-west direction of said one or more photovoltaic modules; and
a plurality of clamp members, at least a first one of said plurality of clamp members coupled to a first one of said pair of spaced-apart tubular members, and at least a second one of said plurality of clamp members coupled to a second one of said pair of spaced-apart tubular members, each of said plurality of clamp members configured to secure a respective photovoltaic module frame of said one or more photovoltaic modules to said support assembly, and at least one of said plurality of clamp members comprising a generally horizontal landing surface for a bottom surface of a respective said photovoltaic module frame so as to facilitate the engagement of said at least one of said plurality of clamp members with said photovoltaic module frame, and said at least one of said plurality of clamp members further comprising a fastener member configured to secure said at least one of said plurality of clamp members to said photovoltaic module frame, a portion of said fastener member extending transversely below said generally horizontal landing surface.

2. The support assembly according to claim 1, further comprising a ballast tray configured to accommodate one or more ballasts, said ballast tray coupled to said pair of spaced-apart channel members.

3. The support assembly according to claim 2, wherein said ballast tray comprises one or more slots for receiving a cross-sectional portion of one of said pair of spaced-apart channel members.

4. The support assembly according to claim 1, further comprising a base clamp for coupling one of said pair of spaced-apart channel members to a respective one of said pair of spaced-apart tubular members.

5. The support assembly according to claim 1, wherein each of said pair of spaced-apart tubular members is generally linear in shape.

6. The support assembly according to claim 1, wherein at least one of said pair of spaced-apart channel members comprises a cavity extending along a length thereof, said cavity of said at least one of said pair of spaced-apart channel members configured to form a wireway for one or more wires of said one or more photovoltaic modules.

7. The support assembly according to claim 1, wherein said at least one of said plurality of clamp members further comprises a protrusion configured to engage one of said pair of spaced-apart tubular members so as to limit or prevent a rotation of said at least one of said plurality of clamp members on said one of said pair of spaced-apart tubular members.

8. A support assembly for supporting one or more photovoltaic modules on a support surface, said support assembly comprising:
a ballast tray configured to accommodate one or more ballasts;
at least one support member coupled to said ballast tray, said at least one support member configured to support one or more photovoltaic modules above a support surface; and
at least one clamp member coupled to said at least one support member, said at least one clamp member including a looped portion for receiving an edge portion of a photovoltaic module frame, said at least one clamp member further including an upstanding portion configured to be disposed proximate to a side surface of said photovoltaic module frame when said at least one clamp member is engaged with said photovoltaic module frame, and said at least one clamp member additionally including a fastener member configured to secure said at least one clamp member to said photovoltaic module frame, a portion of said fastener member configured to extend underneath said photovoltaic module frame.

9. The support assembly according to claim 8, wherein said at least one clamp member comprises a single body portion, said fastener member configured to secure said single body portion of said at least one clamp member to said photovoltaic module frame.

10. The support assembly according to claim 9, wherein, when said fastener member of said at least one clamp member is tightened, said at least one clamp member is configured to deform said at least one support member so as to resist a rotation of said at least one clamp member about said at least one support member.

11. The support assembly according to claim 8, wherein said at least one clamp member is rotatable relative to said at least one support member prior to said at least one clamp member being secured to said photovoltaic module frame so as to allow said support assembly to accommodate undulations and uneven regions of said support surface.

12. The support assembly according to claim 8, wherein said at least one clamp member further comprises a generally horizontal landing surface for a bottom surface of said photovoltaic module frame so as to facilitate the engagement of said at least one clamp member with said photovoltaic module frame.

13. The support assembly according to claim 8, wherein said upstanding portion of said at least one clamp member comprises at least one serrated edge portion, said at least one serrated edge portion configured to provide integrated grounding for said one or more photovoltaic modules, and said at least one serrated edge portion further configured to resist an uplift of said one or more photovoltaic modules resulting from wind forces acting on said one or more photovoltaic modules.

14. The support assembly according to claim 8, further comprising at least one channel member coupling said at least one support member to said ballast tray.

15. A mounting system for supporting a photovoltaic module on a support surface, said mounting system comprising:
a photovoltaic module having a photovoltaic module frame;
a ballast tray configured to accommodate one or more ballasts;
at least one support member coupled to said ballast tray, said at least one support member configured to support said photovoltaic module above a support surface; and
at least one clamp member coupled to said at least one support member, said at least one clamp member including a looped portion receiving an edge portion of said photovoltaic module frame, said at least one clamp member further including a generally horizontal landing surface for a bottom surface of said photovoltaic module frame so as to facilitate the engagement of said at least one clamp member with said photovoltaic module frame, and said at least one clamp member further comprising a fastener member securing said at least one clamp member to said photovoltaic module frame, a portion of said fastener member extending transversely below said generally horizontal landing surface and underneath said photovoltaic module frame.

16. The mounting system according to claim 15, wherein said at least one clamp member further comprises an upstanding portion disposed proximate to a side surface of said photovoltaic module frame, and said upstanding portion of said at least one clamp member being oppositely disposed with respect to said looped portion of said at least one clamp member.

17. The mounting system according to claim 16, wherein said upstanding portion of said at least one clamp member comprises at least one serrated edge portion, said at least one serrated edge portion configured to provide integrated grounding for said photovoltaic module, and said at least one serrated edge portion further configured to resist an uplift of said photovoltaic module resulting from wind forces acting on said photovoltaic module.

\* \* \* \* \*